United States Patent
Grip et al.

(10) Patent No.: US 12,269,608 B2
(45) Date of Patent: Apr. 8, 2025

(54) STRUCTURALLY INTEGRATED VACUUM TANK AND METHOD OF USING THE SAME

(71) Applicant: The Boeing Company, Arlington, VA (US)

(72) Inventors: Robert E. Grip, Rancho Palos Verdes, CA (US); Aaron J. Kutzmann, Long Beach, CA (US); Nathaniel J. Noel, North Charleston, SC (US)

(73) Assignee: The Boeing Company, Arlington, VA (US)

( * ) Notice: Subject to any disclaimer, the term of this patent is extended or adjusted under 35 U.S.C. 154(b) by 33 days.

(21) Appl. No.: 18/336,989

(22) Filed: Jun. 17, 2023

(65) Prior Publication Data

US 2024/0417097 A1 Dec. 19, 2024

(51) Int. Cl.
*B64D 37/06* (2006.01)
*B64D 37/04* (2006.01)
*F17C 13/08* (2006.01)

(52) U.S. Cl.
CPC ............ *B64D 37/06* (2013.01); *B64D 37/04* (2013.01); *F17C 13/083* (2013.01); *F17C 2203/012* (2013.01); *F17C 2205/0126* (2013.01); *F17C 2221/012* (2013.01); *F17C 2221/033* (2013.01); *F17C 2270/0189* (2013.01)

(58) Field of Classification Search
CPC ........ B64D 37/04; B64D 37/06; B64D 37/10; F17C 2205/0119; F17C 2205/0126; F17C 2203/012; F17C 13/083
See application file for complete search history.

(56) References Cited

U.S. PATENT DOCUMENTS

| | | | |
|---|---|---|---|
| 3,243,150 A * | 3/1966 | Woodcock | F17C 3/02 244/135 R |
| 2023/0313946 A1* | 10/2023 | Bergan | F17C 3/027 220/560.1 |
| 2023/0348057 A1* | 11/2023 | Kawai | B64D 37/04 |

* cited by examiner

*Primary Examiner* — Tye William Abell
*Assistant Examiner* — Justin Michael Heston

(57) ABSTRACT

There is provided a structurally integrated vacuum tank that includes a vacuum tank main portion extending between vacuum tank end portions. The vacuum tank main portion includes a vacuum tank skin forming a cylinder. The vacuum tank skin has a longitudinal cross section with a profile geometry configured for buckling prevention for the vacuum tank skin under external pressure loads. The vacuum tank skin is configured to provide a pressure barrier between an outside ambient pressure and a vacuum in an interior of the vacuum tank main portion. The vacuum tank main portion further includes a plurality of stiffener members coupled to surface portions of the vacuum tank skin. The vacuum tank skin and the plurality of stiffener members are configured to carry structural loads.

20 Claims, 42 Drawing Sheets

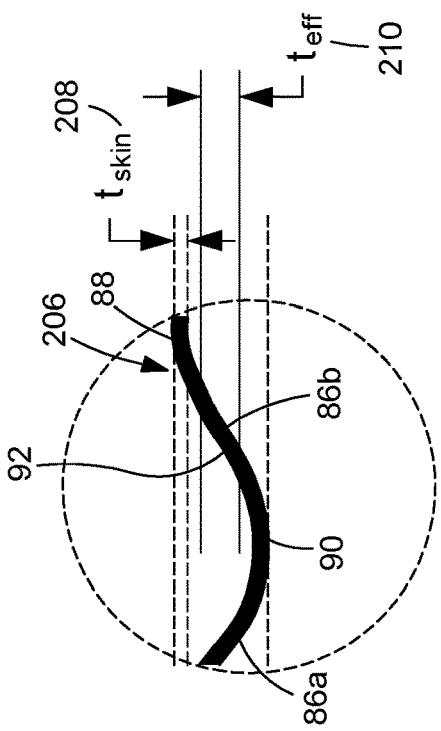
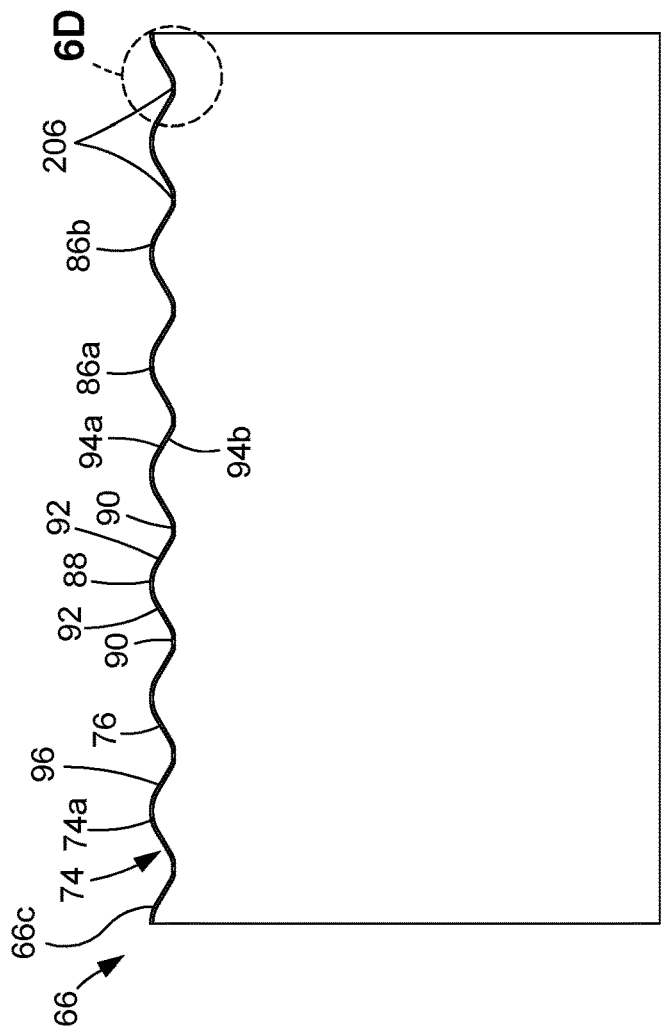

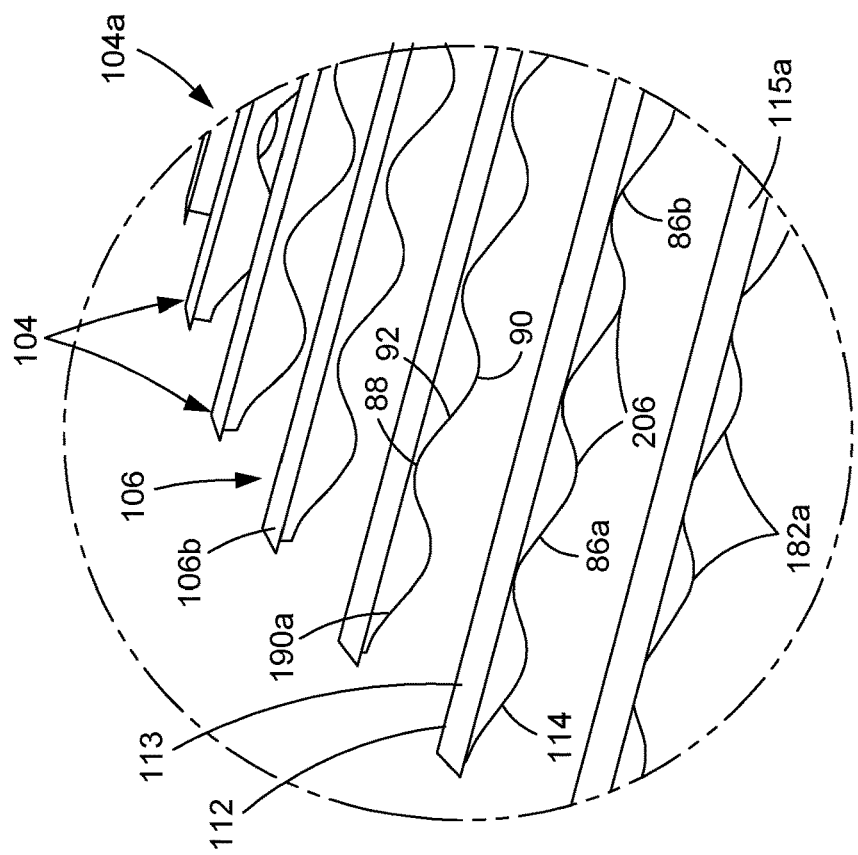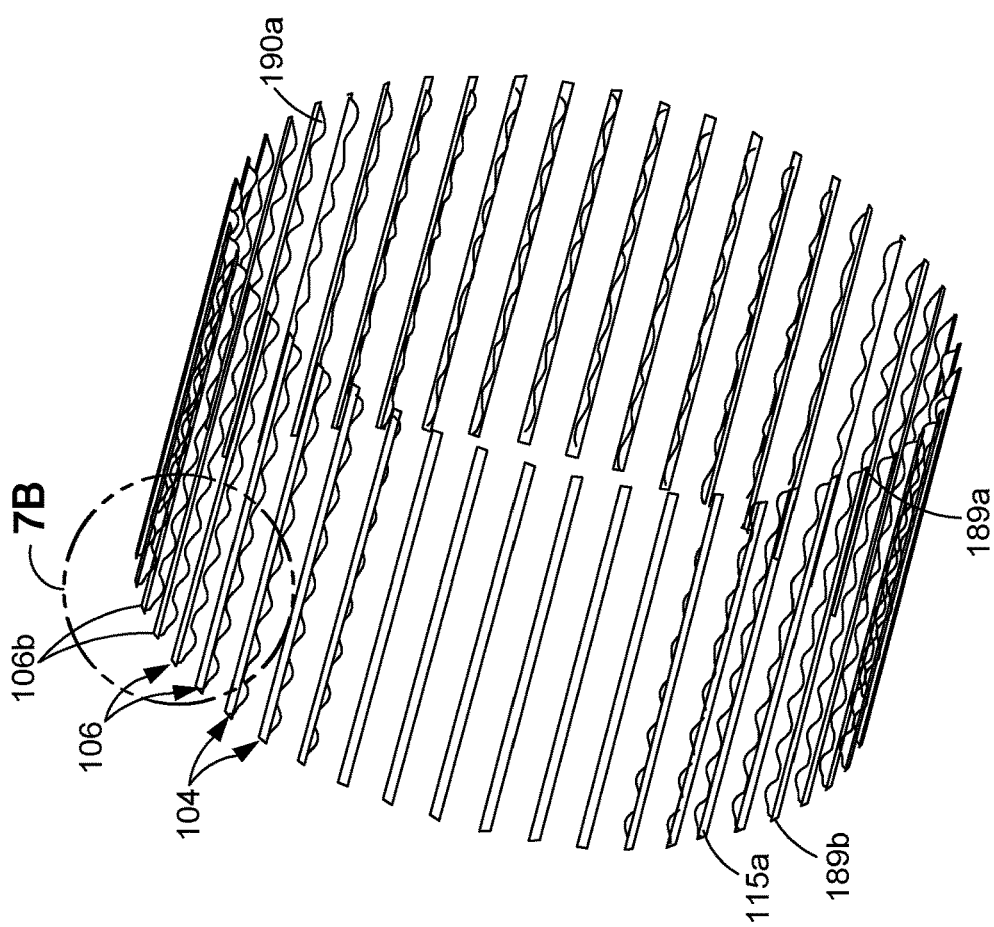

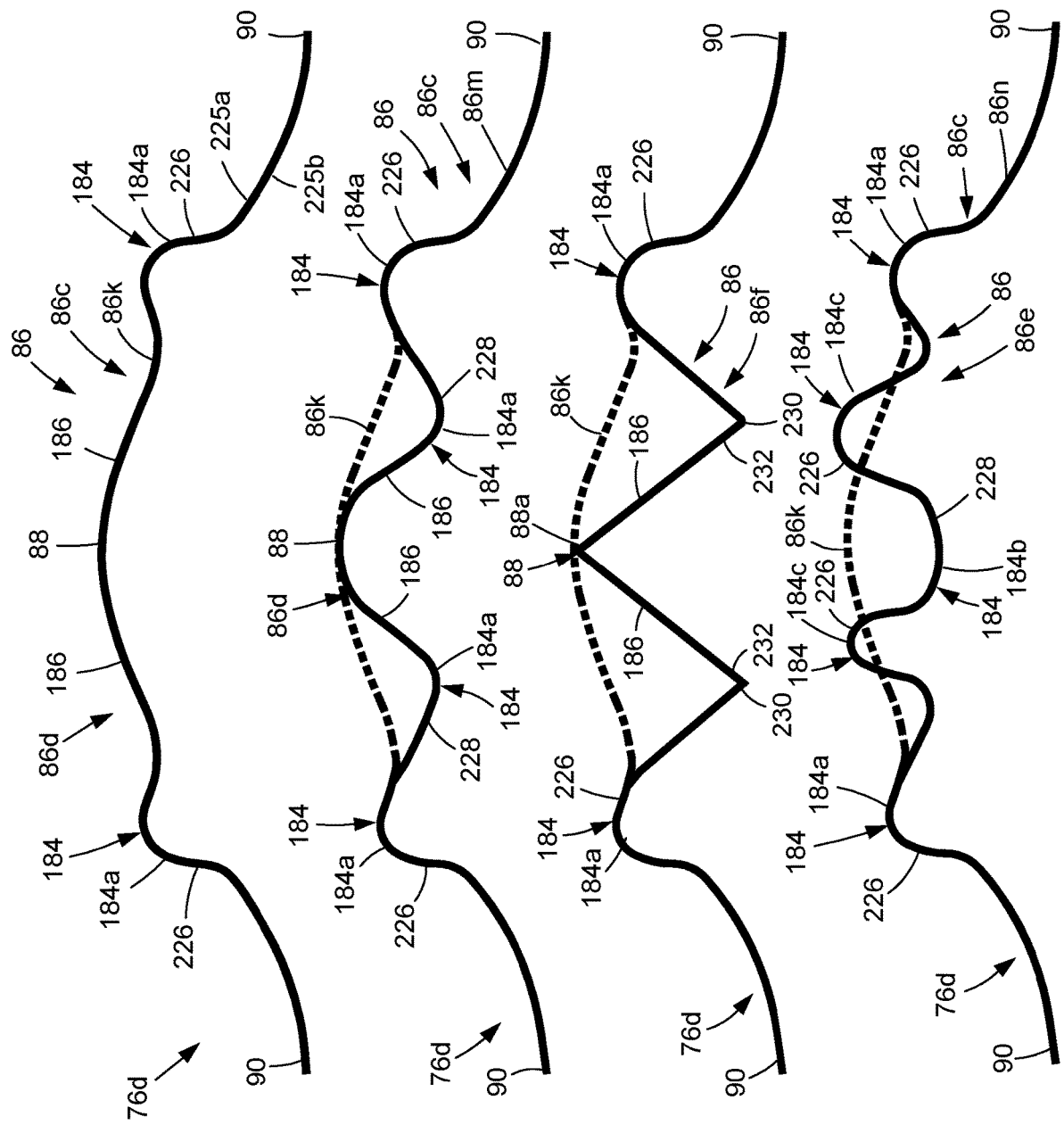

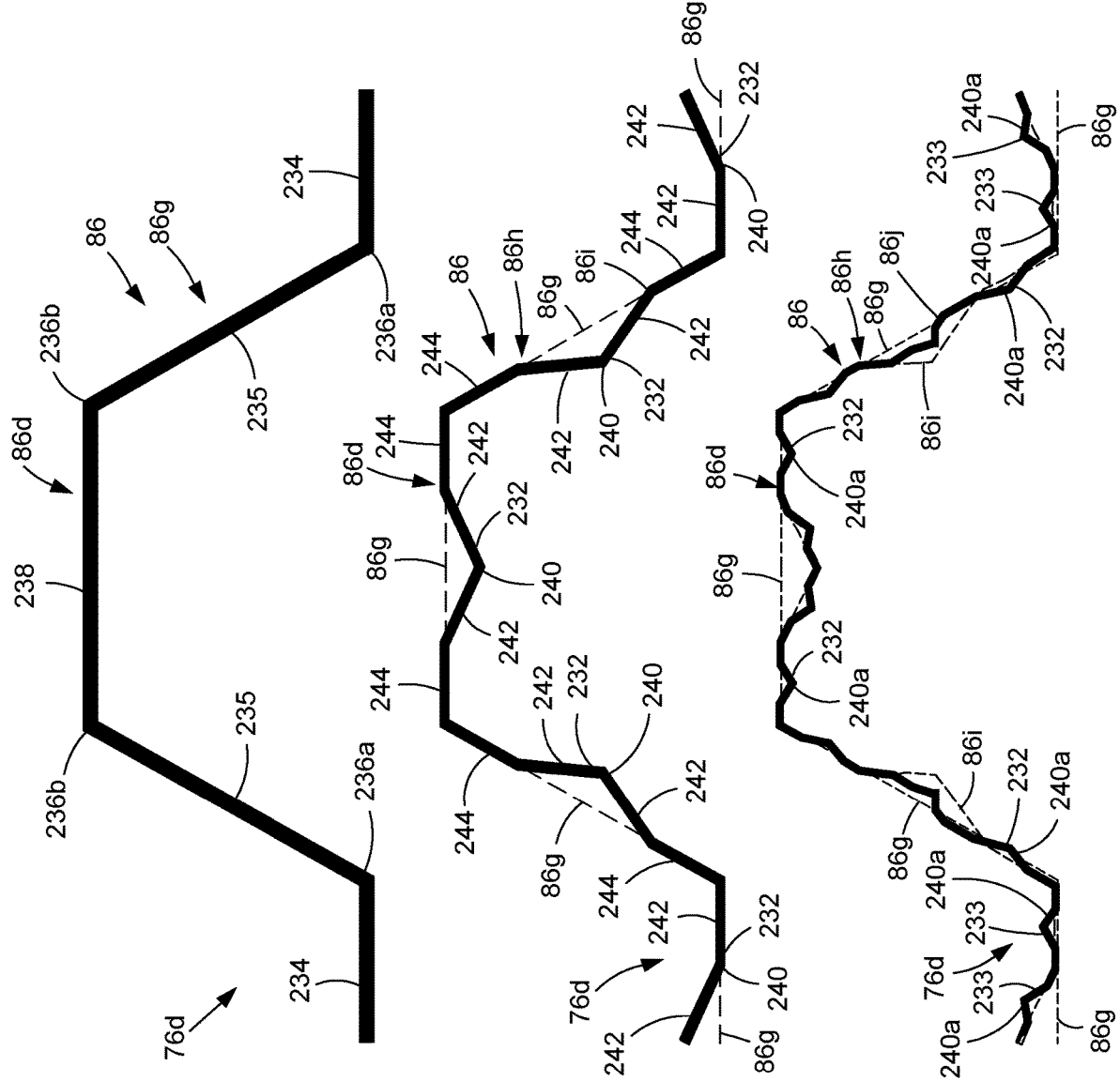

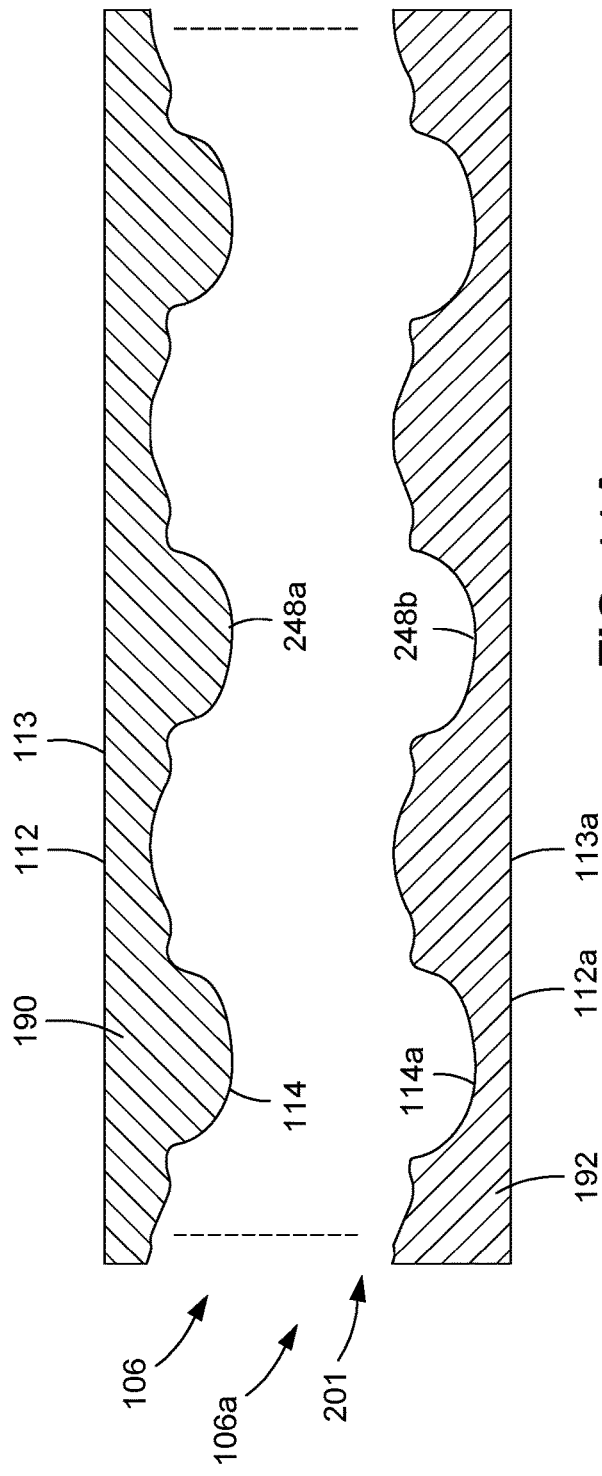
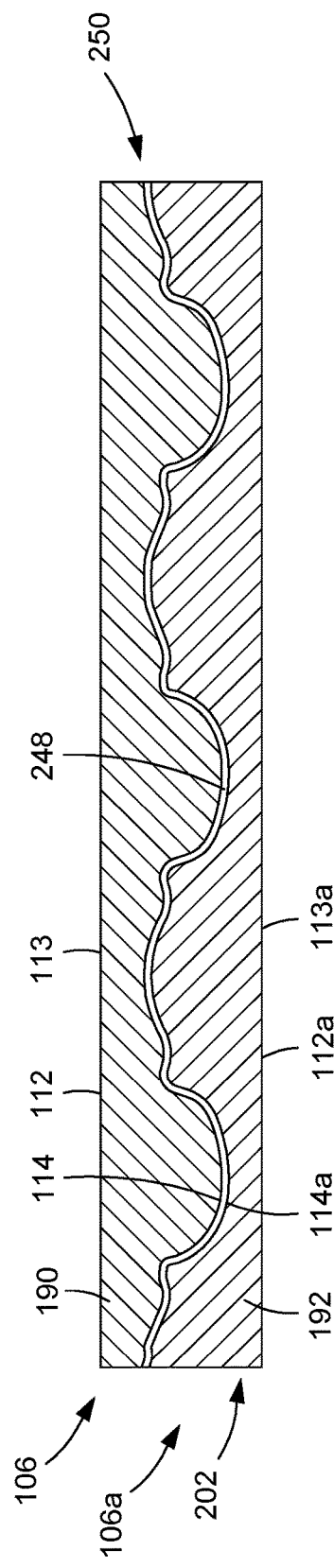

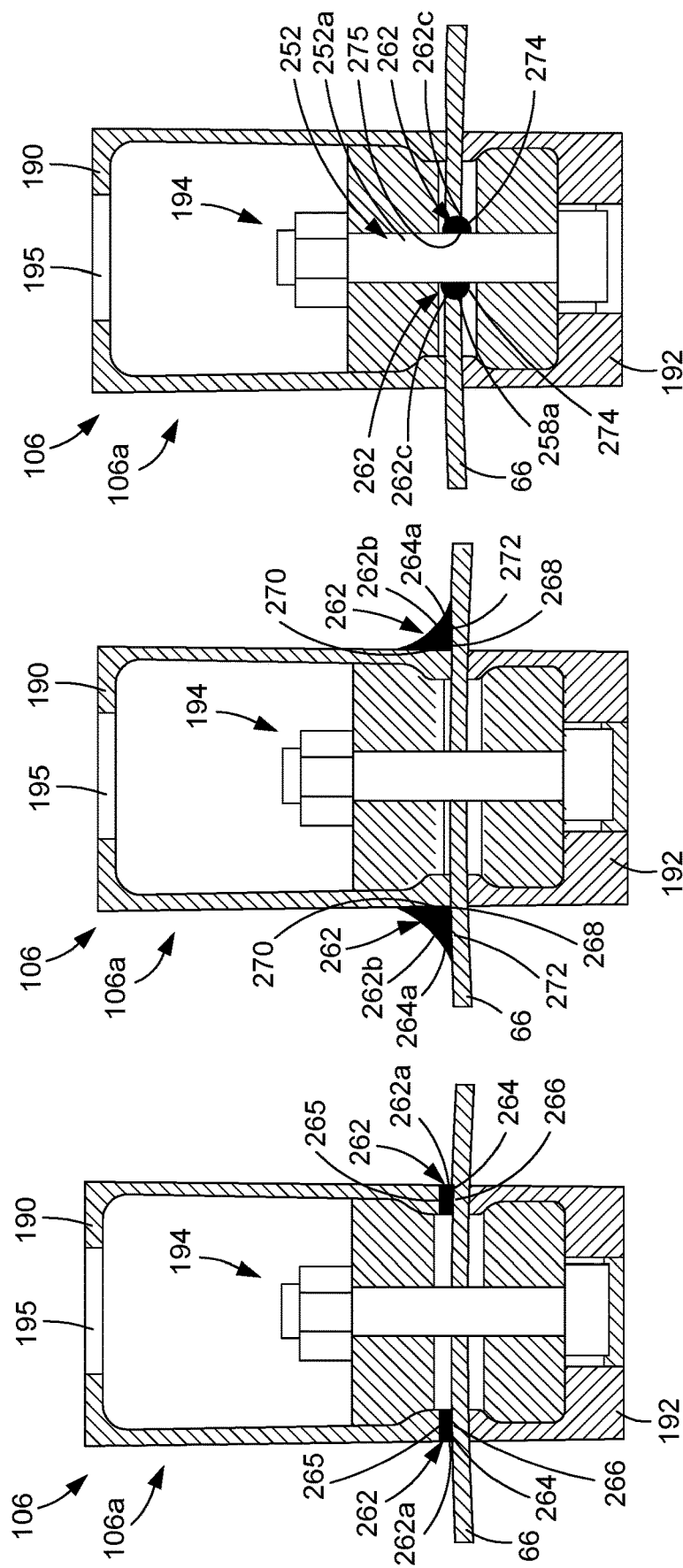

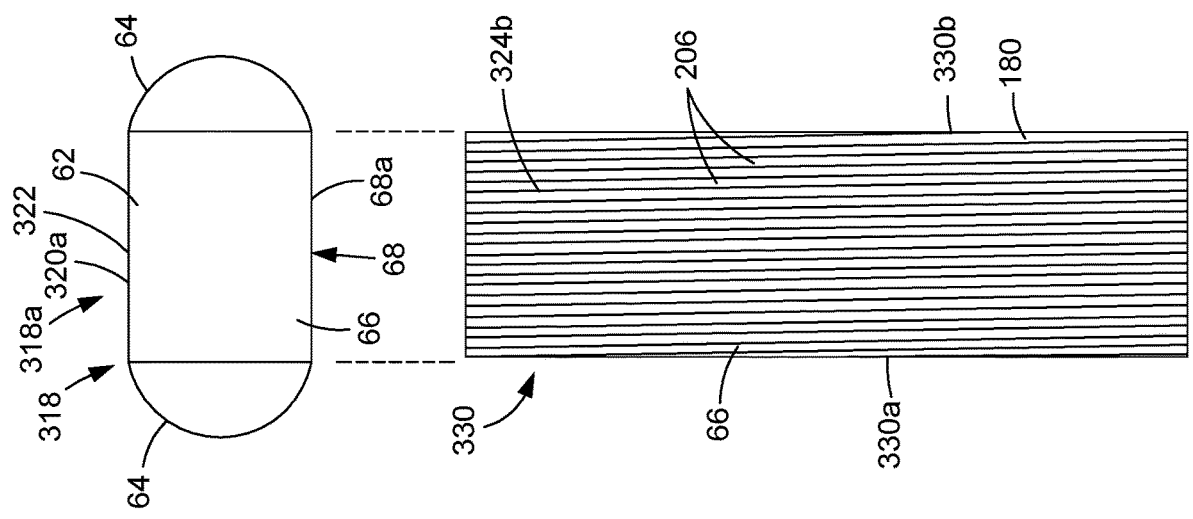

STRUCTURALLY INTEGRATED VACUUM TANK AND METHOD OF USING THE SAME

CROSS-REFERENCE TO RELATED APPLICATIONS

This nonprovisional patent application is also related to contemporaneously filed U.S. nonprovisional patent application Ser. No. 18/336,990, titled TANK SYSTEM HAVING REMOVABLE PLUG ASSEMBLY AND METHOD OF USING THE SAME, the contents of which are hereby incorporated by reference in their entirety. By mention in this CROSS-REFERENCE TO RELATED APPLICATIONS section, the application is not admitted to be prior art with respect to this application.

This nonprovisional patent application is also related to contemporaneously filed U.S. nonprovisional patent application Ser. No. 18/336,991, titled SEGMENTED VACUUM JACKETED TANK SYSTEM AND METHOD OF USING THE SAME, filed on Jun. 17, 2023, the contents of which are hereby incorporated by reference in their entirety. By mention in this CROSS-REFERENCE TO RELATED APPLICATIONS section, the application is not admitted to be prior art with respect to this application.

This nonprovisional patent application is also related to contemporaneously filed U.S. nonprovisional patent application Ser. No. 18/336,992, titled SYSTEM AND METHOD OF CONTROLLING THE CIRCUMFERENCE OF A PRESSURE TANK MOUNTED WITHIN A VACUUM TANK, filed on Jun. 17, 2023, the contents of which are hereby incorporated by reference in their entirety. By mention in this CROSS-REFERENCE TO RELATED APPLICATIONS section, the application is not admitted to be prior art with respect to this application.

This nonprovisional patent application is also related to contemporaneously filed U.S. nonprovisional patent application Ser. No. 18/336,993, titled SYSTEM AND METHOD OF CONTROLLING THE DEFLECTIONS OF A PRESSURE TANK MOUNTED WITHIN A VACUUM TANK, filed on Jun. 17, 2023, the contents of which are hereby incorporated by reference in their entirety. By mention in this CROSS-REFERENCE TO RELATED APPLICATIONS section, the application is not admitted to be prior art with respect to this application.

FIELD

The disclosure relates generally to vacuum tank systems and methods, and more particularly, to structurally integrated vacuum tank systems and methods for storing cryogenic fluid in a structure, such as an aircraft.

BACKGROUND

Vehicles and structures, including aircraft, powered with a cryogenic fluid, such as liquid hydrogen or liquid natural gas, typically require storage tanks for such cryogenic fluid that have a significantly larger volume than storage tanks for conventional fuels, such as jet fuel or gasoline, because the cryogenic fluid has a lower density than such conventional fuels. For some aircraft configurations, due to the larger volume required for the cryogenic fluid storage tank or tanks, the fuselage is a preferred location in which to install such tank or tanks. Installing the tank or tanks outside of the fuselage, such as under a wing, or alongside the fuselage, may increase drag.

In addition, the cryogenic fluid, such as liquid hydrogen or liquid natural gas, is typically stored in a cryogenic storage tank at extremely cold temperatures, e.g., 20 degrees Kelvin (−423.4 degrees fahrenheit) for liquid hydrogen, to prevent the cryogenic fluid from transitioning into its gaseous form. Sufficient thermal insulation is needed around the cryogenic storage tank to prevent the cryogenic liquid from boiling off from heat transferring from ambient air around the vehicle, such as the aircraft, to the cryogenic storage tank.

A known solution exists for thermally insulating a cryogenic storage tank for vehicles and structures, including aircraft. Such known solution may include enclosing a cryogenic storage tank, which is pressurized, within an external vacuum tank or an external vacuum jacket, which is under a vacuum, to form a vacuum jacketed tank system. A vacuum cavity having a sufficient gap clearance is formed between the internal cryogenic storage tank and the external vacuum tank or vacuum jacket.

For a known vacuum jacketed tank system installed in the fuselage of an aircraft, where the fuselage has a typical semi-monocoque structure, the external vacuum tank or vacuum jacket typically requires fuselage structure and structural attachments between the exterior of the external vacuum tank or vacuum jacket and the interior of the fuselage to hold or support the external vacuum tank or vacuum jacket with respect to the fuselage. There is a space of typically 3-5 inches between a loft surface of the fuselage structure and the exterior of the external vacuum tank or vacuum jacket, which is comprised of a clearance between an inner flange of a frame and the external vacuum tank and a depth of the frame itself. Such clearance space is not useful for the external vacuum tank or vacuum jacket. Moreover, the fuselage structure and structural attachments used to hold or support the external vacuum tank or vacuum jacket may increase the overall weight of the aircraft, and may increase the overall part count in manufacturing the aircraft. Further, the volume of the internal cryogenic storage tank and the amount of cryogenic fluid that can be stored in the internal cryogenic storage tank are limited by the size of the external vacuum tank or vacuum jacket surrounding the internal cryogenic storage tank.

In addition, in an aircraft, known external vacuum tanks or vacuum jackets may be attached to stiffener members, such as stringers, that run lengthwise along the aircraft's fuselage. The stiffener members, such as stringers, are typically attached to fuselage frames and bulkheads. The fuselage frames are transverse support members that generally take the form of open rings connected continuously around their peripheries to fuselage skin. Such fuselage frames connected to the stiffener members, such as stringers, that are attached to the known external vacuum tanks or vacuum jackets may increase the overall weight of the aircraft, and may increase the overall part count in manufacturing the aircraft.

Further, a vacuum tank skin of known external vacuum tanks or vacuum jackets may include a solid panel vacuum tank skin that may be simple and inexpensive to manufacture, or may include a sandwich panel vacuum tank skin that is light in weight since two face sheets provide an increased effective thickness while maintaining the light weight from using thin face sheets. However, the solid panel vacuum tank skin may be heavy since a thickness required for buckling is typically much larger than a thickness required for hoop compression strength. Moreover, the sandwich panel vacuum tank skin may be more expensive and vulnerable to damage compared to a solid panel vacuum tank skin.

Thus, it would be desirable to solve the problem of a separate external vacuum tank that is located and supported by fuselage structure of an aircraft and structural attachments, and that limits the volume of the internal cryogenic storage tank and that limits the amount of cryogenic fluid that can be stored in the internal cryogenic storage tank. Further, it would be desirable to have a solution where stringers attached to an external vacuum tank or vacuum jacket do not require attachment to fuselage frames, and it would be desirable to have an alternative solution to a solid panel vacuum tank skin and a sandwich panel vacuum tank skin.

Accordingly, there is a need in the art for an improved structurally integrated vacuum tank and method that provide an integrated vacuum tank and fuselage structure that eliminates the use of fuselage structural attachments between the vacuum tank and fuselage structure to eliminate a clearance space required between the vacuum tank and the fuselage structure and to result in an improved volume ratio, that provide a single integrated structure that saves weight and cost, that provide a single integrated structure that increases the volume of an internal cryogenic storage tank and an amount of cryogenic fluid that can be stored in the internal cryogenic storage tank and that provide for efficient storage of the cryogenic fluid, that eliminate fuselage frames attached to stiffener members, such as stringers, attached to an external vacuum tank, that provide an advantageous solution for a vacuum tank skin, and that other provide advantages over known tank systems and methods.

SUMMARY

Example implementations of the present disclosure provide a structurally integrated vacuum tank system and method for a structure. As discussed in the below detailed description, versions of the structurally integrated vacuum tank system and method may provide significant advantages over known systems and methods.

In a version of the disclosure, there is provided a structurally integrated vacuum tank. The structurally integrated vacuum tank comprises a vacuum tank main portion extending between vacuum tank end portions. The vacuum tank main portion comprises a vacuum tank skin forming a cylinder. The vacuum tank skin has a longitudinal cross section with a profile geometry configured for buckling prevention for the vacuum tank skin under external pressure loads. The vacuum tank skin is configured to provide a pressure barrier between an outside ambient pressure and a vacuum in an interior of the vacuum tank main portion.

The structurally integrated vacuum tank further comprises a plurality of stiffener members coupled to surface portions of the vacuum tank skin. The vacuum tank skin and the plurality of stiffener members are configured to carry structural loads.

In another version of the disclosure, there is provided an aircraft. The aircraft comprises a fuselage with a plurality of fuselage barrel sections, and an outer aero skin at a fuselage mold line.

The aircraft further comprises a structurally integrated vacuum jacketed tank system. The structurally integrated vacuum jacketed tank system comprises a structurally integrated vacuum tank integrated with the fuselage. The structurally integrated vacuum tank has a vacuum tank main portion extending between vacuum tank end portions.

The vacuum tank main portion comprises a vacuum tank skin forming a cylinder. The vacuum tank skin has a longitudinal cross section with a profile geometry configured for buckling prevention for the vacuum tank skin under external pressure loads and flight loads. The vacuum tank skin is configured to provide a pressure barrier between an outside ambient pressure and a vacuum in an interior of the vacuum tank main portion. The vacuum tank main portion further comprises a plurality of stringers coupled to surface portions of the vacuum tank skin and coupled to the outer aero skin, wherein the plurality of stringers and the vacuum tank skin are configured to carry fuselage bending loads.

The structurally integrated vacuum jacketed tank system further comprises a pressure tank mounted within the structurally integrated vacuum tank, to obtain the structurally integrated vacuum jacketed tank system. The pressure tank contains a cryogenic fluid.

In another version of the disclosure, there is provided a method of using a structurally integrated vacuum jacketed tank system to maximize a volume of cryogenic fluid stored in a structure. The method comprises the step of providing a structurally integrated vacuum tank integrated with the structure. The structurally integrated vacuum tank has a vacuum tank main portion extending between vacuum tank end portions. The vacuum tank main portion comprises a vacuum tank skin forming a cylinder. The vacuum tank skin has a longitudinal cross section with a profile geometry configured for buckling prevention for the vacuum tank skin under external pressure loads. The vacuum tank skin is configured to provide a pressure barrier between an outside ambient pressure and a vacuum in an interior of the vacuum tank main portion. The vacuum tank main portion further comprises a plurality of stiffener members coupled to surface portions of the vacuum tank skin, wherein the vacuum tank skin and the plurality of stiffener members are configured to carry structural loads.

The method further comprises the step of mounting a pressure tank within the structurally integrated vacuum tank, to obtain a structurally integrated vacuum jacketed tank system, the pressure tank containing the cryogenic fluid. The method further comprises using the structurally integrated vacuum jacketed tank system to maximize the volume of the cryogenic fluid stored in the structure.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or claims.

FIG. 6C is an illustration of a side view of a corrugated solid skin showing corrugations;

FIG. 6D is an illustration of an enlarged side view of a corrugation shown in circle 6D of FIG. 6C;

FIG. 7A is an illustration of a front right side perspective view of a version of a plurality of stiffener members of the vacuum tank main portion shown in FIG. 5A;

FIG. 7B is an illustration of an enlarged top perspective view of a portion of the stiffener members shown in circle 7B of FIG. 7A;

FIG. 9A is an illustration of a version of a profile geometry portion of a vacuum tank skin of the disclosure showing a superimposed curves shape;

FIG. 9B is an illustration of another version of a profile geometry portion of a vacuum tank skin of the disclosure showing another superimposed curves shape;

FIG. 9C is an illustration of yet another version of a profile geometry portion of a vacuum tank skin of the disclosure showing a pointed corner shape;

FIG. 9D is an illustration of yet another version of a profile geometry portion of a vacuum tank skin of the disclosure showing a non-symmetrical shape;

FIG. 9E is an illustration of yet another version of a profile geometry portion of a vacuum tank skin of the disclosure showing a hat shape;

FIG. 9F is an illustration of yet another version of a profile geometry portion of a vacuum tank skin of the disclosure showing a first approximately fractal shape;

FIG. 9G is an illustration of yet another version of a profile geometry portion of a vacuum tank skin of the disclosure showing a second approximately fractal shape;

FIG. 11A is an illustration of a side sectional view of an outer section and an inner section of a box stringer in a separated position;

FIG. 11B is an illustration of a side sectional view of the outer section and the inner section of the box stringer of FIG. 11A joined together in a joined position;

FIG. 12D is an illustration of a cross-sectional front view of the vacuum tank skin, box stringer, and fastener assembly of FIG. 12C, and further showing a fayed surface sealing element;

FIG. 12E is an illustration of a cross-sectional front view of the vacuum tank skin, box stringer, and fastener assembly of FIG. 12C, and further showing an externally applied sealing element;

FIG. 12F is an illustration of a cross-sectional front view of the vacuum tank skin, box stringer, and fastener assembly of FIG. 12C, and further showing a rubber grommet sealing element;

FIG. 17A is an illustration of a schematic side view of another untapered cylinder profile for a vacuum tank;

FIG. 17B is an illustration of a schematic side view of a corrugated flat pattern with a helix arrangement of a vacuum tank skin of the vacuum tank of FIG. 17A;

Figure 1:
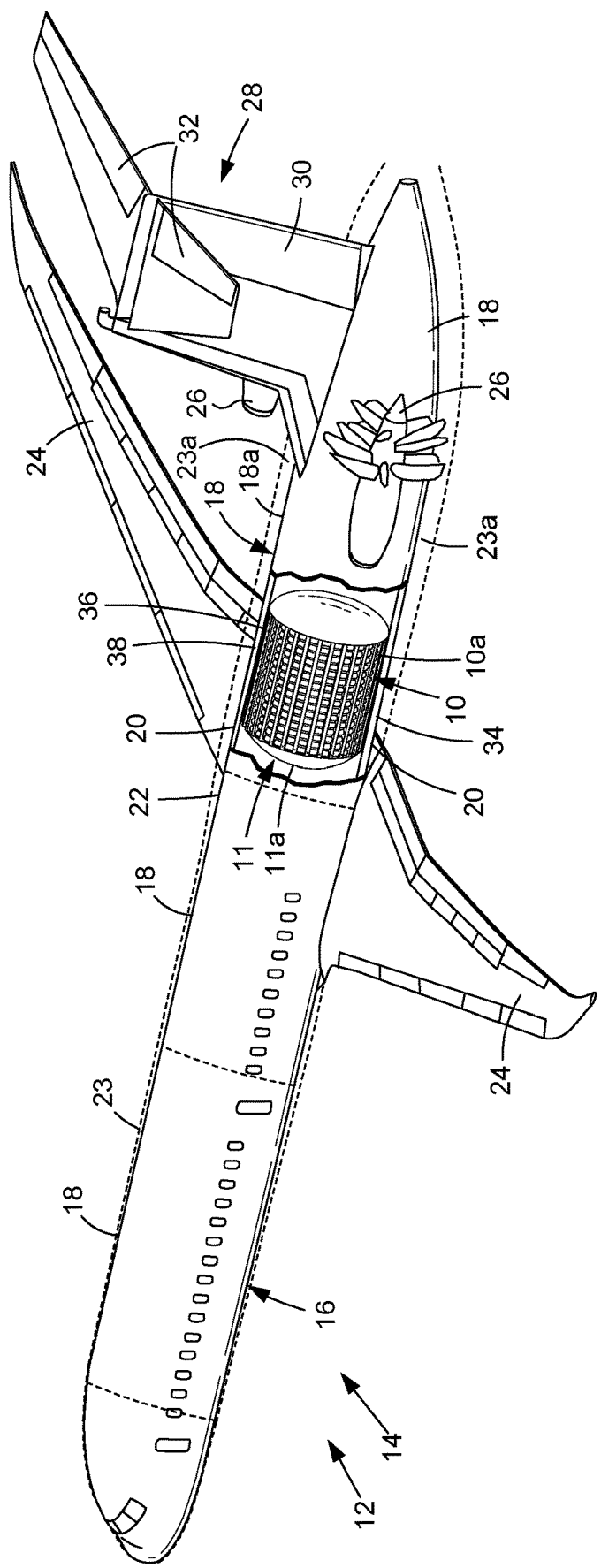
FIG. 1 is an illustration of a perspective view of an exemplary structurally integrated vacuum tank of the disclosure implemented in an exemplary tank system for a structure in the form of an aircraft.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version". The instances of the phrases "one version" or "a version" do not necessarily refer to the same version. Particular features, structures, or characteristics may be combined in any suitable manner consistent with this disclosure. All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, the terms "first", "second", etc., are used as labels for nouns that they precede, and do not imply any type of ordering (e.g., spatial, temporal, logical, etc.).

As used herein, an element or step recited in the singular and preceded by the word "a" or "an" should be understood as not necessarily excluding the plural of the elements or steps. As used herein, the term "and/or" includes any and all combinations of one or more of the associated listed items. As also used herein, the term "combinations thereof" includes combinations having at least one of the associated listed items, wherein the combination can further include additional, like non-listed items.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Now referring to FIG. 1, FIG. 1 is an illustration of a perspective view of an exemplary structurally integrated vacuum tank 10, such as an external structurally integrated vacuum tank 10a, implemented in an exemplary tank system 11, such as a structurally integrated vacuum jacketed tank system 11a, for a structure 12 in the form of an aircraft 14. As shown in FIG. 1, the aircraft 14 comprises a fuselage 16 with a plurality of fuselage barrel sections 18 joined together, and an outer aero skin 20 at a fuselage mold line 22. As shown in FIG. 1, in one version, the structurally integrated vacuum tank 10 is structurally integrated with an aft fuselage barrel section 18a of the fuselage 16. In other versions, the structurally integrated vacuum tank 10 may be structurally integrated with other fuselage barrel sections 18 of the fuselage 16. FIG. 1 further shows a boundary layer 23, including an aft fuselage boundary layer 23a near the exterior of the aft fuselage barrel section 18a. As used herein, "boundary layer" and "aft fuselage boundary layer" mean a thin region of slow moving air next to a bounding surface of a fuselage, including an aft fuselage, of an aircraft that can be a main source of friction drag, and the slow moving air's interaction with the fuselage, including the aft fuselage, induces a no-slip boundary condition of zero velocity at the bounding surface. The flow velocity of the slow moving air increases above the bounding surface until it returns to a bulk flow velocity. As further shown in FIG. 1, the aircraft 14 comprises wings 24, propulsion units 26, and a tail 28. The tail 28 includes a vertical stabilizer 30 (see FIG. 1) and horizontal stabilizers 32 (see FIG. 1). As shown in FIG. 1, the structurally integrated vacuum tank 10 is a single integrated structure 34 that integrates vacuum tank structure 36 and fuselage structure 38, discussed in further detail below, instead of having separate vacuum tank structure and separate fuselage structure.

Figure 2:
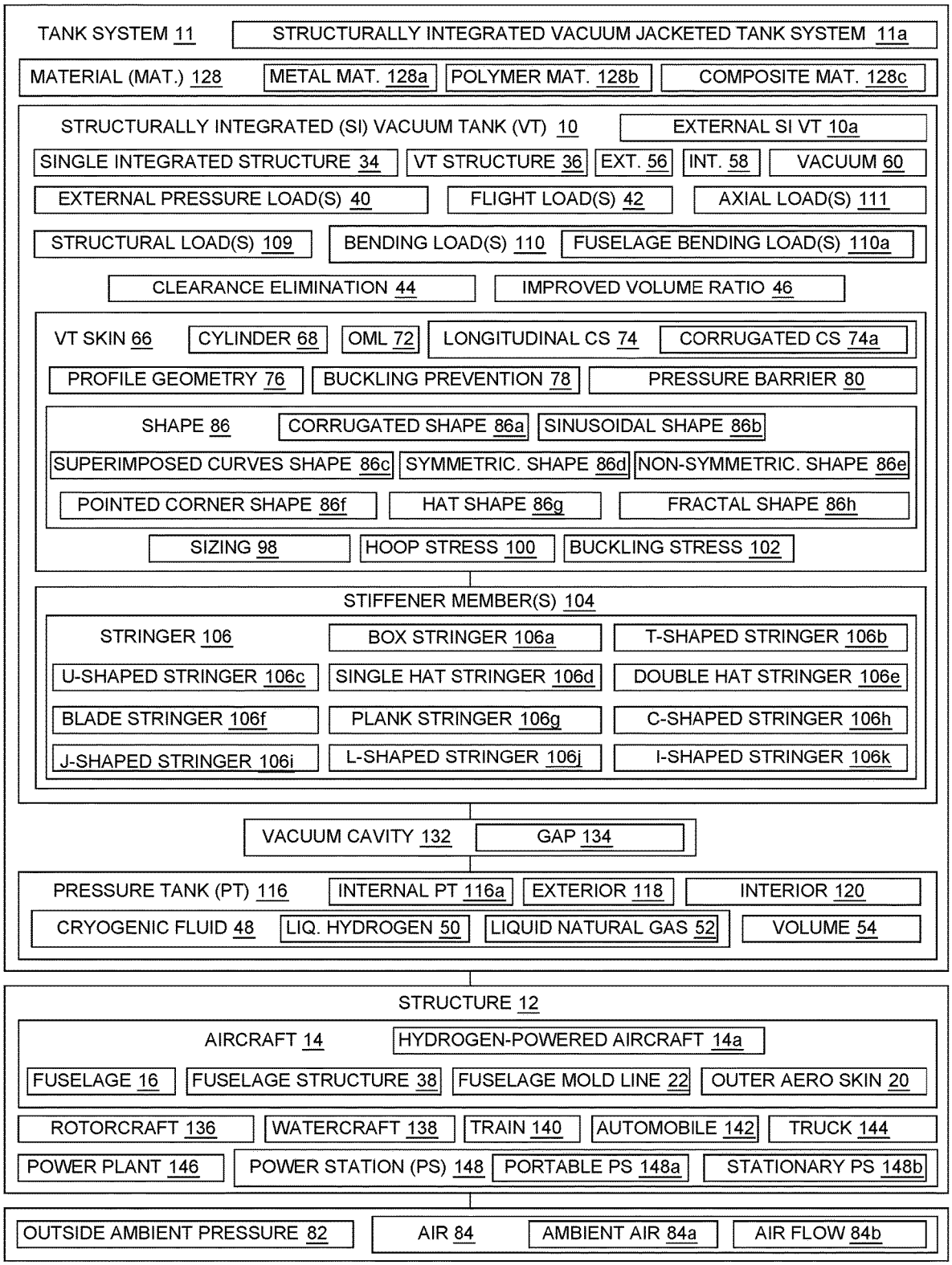
FIG. 2 is an illustration of a block diagram of an exemplary tank system, including an exemplary structurally integrated vacuum tank of the disclosure, for a structure.

Now referring to FIG. 2, FIG. 2 is an illustration of a block diagram of an exemplary tank system 11, such as a structurally integrated vacuum jacketed tank system 11a, including an exemplary structurally integrated (SI) vacuum tank (VT) 10, such as an external structurally integrated vacuum tank (SI VT) 10a, of the disclosure, for use with, and powering of, an exemplary structure 12, such as an aircraft 14, for example, a hydrogen-powered aircraft 14a. The blocks in FIG. 2 represent elements, and lines connecting the various blocks do not imply any particular dependency of the elements. Furthermore, the connecting lines shown in the various Figures contained herein are intended to represent example functional relationships and/or physical couplings between the various elements, but it is noted that other alternative or additional functional relationships or physical connections may be present in versions disclosed herein. One or more of these blocks may be combined, divided, or combined and divided into different blocks when implemented in an illustrative example. Further, the illustrations of the tank system 11 and structurally integrated vacuum tank 10 in FIG. 2 are not meant to imply physical or architectural limitations to the manner in which an illustrative example may be implemented. Other components in addition to, or in place of, the ones illustrated may be used. Some components may be unnecessary.

As shown in FIG. 2, the structurally integrated vacuum tank 10 is a single integrated structure 34. The single integrated structure 34 integrates or combines vacuum tank structure 36 (see FIGS. 1, 2) with portions of the structure 12, such as a fuselage structure 38 (see FIGS. 1, 2) of the fuselage 16 for an aircraft 14. Known vacuum tank arrangements have a separate vacuum tank and a separate fuselage structure, with fuselage structural attachments between the separate vacuum tank and the separate fuselage structure, such as brackets, fittings, or other support structures, that support the separate vacuum tank, and there is a clearance or space between the separate vacuum tank and the separate fuselage structure, for example, a typical space of 3-5 inches between a loft surface of the fuselage structure and the exterior of the external vacuum tank or vacuum jacket. With the structurally integrated vacuum tank 10 disclosed herein, instead of having a separate vacuum tank that is located and supported by the separate fuselage structure, the vacuum tank structure 36 and the fuselage structure 38 are a single integrated structure 34. The structurally integrated vacuum tank 10 has a dual function of a separate vacuum tank and one of the plurality of fuselage barrel sections 18, for example, the aft fuselage barrel section 18a, but without requiring a separate vacuum tank and a separate fuselage structure arrangement.

As shown in FIG. 2, the structurally integrated vacuum tank 10 comprising the single integrated structure 34 carries external pressure loads 40 and flight loads 42. Further, as shown in FIG. 2, the structurally integrated vacuum tank 10 comprising the single integrated structure 34 provides clearance elimination 44 of the clearance or space between the separate vacuum tank and the separate fuselage structure, such as present with a typical known arrangement. Such clearance elimination 44 results in an improved volume ratio 46 (see FIG. 2) and a greater potential for reduced cost due to the elimination of fuselage structural attachments to support the separate vacuum tank, and a greater potential for reduced cost due to substituting a single integrated structure 34 (see FIG. 2) for two components including a separate vacuum tank and a separate fuselage barrel structure.

Further, the structurally integrated vacuum tank 10 provides for an efficient storage of cryogenic fluid 48 (see FIG. 2), such as liquid hydrogen 50 (see FIG. 2), liquid natural gas 52 (see FIG. 2), or another suitable cryogenic fluid 48, in the structure 12, such as the aircraft 14, for example, in the fuselage 16 of the aircraft 14, without requiring separate fuselage structure and a separate vacuum tank. The structurally integrated vacuum tank 10 maximizes a volume 54 (see FIG. 2) of the cryogenic fluid 48 stored in the structure 12, such as the aircraft 14, for example, in the fuselage 16 of the aircraft 14.

As shown in FIG. 2, the structurally integrated vacuum tank 10 comprises an exterior (EXT.) 56 and an interior (INT.) 58. The interior 58 of the structurally integrated vacuum tank 10 is under a vacuum 60 (see FIG. 2).

Figure 3A:
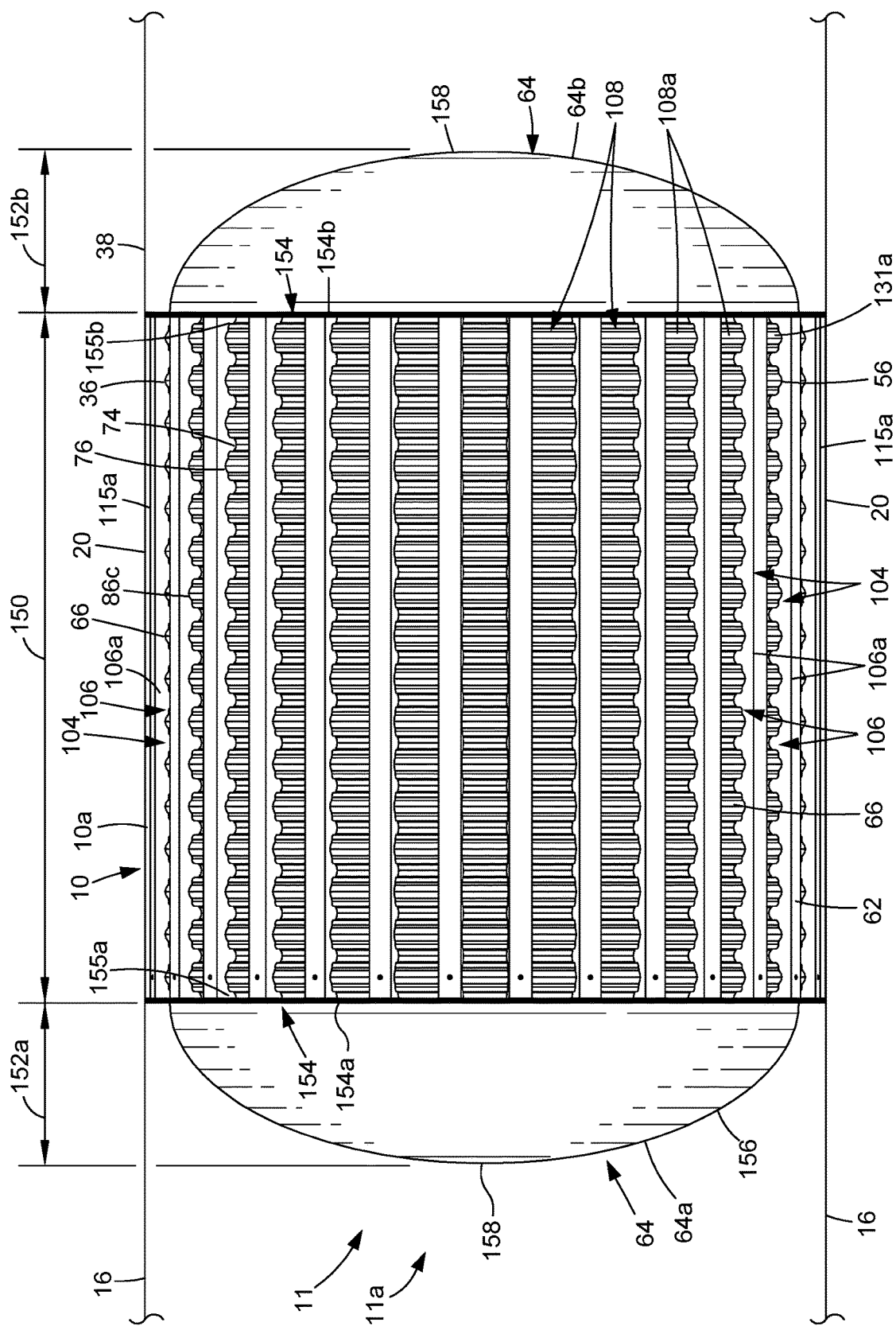
FIG. 3A is an illustration of a side view of an exemplary tank system having a version of a structurally integrated vacuum tank of the disclosure.

The structurally integrated vacuum tank 10 further comprises a vacuum tank main portion 62 (see FIGS. 3A-3B) extending between vacuum tank end portions 64 (see FIGS. 3A-3B), such as a forward vacuum tank end portion 64a (see FIG. 3A) and an aft vacuum tank end portion 64b (see FIG. 3A). The vacuum tank main portion 62 comprises a vacuum tank (VT) skin 66 (see FIGS. 2, 3A) forming a cylinder 68 (see FIGS. 2, 3A) with a substantially cylindrical shape 70 (see FIGS. 3A, 4A, 5A) that is not a true cylinder due to corrugations 206 (see FIG. 10D). In one version, the cylinder 68 formed by the vacuum tank skin 66 comprises an untapered cylinder 68a (see FIGS. 15A, 17A). In another version, the cylinder 68 formed by the vacuum tank skin 66 comprises a tapered cylinder 68b (see FIG. 16A).

As shown in FIG. 2, the vacuum tank skin 66 has an outer mold line (OML) 72 and has a longitudinal cross section (CS) 74 with a profile geometry 76 configured for buckling prevention 78 for the vacuum tank skin 66 under external pressure loads 40. The longitudinal cross section 74 with the profile geometry 76 is configured to prevent buckling of the vacuum tank skin 66 under external pressure loads 40 and flight loads 42, such as when the structure 12 comprises an aircraft 14. The vacuum tank skin 66 is configured to provide a pressure barrier 80 (see FIG. 2) between an outside ambient pressure 82 (see FIG. 2) and the vacuum 60 in the interior 58 of the structurally integrated vacuum tank 10. The vacuum tank skin 66 carries hoop compression resulting from this pressure difference. Further, the vacuum tank skin 66 carries some flight loads 42 (see FIG. 2), such as fuselage torsion, when the structure 12 (see FIG. 2) comprises an aircraft 14 (see FIG. 2).

The vacuum tank skin 66 is a lightweight, single-shell skin 67 (see FIGS. 4A, 6A) that is capable of sustaining significant levels of external pressure, such as external pressure loads 40. The vacuum tank skin 66 is designed to withstand external pressure caused by air 84 (see FIG. 2), such as ambient air 84a (see FIG. 2), on the outside of the structurally integrated vacuum tank 10 and the vacuum tank skin 66, and the vacuum 60 (see FIG. 2) inside the interior 58 of the structurally integrated vacuum tank 10. The primary stresses in the structurally integrated vacuum tank 10 are compression in both the longitudinal and the hoop directions.

As shown in FIG. 2, the profile geometry 76 of the longitudinal cross section 74 of the vacuum tank skin 66 has a shape 86 comprising one or more of, a corrugated shape 86a, a sinusoidal shape 86b, a superimposed curves shape 86c, a symmetrical shape 86d, a non-symmetrical shape 86e, a pointed corner shape 86f, a hat shape 86g, a fractal shape 86h, or another suitable shape. These profile geometries 76 and shapes 86 are discussed in further detail below.

Figure 5B:
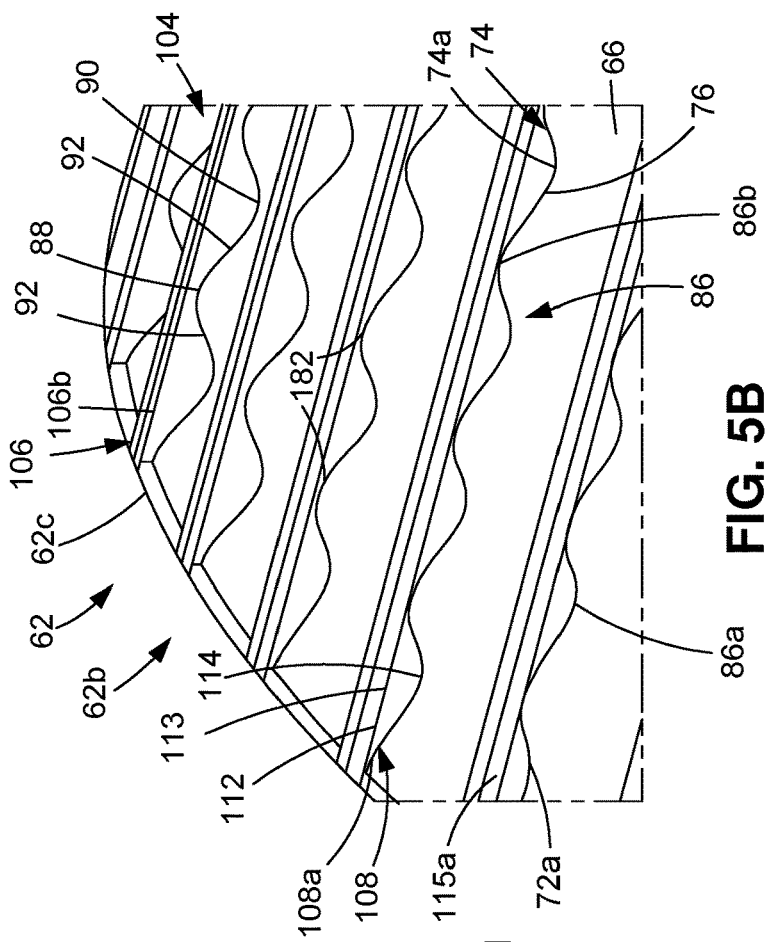
FIG. 5B is an illustration of an enlarged top perspective view of a portion of the vacuum tank main portion in circle 5B of FIG. 5A.
Figure 6B:
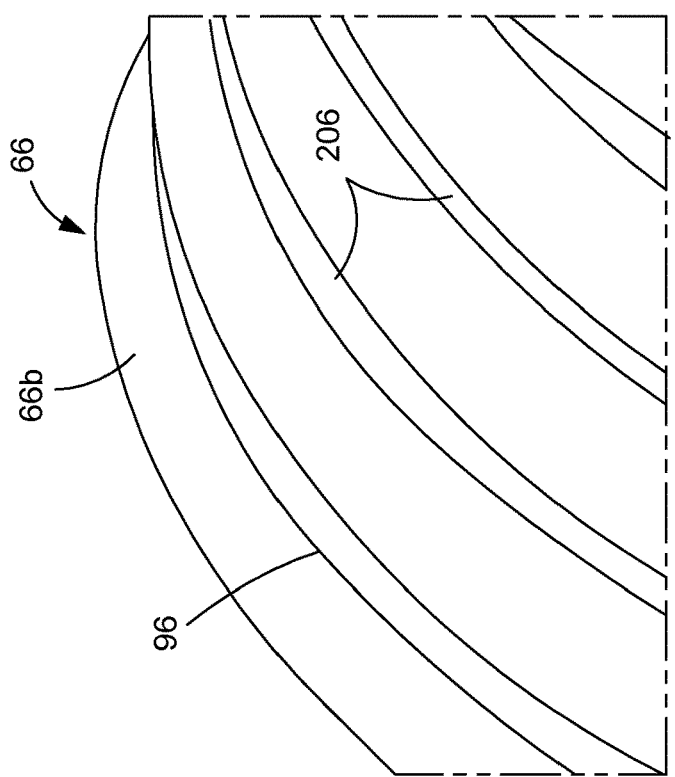
FIG. 6B is an illustration of an enlarged top perspective view of a portion of the vacuum tank skin shown in circle 6B of FIG. 6A.
Figure 6A:
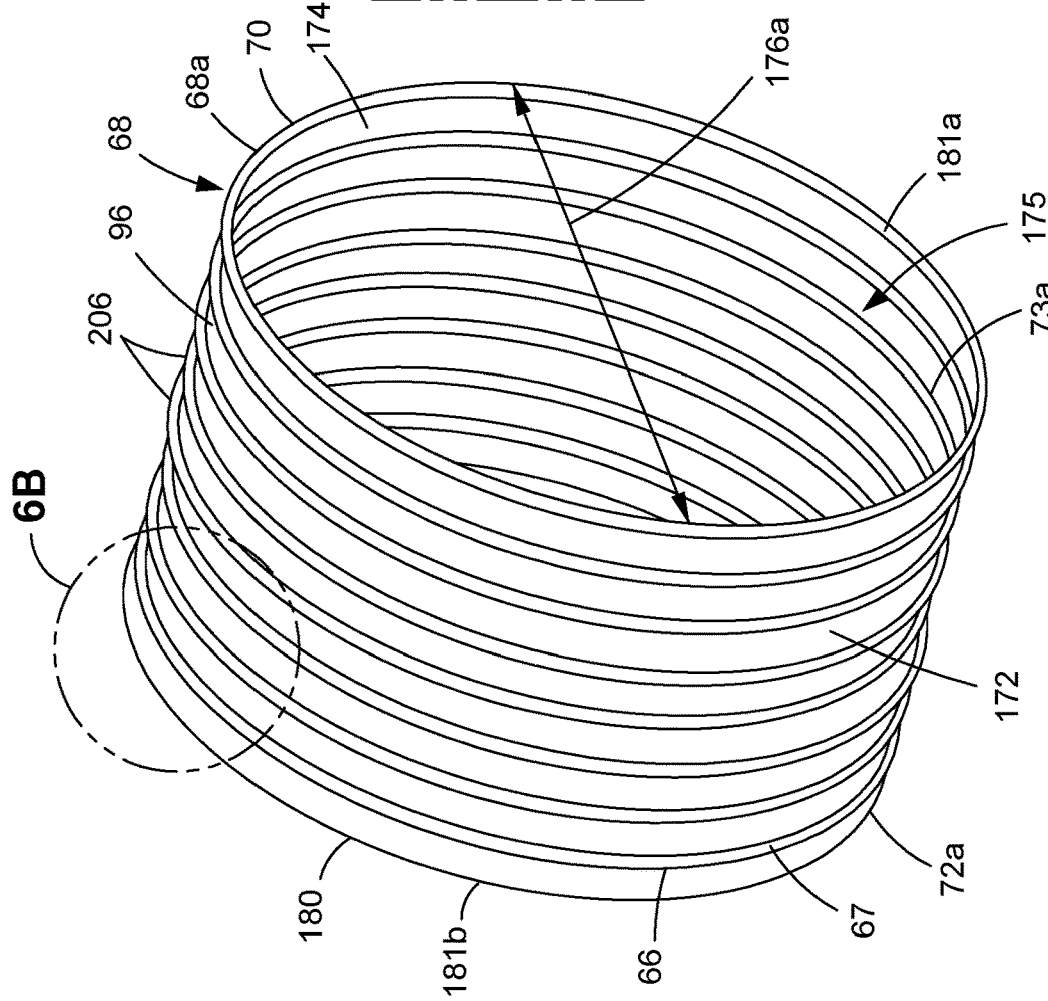
FIG. 6A is an illustration of a front right side perspective view of a version of an exemplary vacuum tank skin of the vacuum tank main portion shown in FIG. 5A.
Figure 8A:
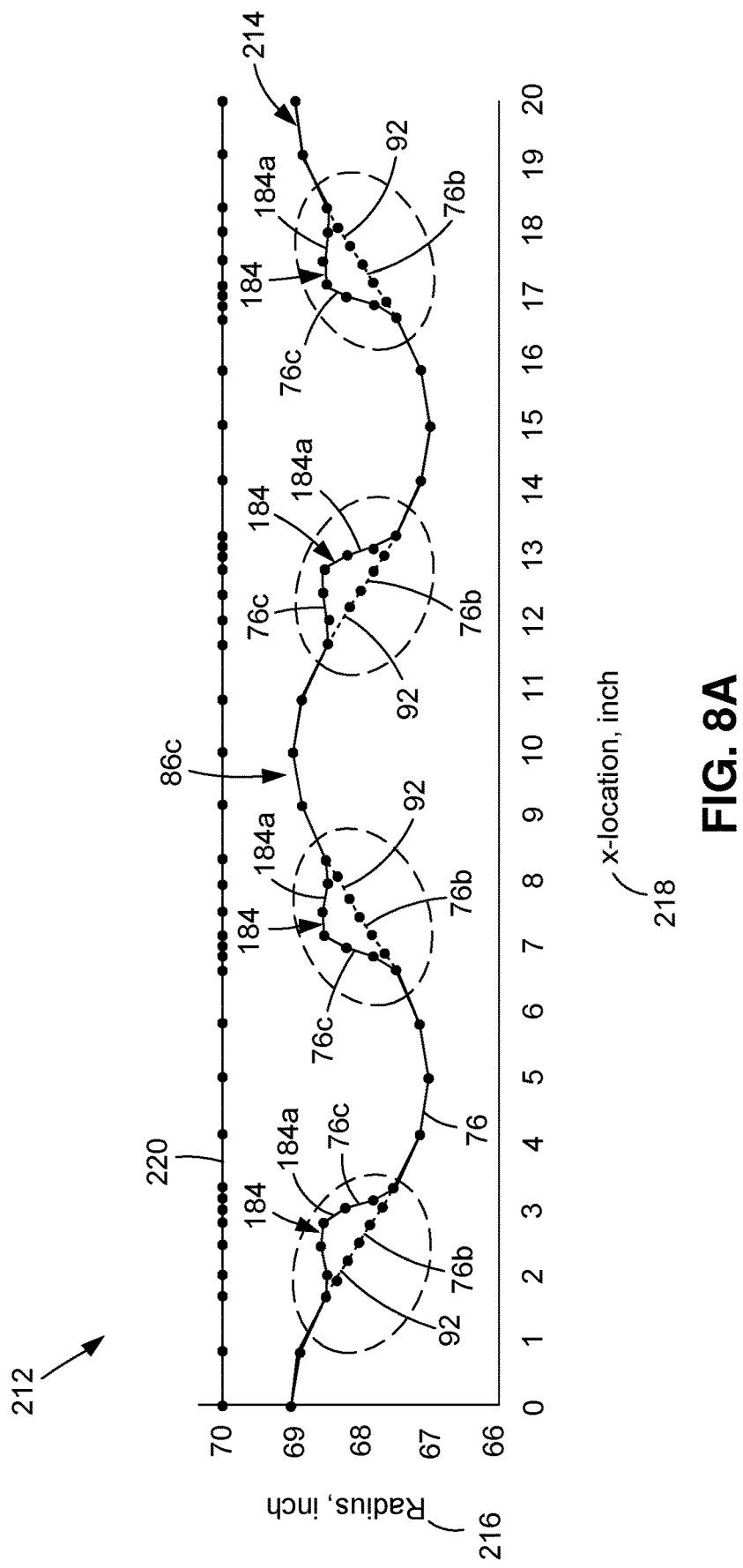
FIG. 8A is an illustration of a graph of a sinusoidal wave pattern with added curves representing a profile geometry of a vacuum tank skin of the disclosure.

In one exemplary version, the longitudinal cross section 74 comprises a corrugated cross section (CS) 74a (see FIGS. 2, 5B, 6C) and the profile geometry 76 has the corrugated shape 86a (see FIGS. 2, 5B, 6C), such as in the form of the sinusoidal shape 86b (see FIGS. 2, 5B, 6C). As shown in FIGS. 5B, 6C, 8A, the corrugated shape 86a, such as in the form of the sinusoidal shape 86b, has peaks 88 and valleys 90 that alternate, and has a substantially straight portion 92 in between each peak 88 and each valley 90, and the corrugated shape 86a, such as in the form of the sinusoidal shape 86b, has a first side 94a and a second side 94b. As shown in FIGS. 6A-6C, in one version, discussed in further detail below, the vacuum tank skin 66 comprises a corrugated solid skin 96, or corrugated solid panel, that combines the advantages of a solid panel and a sandwich panel, such as improved resistance to buckling under hoop compression.

A sizing 98 (see FIG. 2) of the vacuum tank skin 66 for thickness and weight is based on a hoop stress 100 (see FIG. 2) and a buckling stress 102 (see FIG. 2). The hoop stress 100, or static load condition, that sizes the vacuum tank skin 66 is external pressure load 40 (see FIG. 2). The thickness of the vacuum tank skin 66 is a minimum achievable thickness for a given pressure and radius. It is desirable to arrange the profile geometry 76 of the vacuum tank skin 66 so that the buckling stress 102 is greater than the hoop stress 100 set by the allowable stress.

As shown in FIG. 2, the vacuum tank main portion 62 of the structurally integrated vacuum tank 10 further comprises a plurality of stiffener members 104, such as a plurality of stringers 106 for aircraft 14, beams, longitudinal supports, or other suitable stiffener members. As shown in FIG. 2, each of the plurality of stringers 106 comprises one of, a box stringer 106a, a T-shaped stringer 106b, a U-shaped stringer 106c, a single hat stringer 106d, a double hat stringer 106e, a blade stringer 106f, a plank stringer 106g, a C-shaped stringer 106h, a J-shaped stringer 106i, an L-shaped stringer 106j, an I-shaped stringer 106k, or another suitable type of stringer.

The vacuum tank skin 66 has surface portions 108 (see FIGS. 4A, 5A), including outer surface portions 108a (see FIGS. 4A, 5A) and inner surface portions 108b (see FIGS. 4A), and the plurality of stiffener members 104, such as the plurality of stringers 106, are coupled, or attached, to various surfaces portions 108 of the vacuum tank skin 66. The vacuum tank skin 66 and the plurality of stiffener members 104, such as the stringers 106, or other suitable stiffener members, are configured to carry structural load(s) 109 (see FIG. 2). The structural load(s) 109 can include bending load(s) 110 (see FIG. 2), such as fuselage bending load(s) 110a (see FIG. 2), axial load(s) 111 (see FIG. 2) such as tension or compression, or torsion load(s). For aircraft 14, the vacuum tank skin 66 and the stringers 106 are configured to carry bending loads 110, such as a fuselage bending loads 110a. The vacuum tank skin 66 alone is unable to carry the bending loads 110, such as the fuselage bending loads 110a, as it is a mechanism and may collapse and compress or expand similar to an accordion. However, combining the plurality of stiffener members 104, such as the plurality of stringers 106, with the vacuum tank skin 66 provides sufficient stiffness to carry the bending loads 110, such as the fuselage bending loads 110a. The plurality of stiffener members 104, such as the plurality of stringers 106, also carry a longitudinal load and locally stiffen the vacuum tank skin 66 in the area of the stiffener member 104, such as the stringer 106, so that there is an effective width phenomenon occurring. Thus, the vacuum tank skin 66 carries external pressure loads 40 and flight loads 42, and the stiffener members 104, such as the stringers 106, carry flight loads 42 and longitudinal load.

The plurality of stiffener members 104, such as the plurality of stringers 106, locally stiffen the vacuum tank skin 66 in the area of the stiffener member 104, such as the stringer 106, so that a narrow portion of the vacuum tank skin 66 carries some of the longitudinal load. In the field, this additional capacity of the vacuum tank skin 66 to carry load in this direction is called the "effective width phenomenon". Because the vacuum tank skin 66 has a corrugated shape 86a, this phenomenon may be less than if the vacuum tank skin 66 radius did not vary with the longitudinal position.

Figure 4A:
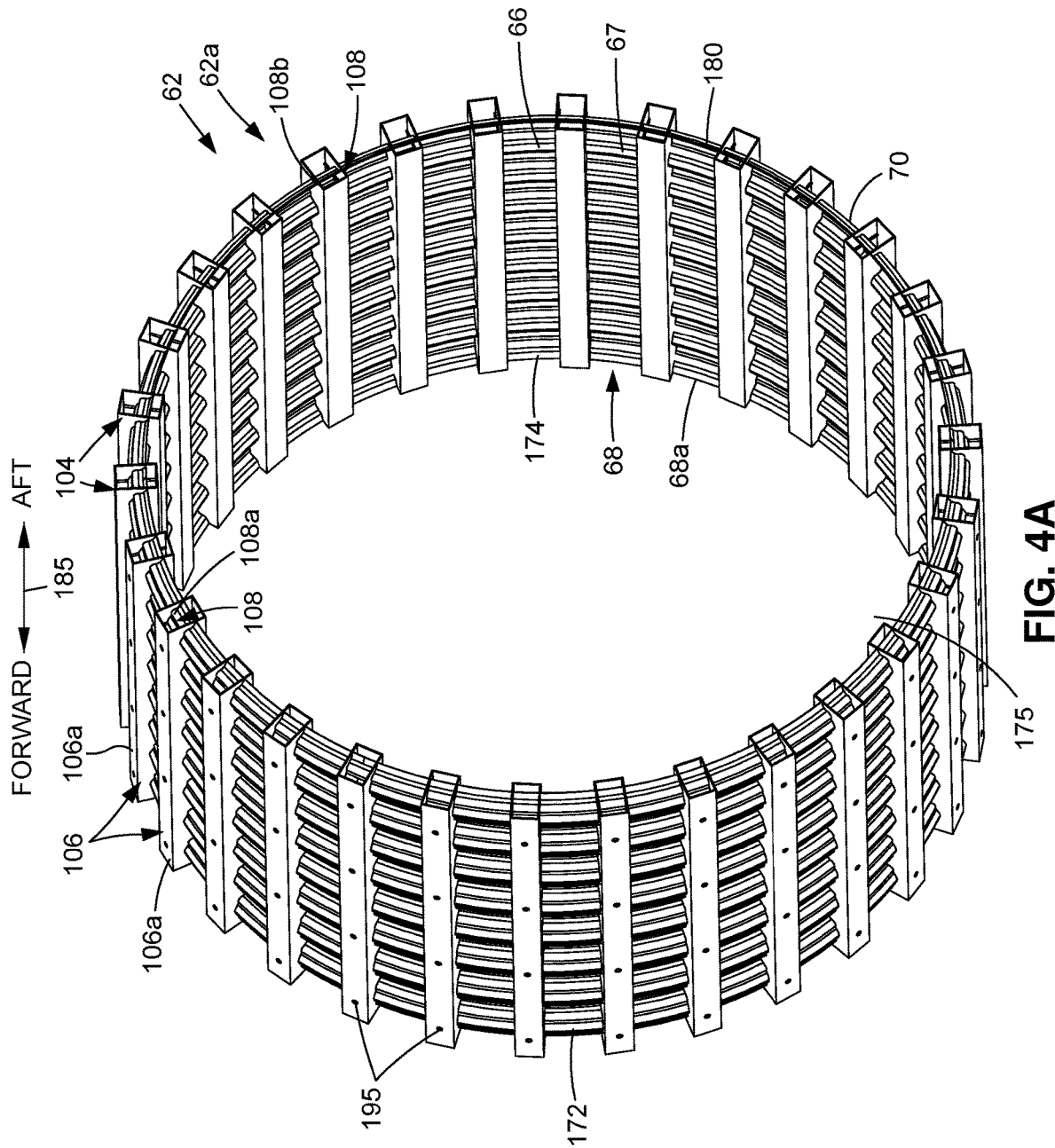
FIG. 4A is an illustration of a back perspective view of a version of an exemplary vacuum tank main portion of a structurally integrated vacuum tank of the disclosure.
Figure 4B:
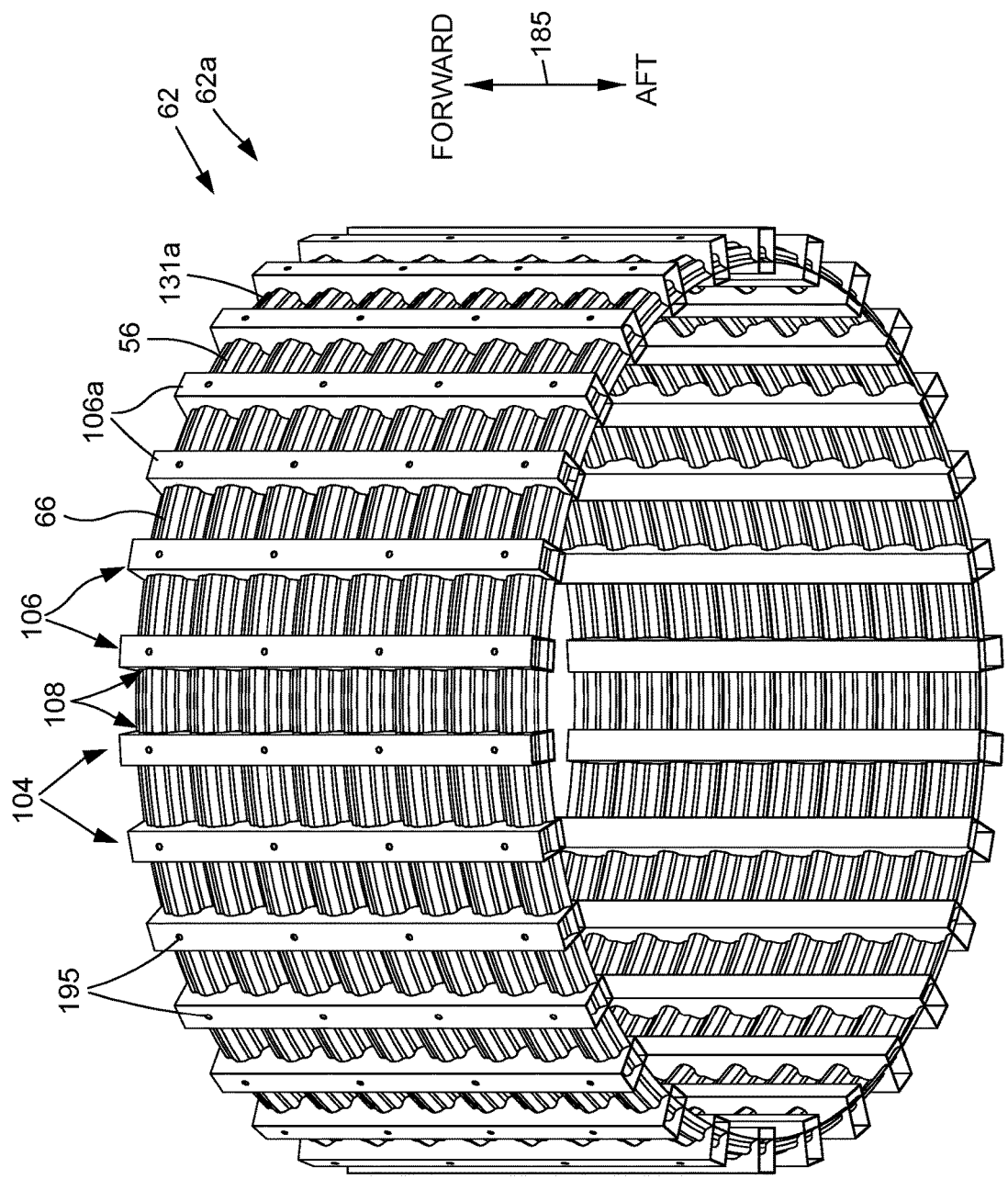
FIG. 4B is an illustration of a top perspective view of the vacuum tank main portion of FIG. 4A.
Figure 4C:
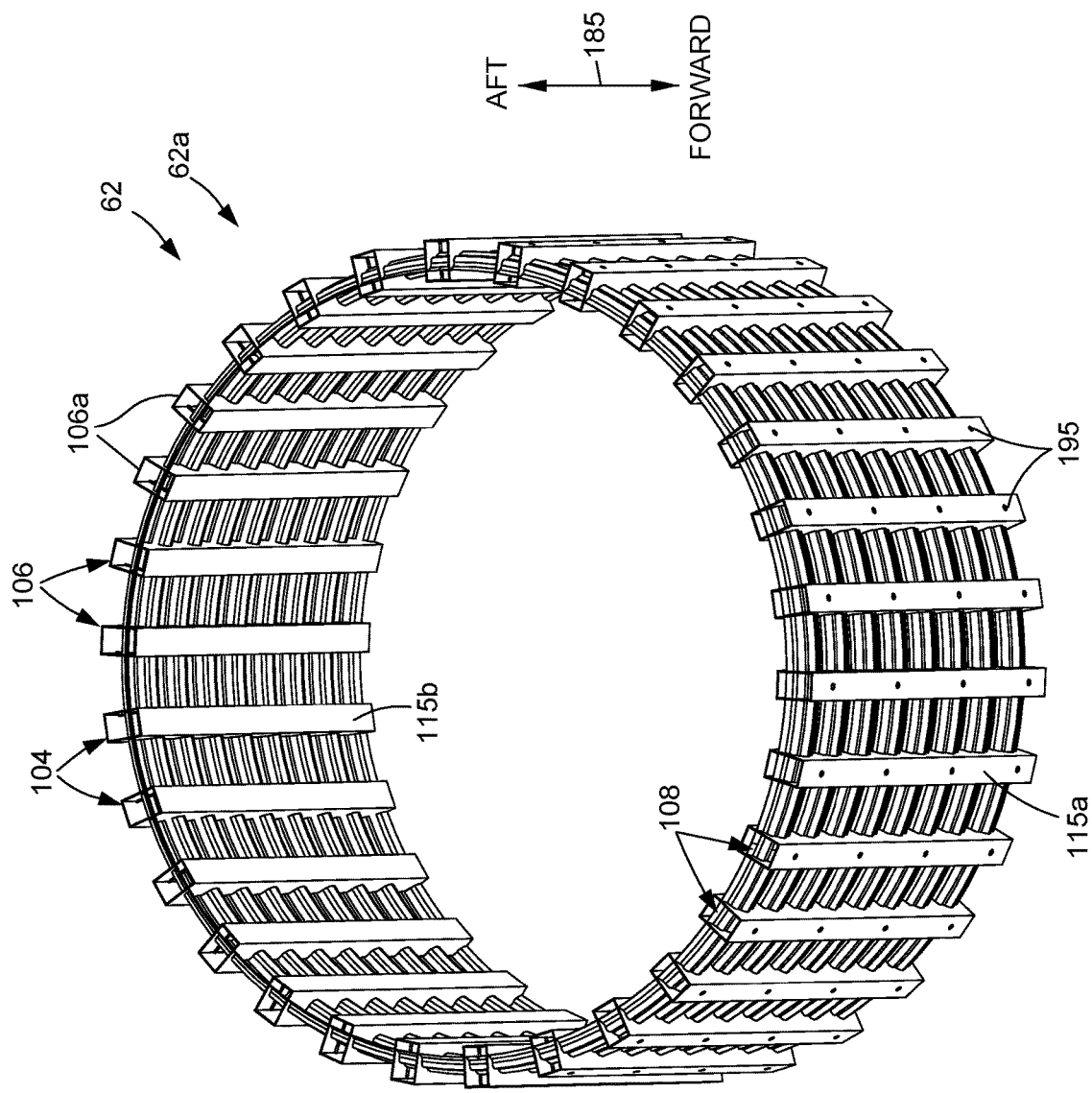
FIG. 4C is an illustration of a bottom perspective view of the vacuum tank main portion of FIG. 4A.
Figure 4D:
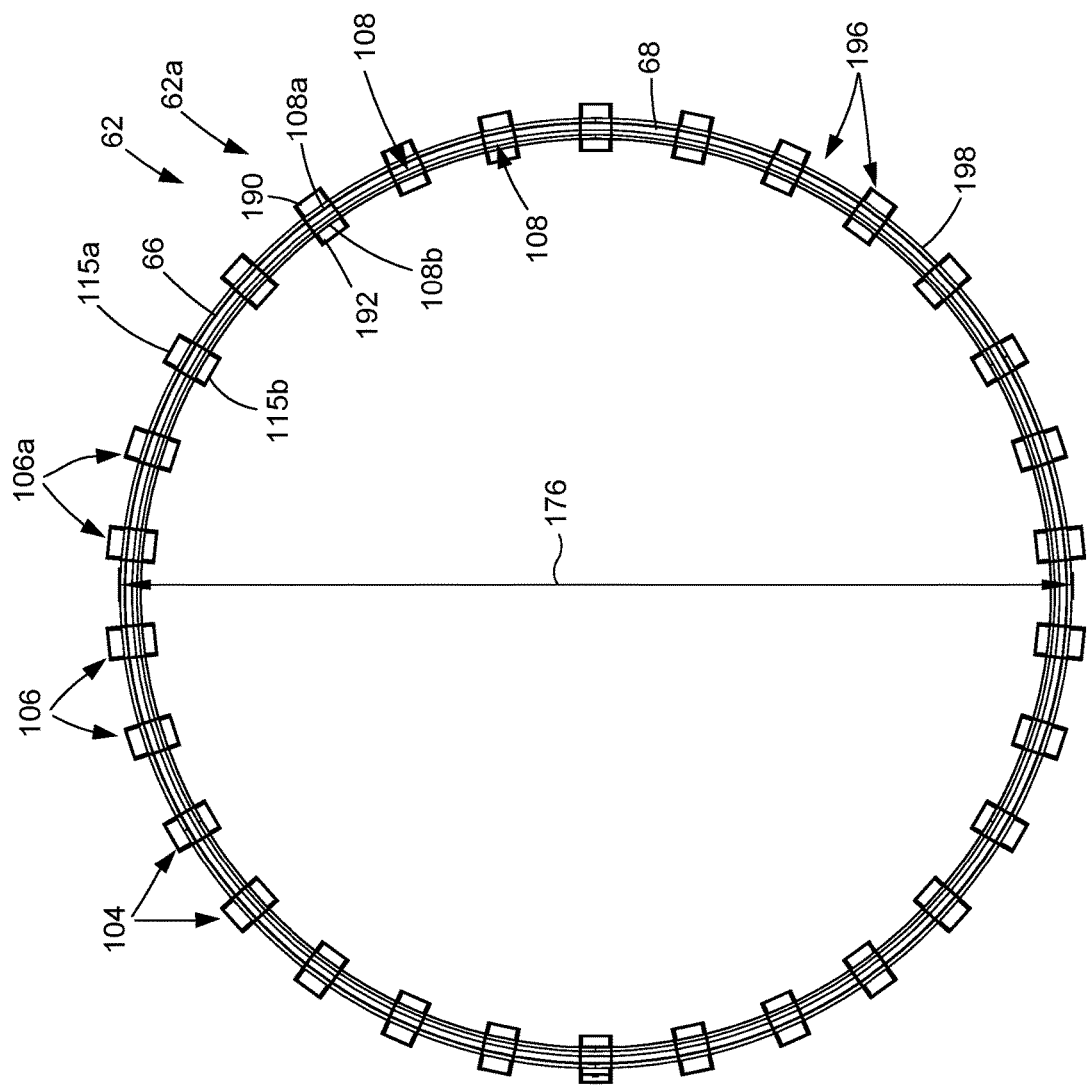
FIG. 4D is an illustration of a front view of the vacuum tank main portion of FIG. 4A.
Figure 4E:
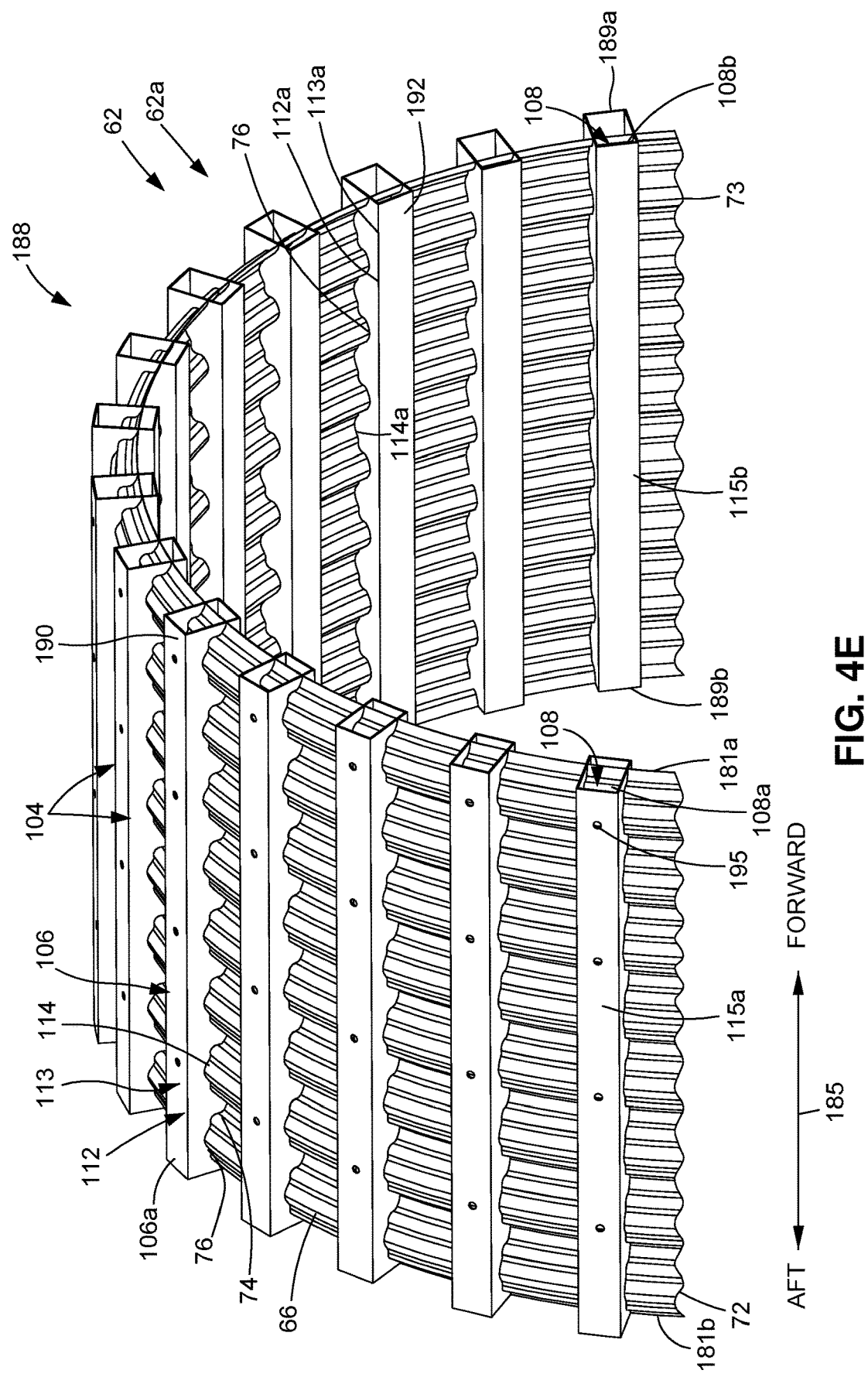
FIG. 4E is an illustration of an enlarged top right side front perspective view of a top portion of the vacuum tank main portion of FIG. 4A.
Figure 14A:
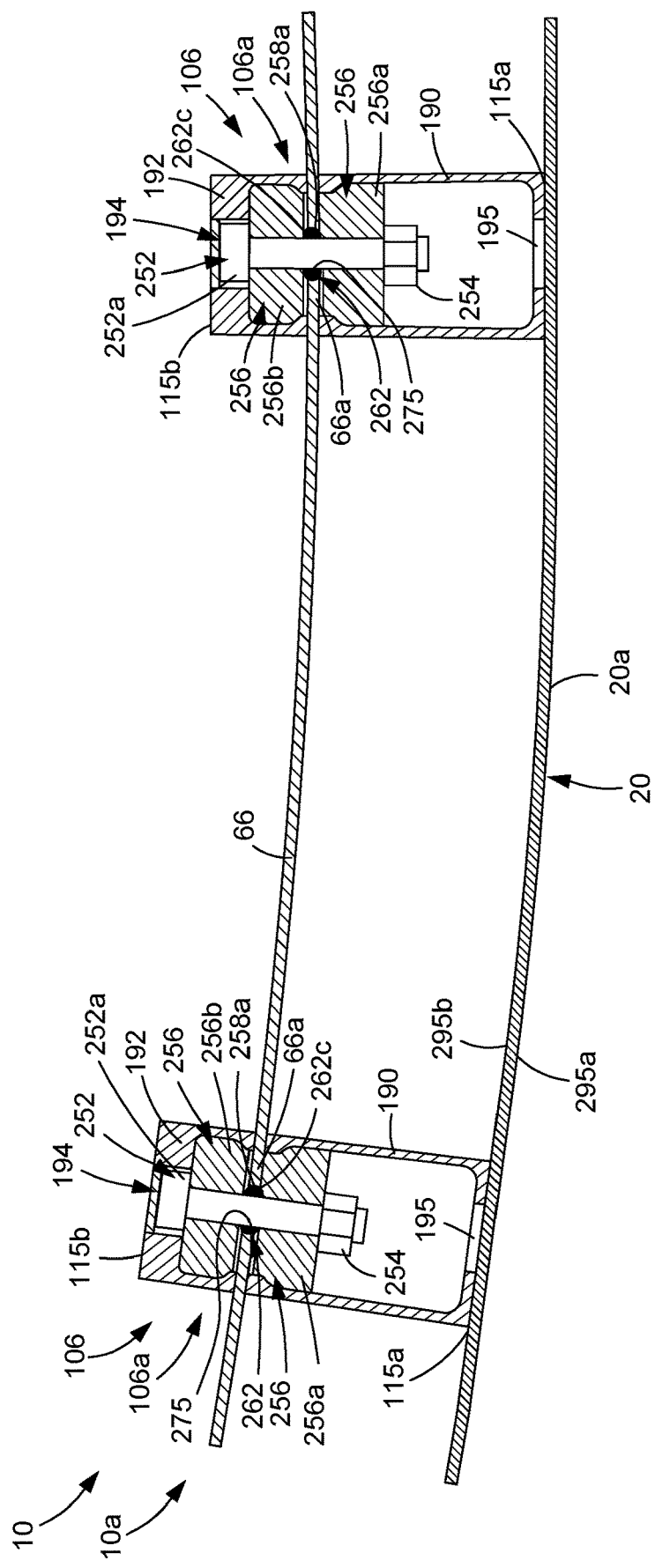
FIG. 14A is an illustration of a cross-sectional front view showing a vacuum tank skin sandwiched between box stringers and clamped together with fastener assemblies, and showing a continuous outer aero skin attached to the box stringer.

Each of the plurality of stiffener members 104, such as the stringers 106, or other suitable stiffener members, has an external profile 112 (see FIGS. 4E, 5B) that is preferably a substantially straight external profile 113 (see FIGS. 4E, 5B). Each of the plurality of stiffener members 104, such as the stringers 106, or other suitable stiffener members, further has an internal profile 114 (see FIGS. 4E, 5B) corresponding to the profile geometry 76 of the vacuum tank skin 66. Each of the plurality of stiffener members 104, such as the stringers 106, or other suitable stiffener members, further has an exterior side 115a (see FIGS. 4E, 5A) and may have an interior side 115b (see FIG. 4E). In one version, as shown in FIGS. 3A, 14A, the exterior side 115a of the stiffener members 104, such as the stringers 106, is coupled, or attached, to the outer aero skin 20. The exterior side 115a (see FIGS. 4E, 5B) of the stiffener members 104, such as the stringers 106, is substantially straight, which facilitates attachment to the outer aero skin 20. The outer aero skin 20 provides an aerodynamic surface for the fuselage 16 (see FIGS. 1, 2, 3A) at the fuselage mold line 22 (see FIGS. 1, 2). Since the vacuum tank skin 66 is already carrying flight loads 42, the outer aero skin 20 need not be structural. The outer aero skin 20 may be comprised of fiberglass, carbon composite, plastic, a fabric that is stretched and always in tension, or another suitable material. The outer aero skin 20 may be attached to the exterior side 115a or to the side or sides of the stiffener member 104, such as the stringer 106, with attachment elements, such as fasteners, bonding, or another suitable attachment element means. In another version, as shown in FIG. 14C, the structurally integrated vacuum tank 10 is configured without the outer aero skin 20, in an omitted outer aero skin configuration 21, so that the vacuum tank skin 66 and the stiffener members 104, such as the stringers 106, are exposed to an air flow 84b (see also FIG. 2) of the air 84 (see FIG. 2), such as the ambient air 84a (see FIG. 2).

Thus, in one version, the exterior side 115a of the stiffener members 104, such as the stringers 106, is attached to the outer aero skin 20 of the fuselage 16. In another version, without the outer aero skin 20, the exterior side 115a of the stiffener members 104, such as the stringers 106, is exposed, or open, to the air flow 84b of air 84. In either version, the stiffener members 104, such as the stringers 106, do not require attachment to fuselage frames, thus eliminating the need for such fuselage frame attachments for these stiffener members 104, such as stringers 106. The elimination of such fuselage frame attachments may result in decreased weight of the aircraft 14 and decreased overall part count in the manufacturing of the aircraft 14.

As shown in FIG. 2, the structurally integrated vacuum jacketed tank system 11a further comprises a pressure tank (PT) 116, such as an internal pressure tank (PT) 116a, mounted within the structurally integrated vacuum tank 10. The pressure tank 116 is configured to contain, and contains, the cryogenic fluid 48, such as the liquid hydrogen 50, the liquid natural gas 52, or another suitable cryogenic fluid 48. The cryogenic fluid 48 functions as a fuel to provide fuel power to the structure 12, such as the aircraft 14, or other structure. The pressure tank 116, such as the internal pressure tank 116a, carries the cryogenic fluid 48 under pressure. The primary stresses in the pressure tank 116, such as the internal pressure tank 116a, are tension in both the longitudinal and the hoop directions. As shown in FIG. 2, the pressure tank 116 has an exterior 118 and an interior 120.

Figure 3B:
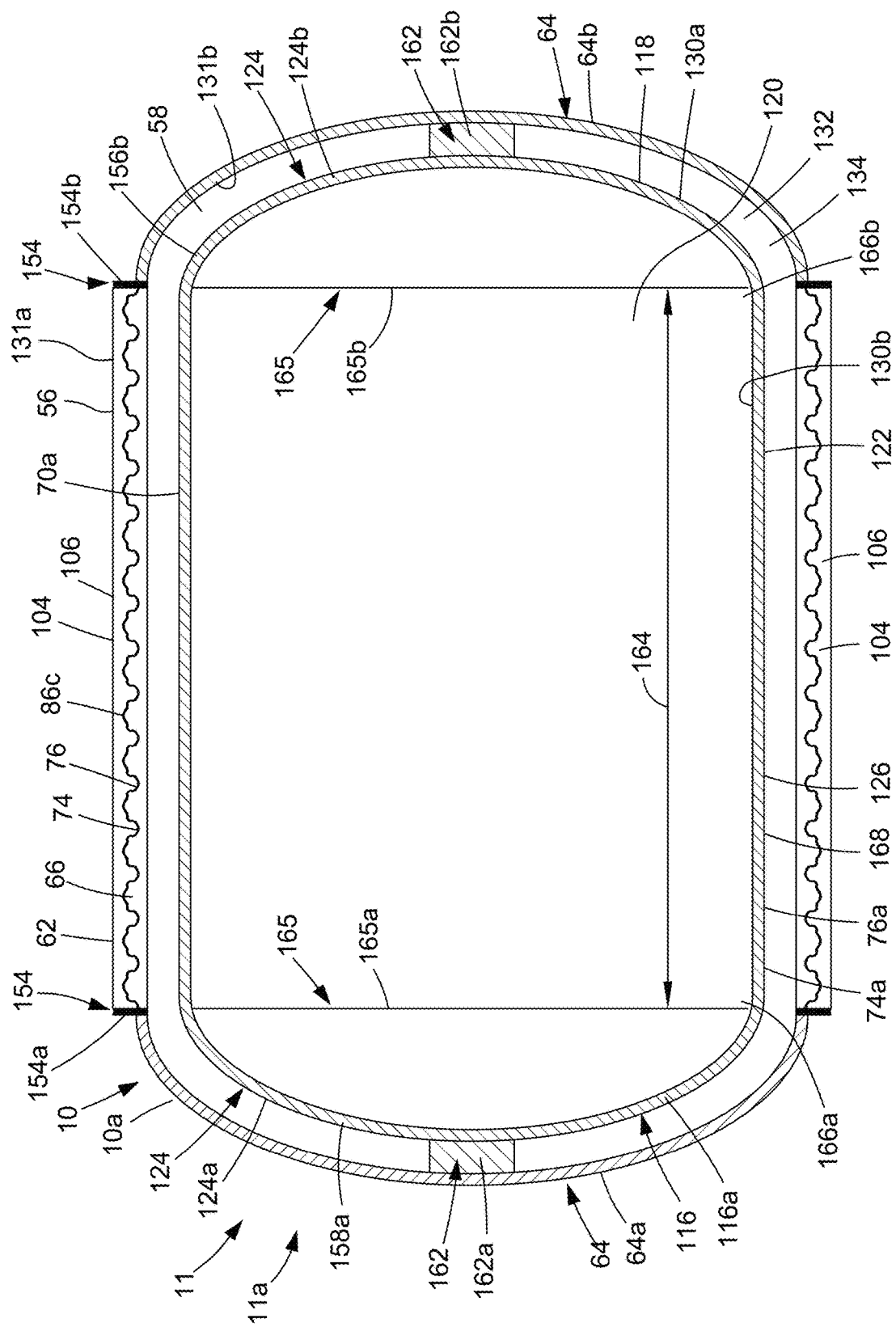
FIG. 3B is an illustration of a cross-sectional side view of the exemplary tank system of FIG. 3A, showing an exemplary pressure tank within the structurally integrated vacuum tank of the disclosure.

As shown in FIG. 3B, the pressure tank 116 has a pressure tank main portion 122 (see also FIG. 3C) extending between pressure tank end portions 124, such as a forward pressure tank end portion 124a and an aft pressure tank end portion 124b. The pressure tank main portion 122 has a pressure tank skin 126 (see FIG. 3B).

The pressure tank 116 is designed and made of a material (MAT.) 128 (see FIG. 2) that is durable and suitable to withstand the extremely low temperatures of the cryogenic fluid 48 stored in the pressure tank 116, such as the liquid hydrogen 50, the liquid natural gas 52, or another suitable cryogenic fluid 48. The structurally integrated vacuum tank 10, including the vacuum tank skin 66 and the stiffener members 104, such as the stringers 106, are also designed or made of the material 128 that is durable and suitable to withstand the extremely low temperatures of the cryogenic fluid 48, if the cryogenic fluid 48 stored in the pressure tank 116 is accidentally released and contacts the structurally integrated vacuum tank 10.

For example, for liquid hydrogen 50 to be in a fully liquid state at atmospheric pressure, the liquid hydrogen 50 needs to be cooled to 20.28 K (Kelvin) (minus 252.87 degrees C. (Celsius); minus 423.17 degrees F. (Fahrenheit)). Further, for example, for the liquid natural gas 52 to be in a fully liquid state at atmospheric pressure, the liquid natural gas 52 needs to be cooled to 110.93 K (Kelvin) (minus 162 degrees C. (Celsius); minus 260 degrees F. (Fahrenheit)).

In one version, the pressure tank 116 and/or the structurally integrated vacuum tank 10 are formed of a metal material (MAT.) 128a (see FIG. 2) including steel, stainless steel, aluminum alloy, titanium alloy, copper, copper alloy, or another suitable metal material. The pressure tank 116 and/or the structurally integrated vacuum tank 10 formed of the metal material 128a can be welded, can include fasteners 252 (see FIG. 12C), or can include other attachment mechanisms. In another version, the pressure tank 116 and/or the structurally integrated vacuum tank 10 are formed of a polymer material (MAT.) 128b (see FIG. 2), including thermoplastic, polytetrafluoroethylene (PTFE), polyetheretherketone (PEEK), high density polyethylene, polyamide, elastomer, rubber, or another suitable polymer material. In another version, the pressure tank 116 and/or the structurally integrated vacuum tank 10 are formed of a composite material (MAT.) 128c (see FIG. 2), including carbon fiber reinforced polymer (CFRP), or another suitable composite material. Carbon composite structures may be laid up and cured in a single step, and in one version, the vacuum tank skin 66 and the stiffener members 104, such as the stringers 106, may be manufactured with no holes, such as no fastener holes, so fasteners 252 (see FIG. 12C) might not be used. In another version, the pressure tank 116 and/or the structurally integrated vacuum tank 10 are formed or made of a combination of one or more of the metal materials 128a, the polymer materials 128b, and the composite materials 128c, or another suitable material 128 designed to withstand extremely low temperatures of the cryogenic fluid 48. The pressure tank 116 and the structurally integrated vacuum tank 10, including the vacuum tank skin 66 and the stiffener members 104, such as the stringers 106, may be made of the material 128 that is the same or may be made of the material 128 that is different.

As shown in FIG. 3B, the pressure tank 116 has a pressure tank outer surface 130a and a pressure tank inner surface 130b, and the structurally integrated vacuum tank 10 has a vacuum tank outer surface 131a and a vacuum tank inner surface 131b. In one version, the shape of the pressure tank outer surface 130a corresponds, or substantially corresponds, to the shape of the vacuum tank inner surface 131b. In another version, the shape of the pressure tank outer surface 130a does not correspond to the shape of the vacuum tank inner surface 131b. As shown in FIG. 3B, the pressure tank skin 126 has a pressure tank longitudinal cross section 74b (see FIG. 3B) with a pressure tank profile geometry 76a (see FIG. 3B) that may or may not correspond in shape to the longitudinal cross section 74 with the profile geometry 76 of the vacuum tank skin 66.

As shown in FIGS. 2, 3B, the tank system 11, such as the structurally integrated vacuum jacketed tank system 11a, further comprises a vacuum cavity 132 that forms a gap 134 between the pressure tank outer surface 130a and the vacuum tank inner surface 131b. The size of the gap 134 is a consequence of the geometry and design of the structurally integrated vacuum tank 10 and the pressure tank 116. For example, the gap 134 has a typical length of 1 (one) inch (2.54 centimeters). However, the gap 134 may have another suitable length. The pressure tank 116 may be designed to fit the internal mold surface of the structurally integrated vacuum tank 10, thus maximizing the volume of the pressure tank 116 relative to the enclosed volume of the structurally integrated vacuum tank 10. If the gap 134 is small, this may result in favorable efficiency.

As further shown in FIG. 2, in addition to the aircraft 14, the structure 12 may also comprise other vehicles such as a rotorcraft 136, a watercraft 138, a train 140, an automobile 142, a truck 144, or another suitable vehicle. Further, as shown in FIG. 2, the structure 12 may also comprise a non-vehicle structure, such as a power plant 146, a power station (PS) 148, including a portable power station (PS) 148a or a stationary power station (PS) 148b, or another suitable non-vehicle structure.

In another version of the disclosure, there is provided an aircraft 14 (see FIGS. 1, 2). The aircraft 14 comprises the fuselage 16 (see FIGS. 1, 2) with the plurality of fuselage barrel sections 18 (see FIG. 1), and the outer aero skin 20 (see FIGS. 1, 2) at the fuselage mold line 22 (see FIGS. 1, 2).

The aircraft 14 comprises the structurally integrated vacuum jacketed tank system 11a (see FIG. 2) comprising the structurally integrated vacuum tank 10 (see FIGS. 2, 3A-3B, 4A, 5A) integrated with the fuselage 16. As discussed above, the structurally integrated vacuum tank 10 has the vacuum tank main portion 62 (see FIG. 3A) extending between vacuum tank end portions 64 (see FIG. 3A). The vacuum tank main portion 62 comprises the vacuum tank skin 66 (see FIG. 2) forming the cylinder 68 (see FIG. 2).

The vacuum tank skin 66 has the longitudinal cross section 74 (see FIG. 2) with the profile geometry 76 (see FIG. 2) configured for buckling prevention 78 (see FIG. 2) for the vacuum tank skin 66 under external pressure loads 40

(see FIG. 2) and flight loads 42 (see FIG. 2). As shown in FIG. 2, the profile geometry 76 of the longitudinal cross section 74 of the vacuum tank skin 66 has a shape 86 comprising one or more of, a corrugated shape 86a, a sinusoidal shape 86b, a superimposed curves shape 86c, a symmetrical shape 86d, a non-symmetrical shape 86e, a pointed corner shape 86f, a hat shape 86g, or a fractal shape 86h.

The vacuum tank skin 66 is configured to provide a pressure barrier 80 (see FIG. 2) between an outside ambient pressure 82 (see FIG. 2) and the vacuum 60 (see FIG. 2) in the interior 58 (see FIGS. 2, 3A) of the structurally integrated vacuum tank 10. As discussed above, the structurally integrated vacuum tank 10 further has the plurality of stringers 106 (see FIGS. 2, 4A, 5A) coupled to surface portions 108 (see FIG. 4A) of the vacuum tank skin 66 and coupled to the outer aero skin 20. The plurality of stringers 106 and the vacuum tank skin 66 are configured to carry fuselage bending loads 110a (see FIG. 2). Each of the plurality of stringers 106 has an external profile 112 (see FIGS. 4E, 5B) that is a substantially straight external profile 113 (see FIGS. 4E, 5B), and an internal profile 114 (see FIGS. 4E, 5B) corresponding to the profile geometry 76 of the vacuum tank skin 66.

The structurally integrated vacuum jacketed tank system 11a further comprises the pressure tank 116 (see FIGS. 2, 3B) mounted within the structurally integrated vacuum tank 10, to obtain the structurally integrated vacuum jacketed tank system 11a. The pressure tank 116 contains the cryogenic fluid 48 (see FIGS. 2, 3C), such as liquid hydrogen 50 (see FIGS. 2, 3C), liquid natural gas 52 (see FIG. 2), or another suitable cryogenic fluid.

In another version, the structurally integrated vacuum tank 10 of the aircraft 14 is configured without the outer aero skin 20 in an omitted outer aero skin configuration 21 (see FIG. 14C), so that the vacuum tank skin 66 and the plurality of stringers 106 are exposed to the air flow 84b (see FIGS. 2, 14C) of the air 84 (see FIG. 2), such as the ambient air 84a (see FIG. 2).

Figure 3C:
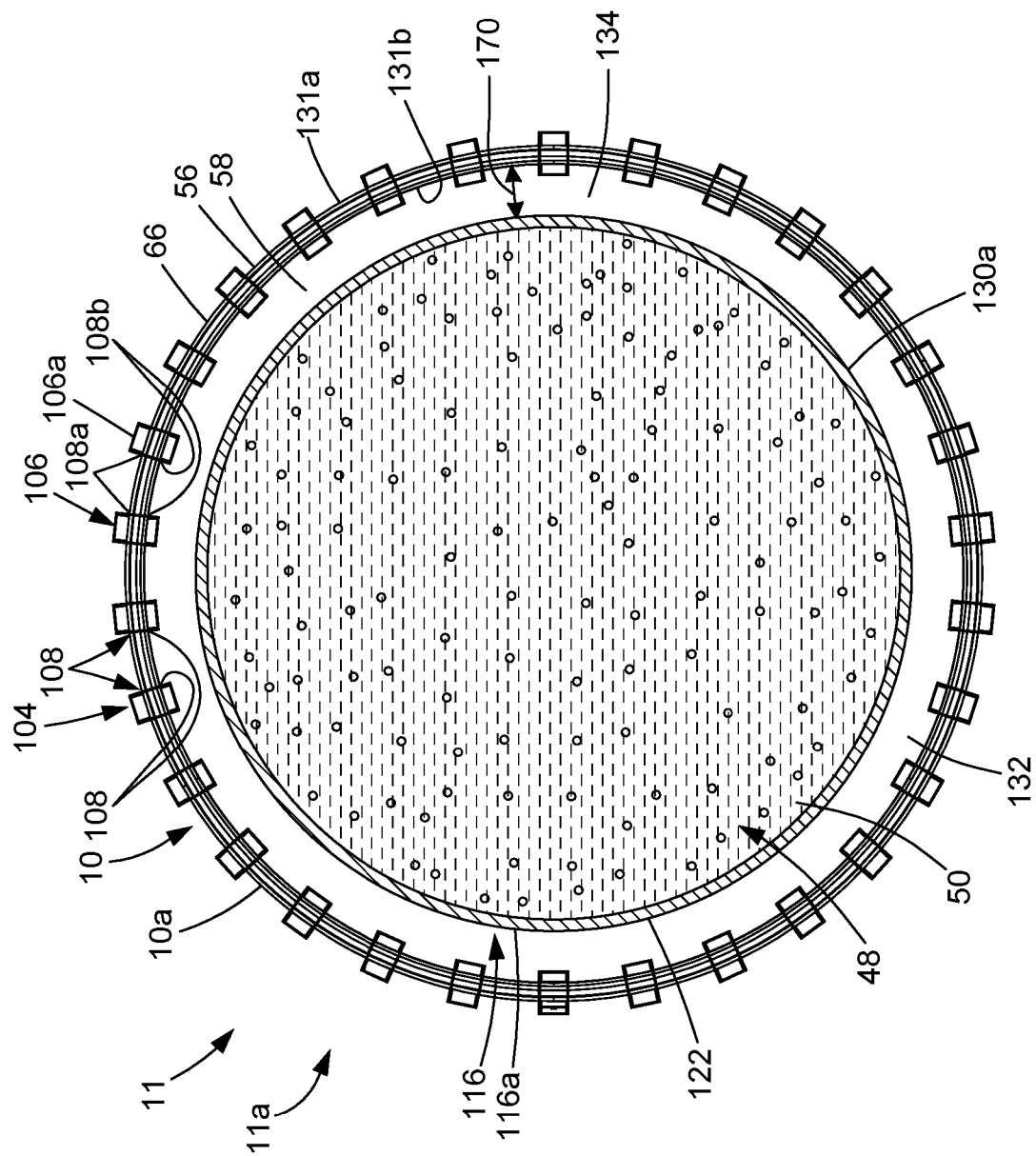
FIG. 3C is an illustration of a cross-sectional front view of the exemplary tank system of FIG. 3B, showing the pressure tank containing a cryogenic fluid.

Now referring to FIGS. 3A-3C, FIG. 3A is an illustration of a side view of an exemplary tank system 11, such as a structurally integrated vacuum jacketed tank system 11a, having a version of a structurally integrated vacuum tank 10, such as an external structurally integrated vacuum tank 10a, of the disclosure. FIG. 3B is an illustration of a cross-sectional side view of the exemplary tank system 11, such as the structurally integrated vacuum jacketed tank system 11a, of FIG. 3A, showing an exemplary pressure tank 116, such as an internal pressure tank 116a, within the structurally integrated vacuum tank 10, such as the external structurally integrated vacuum tank 10a, of the disclosure. FIG. 3C is an illustration of a cross-sectional front view of the exemplary tank system 11, such as the structurally integrated vacuum jacketed tank system 11a, of FIG. 3B, showing the structurally integrated vacuum tank 10, such as the external structurally integrated vacuum tank 10a, and the pressure tank 116, such as the internal pressure tank 116a, containing a cryogenic fluid 48, such as liquid hydrogen 50.

As shown in FIGS. 3A-3C, the structurally integrated vacuum tank 10 comprises the exterior 56 having the vacuum tank outer surface 131a, and the interior 58 (see FIGS. 3B-3C) having the vacuum tank inner surface 131b (see FIG. 3B). The structurally integrated vacuum tank 10 is under a vacuum 60 (see FIG. 2) in the interior 58. The structurally integrated vacuum tank 10 withstands external pressure caused by ambient air 84a (see FIG. 2) on the outside and on the exterior 56 of the structurally integrated vacuum tank 10 and the vacuum 60 inside the interior 58 of the structurally integrated vacuum tank 10.

As shown in FIGS. 3A-3B, the structurally integrated vacuum tank 10 has the vacuum tank main portion 62 extending between vacuum tank end portions 64, such as the forward vacuum tank end portion 64a and the aft vacuum tank end portion 64b. As shown in FIG. 3A, the vacuum tank main portion 62 has a vacuum tank main portion length 150. As further shown in FIG. 3A, the forward vacuum tank end portion 64a has a forward length 152a, and the aft vacuum tank end portion 64b has an aft length 152b. As shown in FIG. 3A, in this version of the structurally integrated vacuum tank 10, the forward length 152a and the aft length 152b are the same size lengths, and the forward length 152a and the aft length 152b are each less length size than the length size of the vacuum tank main portion length 150. In another version, the forward length 152a and the aft length 152b may be different size lengths.

As shown in FIGS. 3A-3B, the vacuum tank main portion 62 has end rings 154, including a forward end ring 154a and an aft end ring 154b. The forward end ring 154a is a structure attached around a circumference at a forward end 155a (see FIG. 3A) of the vacuum tank main portion 62, and the forward end ring 154a is positioned between the forward end 155a of the vacuum tank main portion 62 and the forward vacuum tank end portion 64a. The aft end ring 154b is a structure attached around a circumference at an aft end 155b (see FIG. 3A) of the vacuum tank main portion 62, and the aft end ring 154b is positioned between the aft end 155b of the vacuum tank main portion 62 and the aft vacuum tank end portion 64b.

In one version, as shown in FIG. 3A, the structurally integrated vacuum tank 10 has a spherocylinder shape 156, or capsule shape, comprising a three-dimensional geometric shape with the vacuum tank main portion 62 comprising the vacuum tank skin 66 forming the cylinder 68 (see FIGS. 4A, 5A) with the substantially cylindrical shape 70 (see FIGS. 4A, 5A), and the vacuum tank end portions 64 each have a semi-ellipsoid shape 158. In other versions, the vacuum tank end portions 64 may have a hemisphere shape, or another curved shape. In other versions, the structurally integrated vacuum tank 10 has another suitable three-dimensional geometric shape.

The vacuum tank main portion 62 has the vacuum tank skin 66 (see FIG. 3A). As shown in FIGS. 3A-3B, in this version, the vacuum tank skin 66 of the vacuum tank main portion 62 has the longitudinal cross section 74 with the profile geometry 76 comprising the superimposed curves shape 86c. However, in other versions, the vacuum tank skin 66 may have the longitudinal cross section 74 with the profile geometry 76 having another shape 86. The longitudinal cross section 74 with the profile geometry 76 is preferably configured for buckling prevention 78 (see FIG. 2) for the vacuum tank skin 66 to prevent buckling of the vacuum tank skin 66 under external pressure loads 40 (see FIG. 2), and the vacuum tank skin 66 is configured to provide a pressure barrier 80 (see FIG. 2) between the outside ambient pressure 82 (see FIG. 2) and the vacuum 60 (see FIG. 2) in the interior 58 of the structurally integrated vacuum tank 10. The vacuum tank skin 66 carries hoop compression resulting from this pressure difference.

FIGS. 3A-3B show the plurality of stiffener members 104, such as the plurality of stringers 106. As shown in FIG. 3A, stiffener members 104, such as stringers 106, for example, box stringers 106a, are coupled, or attached, to surface portions 108, such as outer surface portions 108a, along the vacuum tank outer surface 131a on the exterior 56 of the structurally integrated vacuum tank 10. In one version, as shown in FIG. 3A, the stiffener members 104, such as the stringers 106, are attached between the vacuum tank skin 66 and the outer aero skin 20 of the fuselage 16, and the fuselage structure 38 is integrated with the vacuum tank structure 36.

FIG. 3C shows the stiffener members 104, such as stringers 106, for example, box stringers 106a, coupled, or attached, to surface portions 108, such as outer surface portions 108a, of the vacuum tank skin 66, along the vacuum tank outer surface 131a on the exterior 56 of the structurally integrated vacuum tank 10, and to surface portions 108, such as inner surface portions 108b, of the vacuum tank skin 66, along the vacuum tank inner surface 131b on the interior 58 of the structurally integrated vacuum tank 10.

The stiffener members 104, such as the stringers 106, are coupled, or attached, for example, in one version, clamped with one or more fastener assemblies 194 (see FIGS. 12C-14D) to the vacuum tank skin 66. The stiffener members 104 and the vacuum tank skin 66 are configured to carry structural loads 109 (see FIG. 2). In particular, the stiffener members 104, such as stringers 106, and the vacuum tank skin 66 are configured to carry axial loads 111 (see FIG. 2), which enable the fuselage 16 to carry bending loads 110 (see FIG. 2).

As shown in FIG. 3B, the pressure tank 116, such as the internal pressure tank 116a, is mounted within the structurally integrated vacuum tank 10, and is attached to the interior 58 of the structurally integrated vacuum tank 10 with tank attach fittings 162, such as a forward tank attach fitting 162a and an aft tank attach fitting 162b. As shown in FIG. 3C, the pressure tank 116, such as the internal pressure tank 116a, is configured to contain, and contains, the cryogenic fluid 48 (see FIG. 3C), such as liquid hydrogen 50 (see FIG. 3C), liquid natural gas 52 (see FIG. 2), or another suitable cryogenic fluid 48.

As shown in FIG. 3B, the pressure tank 116 comprises the exterior 118 having the pressure tank outer surface 130a, and the interior 120 having the pressure tank inner surface 130b. As further shown in FIG. 3B, the pressure tank 116 comprises the pressure tank main portion 122 (see also FIG. 3C) extending between pressure tank end portions 124, such as the forward pressure tank end portion 124a and the aft pressure tank end portion 124b. As shown in FIG. 3B, the pressure tank main portion 122 has a pressure tank main portion length 164. In one version, the pressure tank main portion length 164 (see FIG. 3B) is the same length, or substantially the same length, as the vacuum tank main portion length 150 (see FIG. 3A).

As shown in FIG. 3B, the pressure tank main portion 122 has end boundaries 165, including a forward end boundary 165a and aft end boundary 165b. As shown in FIG. 3B, the forward end boundary 165a is positioned between a forward end 166a of the pressure tank main portion 122 and the forward pressure tank end portion 124a, and the aft end boundary 165b is positioned between an aft end 166b of the pressure tank main portion 122 and the aft pressure tank end portion 124b.

As shown in FIG. 3B, in one version, the pressure tank 116 has a spherocylinder shape 156a, or capsule shape, comprising a three-dimensional geometric shape with the pressure tank main portion 122 having a substantially cylindrical shape 70a, and the pressure tank end portions 124 each having a semi-ellipsoid shape 158a. In other versions, the pressure tank 116 has another suitable three-dimensional geometric shape.

The pressure tank main portion 122 has the pressure tank skin 126 (see FIG. 3B). As shown in FIG. 3B, in this version, the pressure tank skin 126 of the pressure tank main portion 122 has a pressure tank longitudinal cross section 74a with a pressure tank profile geometry 76a that is a substantially straight profile 168. However, in other versions, the pressure tank skin 126 may have the pressure tank longitudinal cross section 74a with the pressure tank profile geometry 76a having another suitable shape. The pressure tank profile geometry 76a of the pressure tank 116 may or may not correspond to the profile geometry 76 of the structurally integrated vacuum tank 10.

FIG. 3C shows the vacuum cavity 132 with the gap 134 between the pressure tank outer surface 130a of the pressure tank 116 and the vacuum tank inner surface 131b of the structurally integrated vacuum tank 10. The gap 134 is determined based on the geometry and design of the pressure tank 116 and the structurally integrated vacuum tank 10. As shown in FIG. 3C, the gap 134 has a width 170 from the pressure tank outer surface 130a to the vacuum tank inner surface 131b, and the width 170 of the gap 134 may be constant and uniform between the pressure tank 116 and the structurally integrated vacuum tank 10. The gap 134 shown in FIG. 3C is larger than what it might be in practice, and in practice, the gap 134 may be much smaller than shown in FIG. 3C.

Figure 3D:
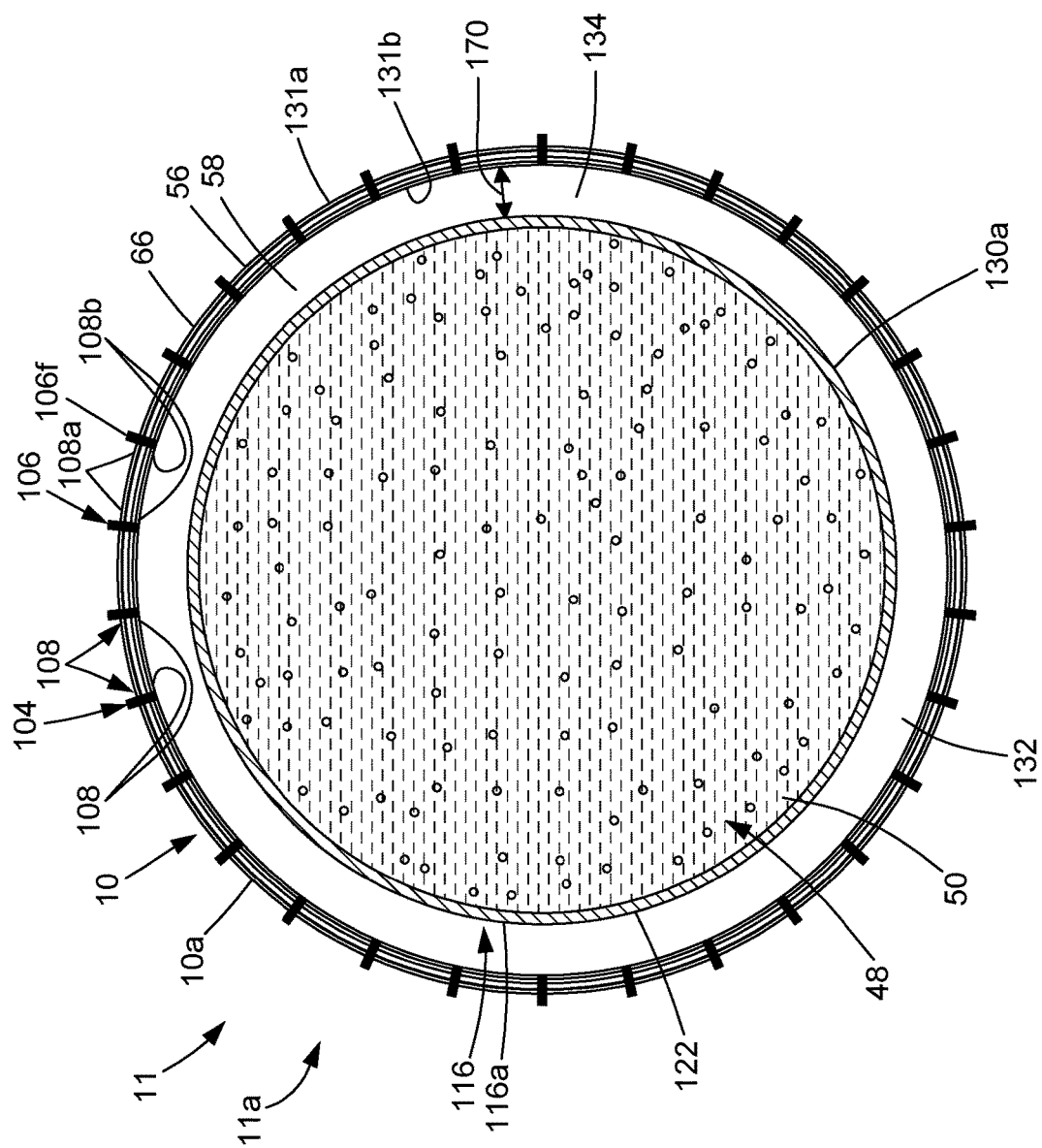
FIG. 3D is an illustration of a cross-sectional front view of another exemplary tank system showing blade stringers.

Now referring to FIG. 3D, FIG. 3D is an illustration of a cross-sectional front view of another exemplary tank system 11, such as the structurally integrated vacuum jacketed tank system 11a, showing the structurally integrated vacuum tank 10, such as the external structurally integrated vacuum tank 10a, and the pressure tank 116, such as the internal pressure tank 116a, containing the cryogenic fluid 48, such as liquid hydrogen 50, where stiffener members 104, such as stringers 106, for example, blade stringers 106f, are coupled, or attached, to surface portions 108, such as outer surface portions 108a, along the vacuum tank outer surface 131a on the exterior 56 of the structurally integrated vacuum tank 10, and to surface portions 108, such as inner surface portions 108b, along the vacuum tank inner surface 131b on the interior 58 of the structurally integrated vacuum tank 10. FIG. 3D shows thirty (30) blade stringers 106f coupled, or attached, to the vacuum tank skin 66. However, the number of blade stringers 106f coupled, or attached, to the vacuum tank skin 66 may be less than thirty (30) or greater than thirty (30) blade stringers 106f. FIG. 3D shows the pressure tank main portion 122. FIG. 3D further shows the vacuum cavity 132 with the gap 134 having the width 170 between the pressure tank outer surface 130a of the pressure tank 116 and the vacuum tank inner surface 131b of the structurally integrated vacuum tank 10. The gap 134 shown in FIG. 3D is larger than what it might be in practice, and in practice, the gap 134 may be much smaller than shown in FIG. 3D.

Figure 3E:
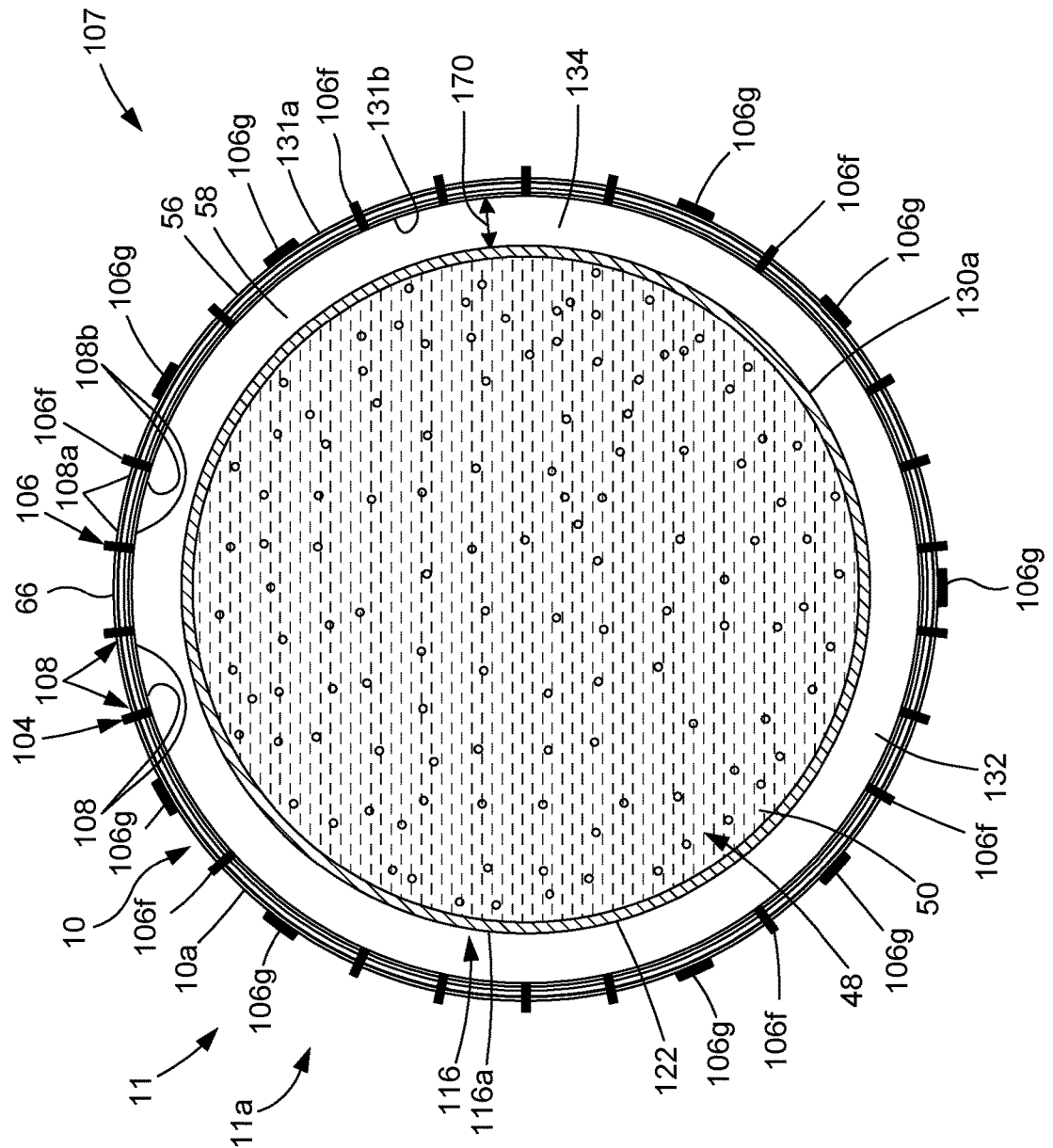
FIG. 3E is an illustration of a cross-sectional front view of another exemplary tank system showing a hybrid stringer arrangement of blade stringers and plank stringers.

Now referring to FIG. 3E, FIG. 3E is an illustration of a cross-sectional front view of another exemplary tank system 11, such as the structurally integrated vacuum jacketed tank system 11a, showing the structurally integrated vacuum tank 10, such as the external structurally integrated vacuum tank 10a, and the pressure tank 116, such as the internal pressure tank 116a, containing the cryogenic fluid 48, such as liquid hydrogen 50, where stiffener members 104, such as stringers 106, for example, blade stringers 106f and plank stringers 106g comprise a hybrid stringer arrangement 107. The hybrid stringer arrangement 107 comprises a combination of two or more types of stringers 106 coupled, or attached, to the vacuum tank skin 66. Alternatively, all of the stiffener members 104, such as stringers 106, may comprise all box stringers 106*a* (see FIG. 3C), all blade stringers 106*f* (see FIG. 3D), all plank stringers 106*g*, or all of another type of stringer 106.

As shown in FIG. 3E, the hybrid stringer arrangement 107 comprises blade stringers 106*f* coupled, or attached, to surface portions 108, such as outer surface portions 108*a*, along the vacuum tank outer surface 131*a* on the exterior 56 of the structurally integrated vacuum tank 10, and to surface portions 108, such as inner surface portions 108*b*, along the vacuum tank inner surface 131*b* on the interior 58 of the structurally integrated vacuum tank 10, and the hybrid stringer arrangement 107 comprises plank stringers 106*g* coupled, or attached, to surface portions 108, such as outer surface portions 108*a*, along the vacuum tank outer surface 131*a* on the exterior 56 of the structurally integrated vacuum tank 10. FIG. 3E shows twenty-two (22) blade stringers 106*f* coupled, or attached, to the vacuum tank skin 66, and shows nine (9) plank stringers 106*g* coupled, or attached, to the exterior 56 of the vacuum tank skin 66. However, the number of blade stringers 106*f* coupled, or attached, to the vacuum tank skin 66 may be less than twenty-two (22) or greater than twenty-two (22) blade stringers 106*f*, and the number of plank stringers 106*g* coupled, or attached, to the exterior 56 of the vacuum tank skin 66 may be less than nine (9) or greater than nine (9) plank stringers 106*g*.

FIG. 3E shows the pressure tank main portion 122. FIG. 3E further shows the vacuum cavity 132 with the gap 134 having the width 170 between the pressure tank outer surface 130*a* of the pressure tank 116 and the vacuum tank inner surface 131*b* of the structurally integrated vacuum tank 10. The gap 134 shown in FIG. 3E is larger than what it might be in practice, and in practice, the gap 134 may be much smaller than shown in FIG. 3E.

Figure 4F:
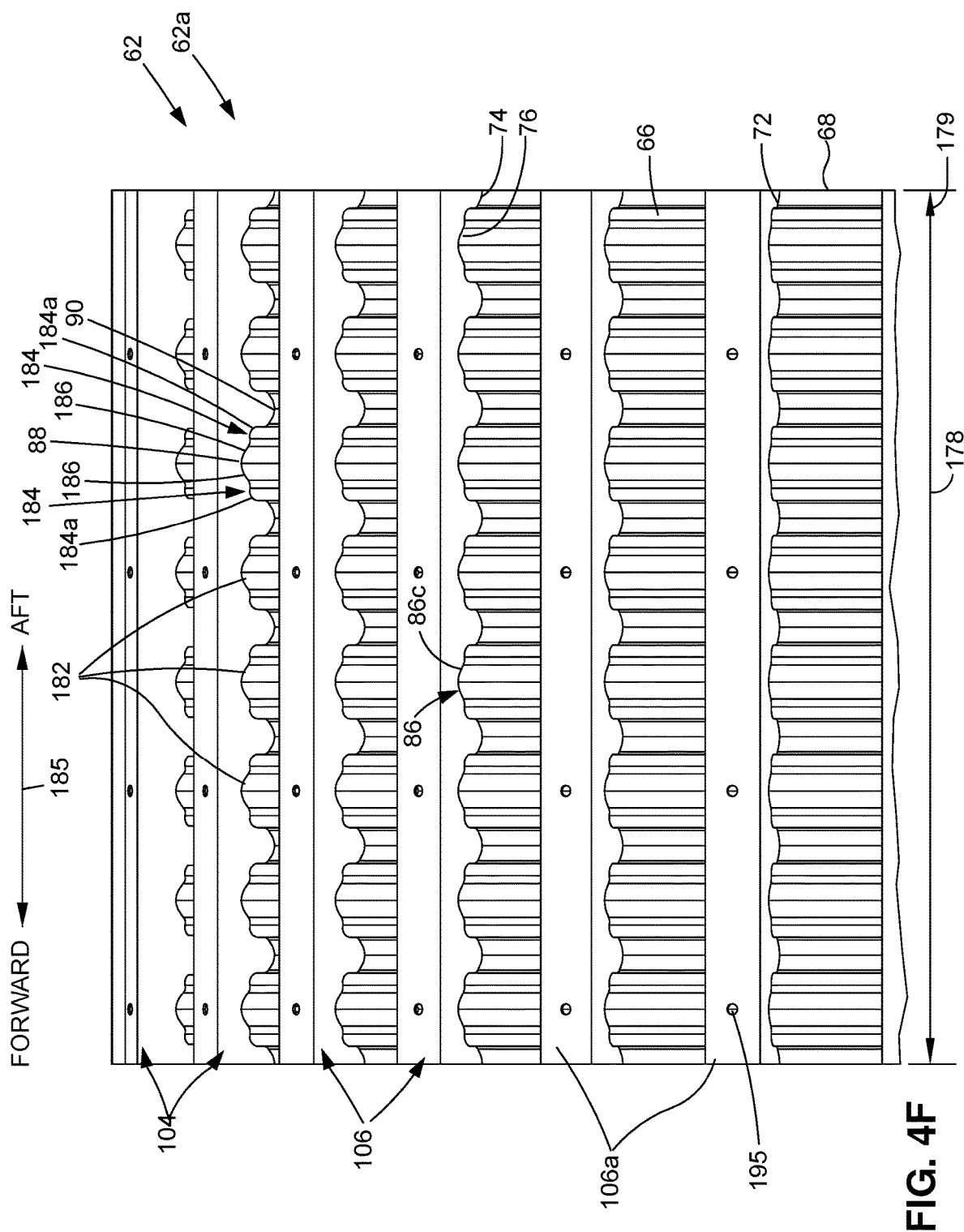
FIG. 4F is an illustration of an enlarged top perspective view of the vacuum tank main portion of FIG. 4A.
Figure 4G:
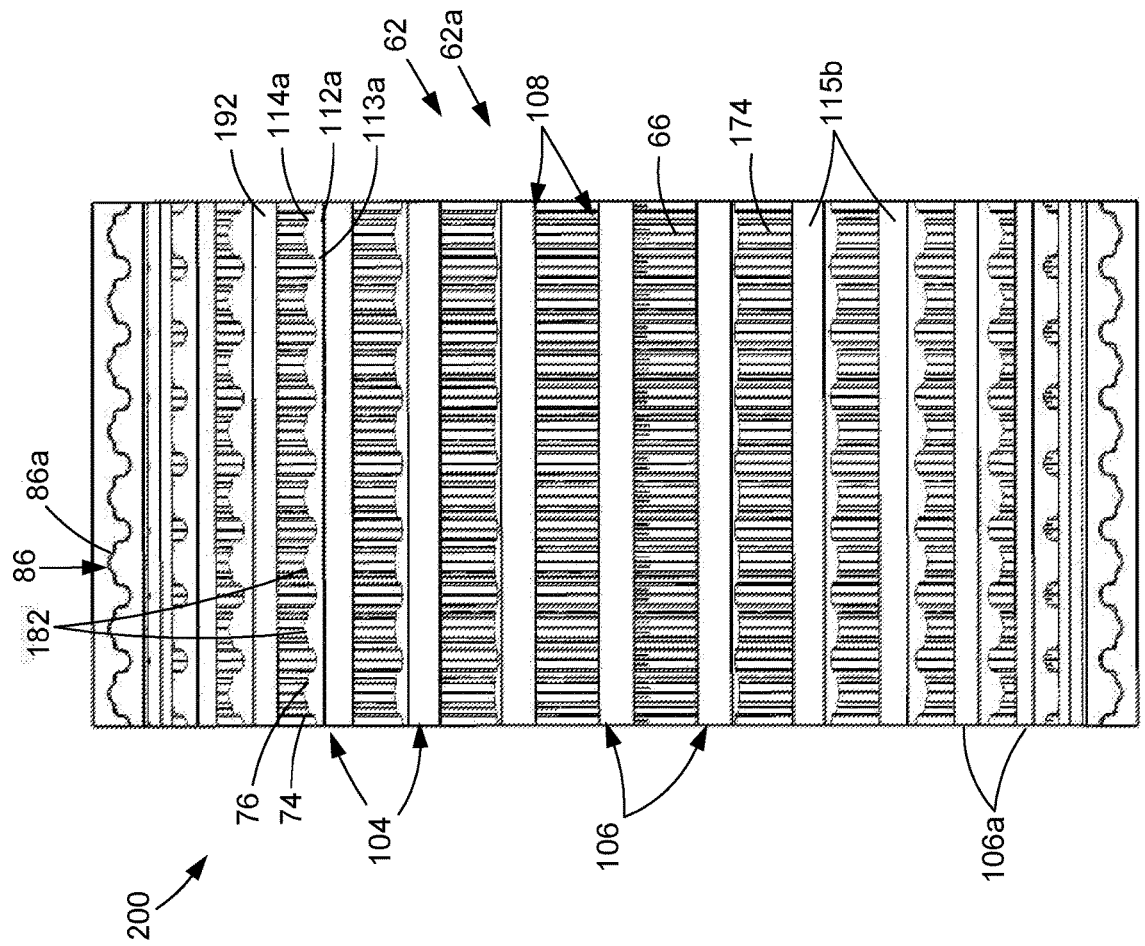
FIG. 4G is an illustration of a side cross-sectional view showing an interior portion of the vacuum tank main portion of FIG. 4A.
Figure 4H:
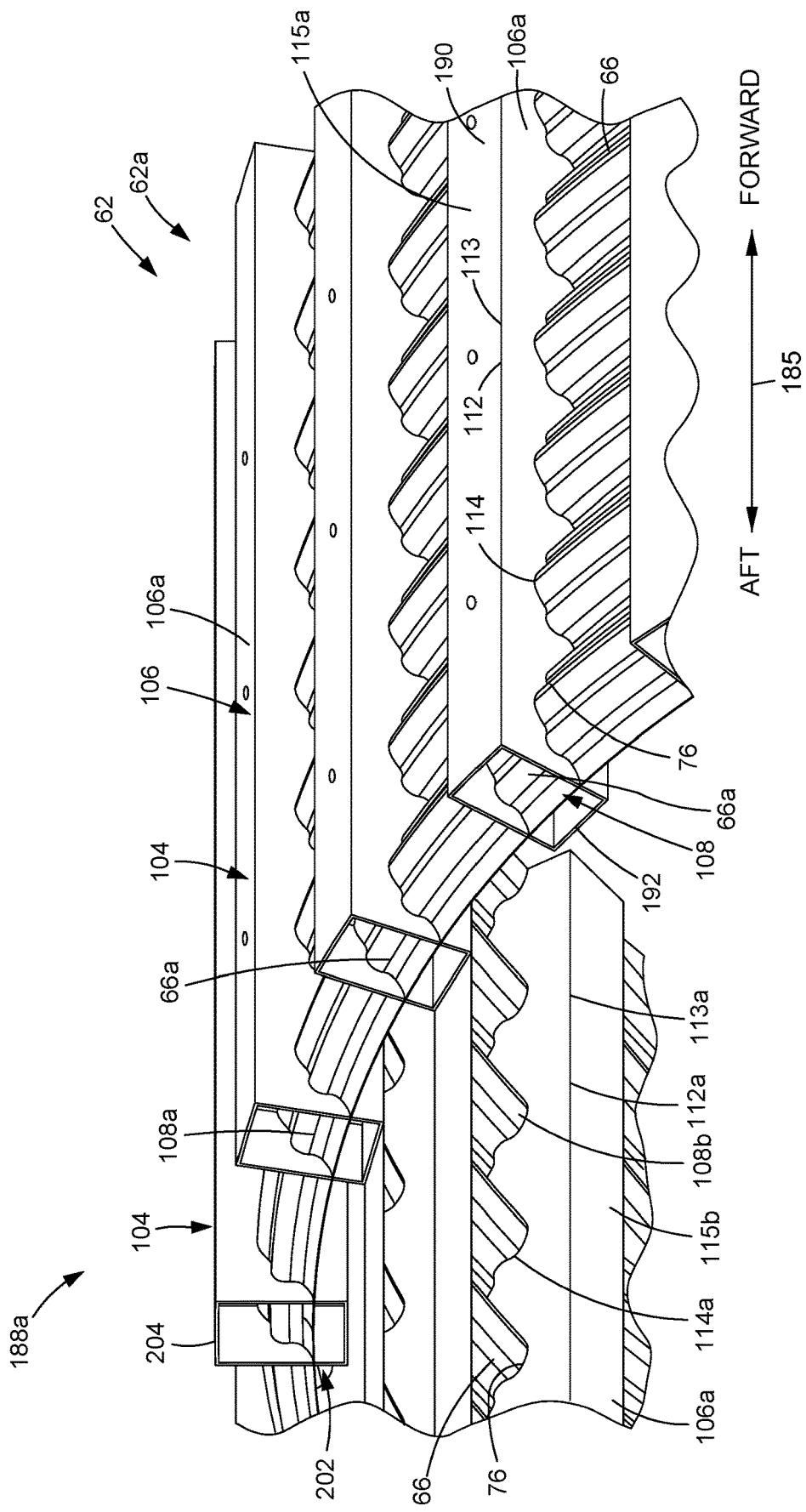
FIG. 4H is an illustration of an enlarged top right side back perspective view of a top portion of the vacuum tank main portion of FIG. 4A.

Now referring to FIGS. 4A-4H, FIGS. 4A-4H show a version of an exemplary vacuum tank main portion 62, such as vacuum tank main portion 62*a*, of a structurally integrated vacuum tank 10 (see FIGS. 2, 3A-3C), such as an external structurally integrated vacuum tank 10*a* (see FIGS. 2, 3A-3C), of the disclosure. FIG. 4A is an illustration of a back perspective view of a version of the vacuum tank main portion 62, such as vacuum tank main portion 62*a*, of the structurally integrated vacuum tank 10 (see FIGS. 2, 3A-3C), such as the external structurally integrated vacuum tank 10*a* (see FIGS. 2, 3A-3C), of the disclosure. FIG. 4B is an illustration of a top perspective view of the vacuum tank main portion 62, such as vacuum tank main portion 62*a*, of FIG. 4A. FIG. 4C is an illustration of a bottom perspective view of the vacuum tank main portion 62 of FIG. 4A. FIG. 4D is an illustration of a front view of the vacuum tank main portion 62, such as vacuum tank main portion 62*a*, of FIG. 4A. FIG. 4E is an illustration of an enlarged top right side front perspective view of a top portion 188 of the vacuum tank main portion 62, such as vacuum tank main portion 62*a*, of FIG. 4A. FIG. 4F is an illustration of an enlarged top perspective view in a longitudinal direction 179 of the vacuum tank main portion 62, such as vacuum tank main portion 62*a*, of FIG. 4A. FIG. 4G is an illustration of a side cross-sectional view showing an interior portion 200 of the vacuum tank main portion 62, such as vacuum tank main portion 62*a*, of FIG. 4A. FIG. 4H is an illustration of an enlarged top right side back perspective view of a top portion 188*a* of the vacuum tank main portion 62, such as vacuum tank main portion 62*a*, of FIG. 4A. FIGS. 4A, 4B, 4C, 4E, 4F, and 4G show a forward-aft direction 185 to indicate, for example, a forward end 155*a* (see FIG. 3A) of the vacuum tank main portion 62 and an aft end 155*b* (see FIG. 3B) of the vacuum tank main portion 62.

As shown in FIGS. 4A-4H, the vacuum tank main portion 62, such as vacuum tank main portion 62*a*, comprises the vacuum tank skin 66 and the plurality of stiffener members 104, such as the plurality of stringers 106, for example, in the form of box stringers 106*a*, clamping surface portions 108 of the vacuum tank skin 66. As shown in FIG. 4A, the plurality of stiffener members 104, such as the plurality of stringers 106, are coupled, or attached, to various surfaces portions 108 of the vacuum tank skin 66, including outer surface portions 108*a* and inner surface portions 108*b*. The vacuum tank skin 66 and the plurality of stiffener members 104, such as the stringers 106, or other suitable stiffener members, carry bending loads 110 (see FIG. 2). The plurality of stiffener members 104, such as the stringers 106, or other suitable stiffener members, primarily carry flight loads 42. The vacuum tank skin 66 carries some flight loads 42 (see FIG. 2), such as fuselage torsion.

As shown in FIG. 4A, in this version, the vacuum tank skin 66 forms a cylinder 68, such as an untapered cylinder 68*a*, with a substantially cylindrical shape 70. In another version, the cylinder 68 may comprise a tapered cylinder 68*b* (see FIG. 16A). As shown in FIG. 4A, the vacuum tank skin 66 has an exterior side 172 and an interior side 174. As shown in FIG. 4A, the cylinder 68 formed by the vacuum tank skin 66 has an interior 175 that is open and configured to contain the pressure tank main portion 122 (see FIG. 3C) of the pressure tank 116 (see FIG. 3C). As shown in FIG. 4D, the cylinder 68 formed by the vacuum tank skin 66 has an outer diameter 176. The outer diameter 176 has a length preferably in a range of 6 (six) feet (1.8 meters) to 20 (twenty) feet (6.1 meters) long. The outer diameter 176 may have another suitable length. As shown in FIG. 4F, the vacuum tank skin 66 has a length 178 in a longitudinal direction 179. The length 178 of the vacuum tank skin 66 is preferably in a range of 6 (six) feet (1.8 meters) to 20 (twenty) feet (6.1 meters) long. More preferably, the length 178 is 10 (ten) feet (3.0 meters) long, 15 (fifteen) feet (4.6 meters) long, 20 (twenty) feet (6.1 meters) long, or another suitable length greater than 20 (twenty) feet (6.1 meters).

The vacuum tank skin 66 is a lightweight, single-shell skin 67 (see FIG. 4A) and comprises a continuous sheet 180 (see FIGS. 4A, 15B, 16B) that is capable of sustaining significant levels of external pressure, such as external pressure loads 40 (see FIG. 2). The vacuum tank skin 66 may be made of a metal material 128*a* (see FIG. 2) including aluminum, aluminum alloy, steel, stainless steel, titanium alloy, copper, copper alloy, or another suitable metal material, may be made of a polymer material 128*b* (see FIG. 2), including thermoplastic, polytetrafluoroethylene (PTFE), polyetheretherketone (PEEK), high density polyethylene, polyamide, elastomer, rubber, or another suitable polymer material, may be made of a composite material 128*c* (see FIG. 2), including carbon fiber reinforced polymer (CFRP), or another suitable composite material, may be made of a combination of one or more of the metal materials 128*a*, the polymer materials 128*b*, and the composite materials 128*c*, or may be made of another suitable material 128.

The vacuum tank skin 66 provides a pressure barrier 80 (see FIG. 2) between the outside ambient pressure 82 (see FIG. 2) and the vacuum 60 (see FIG. 2) in the interior 58 (see FIG. 3B) of the structurally integrated vacuum tank 10 (see FIG. 3B) including the interior 175 (see FIG. 4D) of the cylinder 68. The vacuum tank skin 66 carries hoop compression resulting from this pressure difference. Further, the vacuum tank skin 66 carries some flight loads 42 (see FIG. 2), such as fuselage torsion, when the structure 12 (see FIG. 2) comprises an aircraft 14 (see FIG. 2).

As shown in FIG. 4E, the vacuum tank skin 66 has an outer mold line 72 and an inner mold line 73, a first end 181a or forward end, and a second end 181b or aft end. As shown in FIG. 4F, the vacuum tank skin 66 has a longitudinal cross section 74 with a profile geometry 76 configured for buckling prevention 78 (see FIG. 2) for the vacuum tank skin 66 under external pressure loads 40 (see FIG. 2). As further shown in FIG. 4F, the profile geometry 76 of the longitudinal cross section 74 of the vacuum tank skin 66 has a shape 86 comprising a superimposed curves shape 86c. As further shown in FIG. 4F, the profile geometry 76 comprises repeating patterns 182 of superimposed curves shapes 86c. As shown in FIG. 4F, each superimposed curves shape 86c comprises a peak 88 or crest, a valley 90 or trough, and two curves 184, such as superimposed curves 184a, that are outwardly formed along sides 186 downwardly sloped from the peak 88. As shown in FIG. 4F, the two curves 184, such as the superimposed curves 184a, are symmetric with respect to the peak 88.

As shown in FIG. 4E, which shows a top portion 188 of the vacuum tank main portion 62, such as vacuum tank main portion 62a, each of the plurality of stiffener members 104, such as the stringers 106, or other suitable stiffener members, has the external profile 112 that is preferably a substantially straight external profile 113, and each has an internal profile 114 corresponding to the profile geometry 76 of the vacuum tank skin 66. Each of the plurality of stiffener members 104, such as the stringers 106, or other suitable stiffener members, further has the exterior side 115a (see FIGS. 4C-4E), the interior side 115b (see FIGS. 4C-4E), a first end 189a (see FIG. 4E) or forward end, and a second end 189b (see FIG. 4E) or aft end. The exterior side 115a (see FIGS. 4C-4E) of the stiffener members 104, such as the stringers 106, is substantially straight, which facilitates attachment to the outer aero skin 20 (see FIGS. 3A, 14A).

The stiffener members 104, such as the stringers 106, for example, the box stringers 106a, may be made of a metal material 128a (see FIG. 2) including aluminum, aluminum alloy, steel, stainless steel, titanium alloy, copper, copper alloy, or another suitable metal material, may be made of a polymer material 128b (see FIG. 2), including thermoplastic, polytetrafluoroethylene (PTFE), polyetheretherketone (PEEK), high density polyethylene, polyamide, elastomer, rubber, or another suitable polymer material, may be made of a composite material 128c (see FIG. 2), including carbon fiber reinforced polymer (CFRP), or another suitable composite material, may be made of a combination of one or more of the metal materials 128a, the polymer materials 128b, and the composite materials 128c, or may be made of another suitable material 128. The vacuum tank skin 66 and the stiffener members 104, such as the stringers 106, may be made of the material 128 that is the same or may be made of the material 128 that is different.

As shown in FIGS. 4A-4E, the plurality of stiffener members 104, such as the stringers 106, comprise box stringers 106a. As shown in FIGS. 4D, 4E, 4H, each box stringer 106a is comprised of two pieces including an outer section 190 and an inner section 192, where the outer section 190 and the inner section 192 clamp surface portions 108, such as outer surface portions 108a and inner surface portions 108b, of the vacuum tank skin 66. As shown in FIGS. 4E, 4H, the outer section 190 of the box stringer 106a comprises the external profile 112, such as the substantially straight external profile 113, and the internal profile 114 corresponding to the profile geometry 76 of the vacuum tank skin 66. As further shown in FIGS. 4E, 4H, the inner section 192 of the box stringer 106a comprises an external profile 112a, such as the substantially straight external profile 113a, and an internal profile 114a that complements and fits together with the internal profile 114 of the outer section 190, and the vacuum tank skin 66 is clamped between the outer section 190 and the inner section 192. As shown in FIG. 4E, the internal profile 114 of the stiffener members 104, such as the stringers 106, for example box stringers 106a, also follows the outer mold line 72 of the vacuum tank skin 66, and the internal profile 114a of the stiffener members 104, such as the stringers 106, for example box stringers 106a, also follows the inner mold line 73 of the vacuum tank skin 66. The shape of the stiffener members 104, such as the stringers 106, for example, the box stringers 106a, are such that they intersect with the outer mold line 72 and the inner mold line 73 of the vacuum tank skin 66.

As shown in FIGS. 4A-4H, in this version, the stiffener members 104, such as the stringers 106, for example, the box stringers 106a, clamp the vacuum tank skin 66. The attachment means for attaching or coupling the stiffener members 104, such as the stringers 106, to the vacuum tank skin 66 comprise fastener assemblies 194 (see FIG. 12C), or another suitable attachment means, discussed in further detail below. As shown in FIGS. 4A-4C, 4E-4F, 4H, each stiffener member 104, such as the stringer 106, for example, the box stringer 106a, comprises openings 195 formed in the exterior side 115a (see FIGS. 4E, 4H). Each opening 195 is configured to receive a fastener assembly 194 (see FIG. 12C).

In one version of the vacuum tank main portion 62 of the structurally integrated vacuum tank 10 (see FIGS. 2, 3A-3C), FIGS. 4A-4D show thirty (30) stiffener members 104, such as the stringers 106, for example, the box stringers 106a, arranged in an equal distance spaced relationship 196 (see FIG. 4D) around a circumference 198 (see FIG. 4D) of the cylinder 68 formed from the vacuum tank skin 66. In other versions, the number of stiffener members 104, such as the stringers 106, may be less than thirty (30) or more than thirty (30). In another version of the vacuum tank main portion 62 of the structurally integrated vacuum tank 10 (see FIGS. 2, 3A-3C), FIG. 7A shows forty-six (46) stiffener members 104, such as the stringers 106.

FIG. 4G shows a side cross-sectional view of an interior portion 200 of the vacuum tank main portion 62, such as vacuum tank main portion 62a, of FIG. 4A. FIG. 4G shows the stiffener members 104, such as the stringers 106, for example, the box stringers 106a, and the interior sides 115b of the stiffener members 104, such as the stringers 106, for example, the box stringers 106a. FIG. 4G further shows the inner sections 192 of the box stringers 106a, where each inner section 192 has the external profile 112a, such as the substantially straight external profile 113a, and has the internal profile 114a that complements and fits together with the internal profile 114 of the outer section 190, and the vacuum tank skin 66 is clamped between the outer section 190 and the inner section 192. FIG. 4G further shows the interior side 174 of the vacuum tank skin 66 and the longitudinal cross section 74 with the profile geometry 76 having the shape 86 comprising the superimposed curves shape 86c in repeating patterns 182.

FIG. 4H shows an enlarged view of a top portion 188a of the vacuum tank main portion 62, such as vacuum tank main portion 62a, of FIG. 4A. FIG. 4H shows the stiffener members 104, such as the stringers 106, for example, the box stringers 106a, and the exterior sides 115a and the interior sides 115b of the stiffener members 104, such as the stringers 106, for example, the box stringers 106a. FIG. 4H further shows the outer sections 190 and the inner sections 192 of the box stringers 106a. As shown in FIG. 4H, each outer section 190 has the external profile 112, such as the substantially straight external profile 113, and has the internal profile 114 corresponding to the profile geometry 76 of the vacuum tank skin 66, and each inner section 192 has the external profile 112a, such as the substantially straight external profile 113a, and has the internal profile 114a that complements and fits together with the internal profile 114 of the outer section 190. As shown in FIG. 4H, the outer section 190 and the inner section 192 of each box stringer 106a are joined together in a joined position 202 to form the box stringer 106a having a box-shaped cross section 204. As further shown in FIG. 4H, surface portions 108 of the vacuum tank skin 66 are clamped between the outer sections 190 and the inner sections 192 of the box stringer 106a to form clamped vacuum tank skin portions 66a.

Figure 5A:
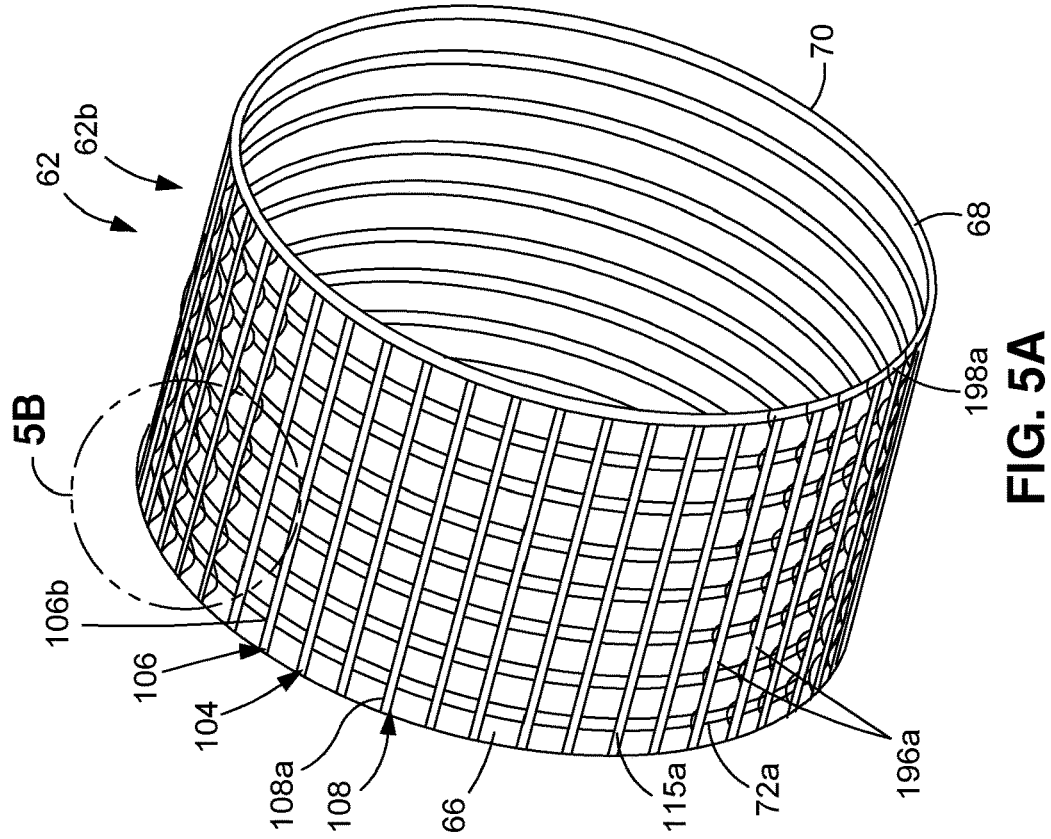
FIG. 5A is an illustration of a front right side perspective view of another version of an exemplary vacuum tank main portion of a structurally integrated vacuum tank of the disclosure.

Now referring to FIGS. 5A-5B, FIG. 5A is an illustration of a front right side perspective view of another version of an exemplary vacuum tank main portion 62, such as vacuum tank main portion 62b, of a structurally integrated vacuum tank 10 (see FIG. 2), such as an external structurally integrated vacuum tank 10a (see FIG. 2) of the disclosure, and FIG. 5B is an illustration of an enlarged top perspective view of a portion 62c of the vacuum tank main portion 62, such as vacuum tank main portion 62b, in circle 5B of FIG. 5A.

As shown in FIGS. 5A-5B, the vacuum tank main portion 62, such as vacuum tank main portion 62b, comprises the vacuum tank skin 66 and the plurality of stiffener members 104, such as the plurality of stringers 106, for example, in the form of T-shaped stringers 106b, coupled, or attached, to surface portions 108, such as outer surface portions 108a, of the vacuum tank skin 66. FIG. 5A show the stiffener members 104, such as the stringers 106, for example, the T-shaped stringers 106b, arranged in an equal distance spaced relationship 196a around a circumference 198a of the cylinder 68 formed from the vacuum tank skin 66.

The vacuum tank skin 66 and the plurality of stiffener members 104, such as the stringers 106, for example, the T-shaped stringers 106b, carry axial loads 111 (see FIG. 2). The plurality of stiffener members 104, such as the stringers 106, for example, the T-shaped stringers 106b, primarily carry flight loads 42 (see FIG. 2). The vacuum tank skin 66 carries some flight loads 42, such as fuselage torsion.

As shown in FIG. 5B, the vacuum tank skin 66 has the longitudinal cross section 74 with the profile geometry 76 configured for buckling prevention 78 (see FIG. 2) for the vacuum tank skin 66 under external pressure loads 40 (see FIG. 2). In one exemplary version, as shown in FIG. 5B, the longitudinal cross section 74 comprises a corrugated cross section 74a and the profile geometry 76 has the shape 86 comprising the corrugated shape 86a, such as in the form of the sinusoidal shape 86b. As further shown in FIG. 5B, the profile geometry 76 comprises repeating patterns 182 of sinusoidal shapes 86b. Each corrugated shape 86a, such as in the form of the sinusoidal shape 86b, comprises a peak 88 or crest, alternating with a valley 90 or trough, and substantially straight portions 92, or sides, between each peak 88 and valley 90.

As shown in FIG. 5B, each of the plurality of stiffener members 104, such as the stringers 106, for example, the T-shaped stringers 106b, has the external profile 112 that is preferably a substantially straight external profile 113, and each has an internal profile 114 corresponding to the profile geometry 76 of the vacuum tank skin 66. The exterior side 115a (see FIGS. 5A-5B) of the stiffener members 104, such as the stringers 106, is substantially straight, which facilitates attachment to the outer aero skin 20 (see FIGS. 3A, 14A). The shape of the stiffener members 104, such as the stringers 106, for example, the T-shaped stringers 106b, is such that they intersect with an outer mold line 72a (see FIGS. 5A-5B) of the vacuum tank skin 66.

Now referring to FIGS. 6A-6B, FIG. 6A is an illustration of a front right side perspective view of a version of an exemplary vacuum tank skin 66 of the vacuum tank main portion 62, such as vacuum tank main portion 62b, shown in FIG. 5A, and FIG. 6B is an illustration of an enlarged top perspective view of a portion 66b of the vacuum tank skin 66 shown in circle 6B of FIG. 6A.

As shown in FIG. 6A, in this version, the vacuum tank skin 66 forms a cylinder 68, such as an untapered cylinder 68a, with a substantially cylindrical shape 70. In another version, the cylinder 68 may comprise a tapered cylinder 68b (see FIG. 16A). As shown in FIG. 6A, the vacuum tank skin 66 has an exterior side 172 and an interior side 174. As shown in FIG. 6A, the cylinder 68 formed by the vacuum tank skin 66 has an interior 175 that is open and configured to contain the pressure tank main portion 122 (see FIG. 3C) of the pressure tank 116 (see FIG. 3C). The cylinder 68 formed by the vacuum tank skin 66 shown in FIG. 6A has an outer diameter 176a with a length preferably in a range of 6 (six) feet (1.8 meters) to 20 (twenty) feet (6.1 meters) long. The outer diameter 176a may have another suitable length. The length of the vacuum tank skin 66 shown in FIG. 6A is preferably in a range of 6 (six) feet (1.8 meters) to 20 (twenty) feet (6.1 meters) long. More preferably, the length is 10 (ten) feet (3.0 meters) long, 15 (fifteen) feet (4.6 meters) long, 20 (twenty) feet (6.1 meters) long, or another suitable length greater than 20 (twenty) feet (6.1 meters).

The vacuum tank skin 66 is a lightweight, single-shell skin 67 (see FIG. 6A) and comprises a continuous sheet 180 (see FIG. 6A) that is capable of sustaining significant levels of external pressure, such as external pressure loads 40 (see FIG. 2). As shown in FIG. 6A, the vacuum tank skin 66 has the outer mold line 72a, an inner mold line 73a, a first end 181a or forward end, and a second end 181b or aft end.

As shown in FIGS. 6A-6B, in one version, the vacuum tank skin 66 comprises a corrugated solid skin 96, or corrugated solid panel, having a plurality of corrugations 206. The corrugated solid skin 96, or corrugated solid panel, combines the advantages of a solid panel and a sandwich panel. Being a single sheet and a continuous sheet 180, the corrugated solid skin 96, or corrugated solid panel, has the advantages of being simple and inexpensive to manufacture, easy to join together, light in weight, and providing stability. Further, the undulating skin of the vacuum tank skin 66 in the form of the corrugated solid skin 96, or corrugated solid panel, precludes buckling under external pressure loading. The corrugated solid skin 96, or corrugated solid panel, takes static loads, including external pressure loads 40 (see FIG. 2), and takes fuselage torsional moment when the structure 12 comprises an aircraft 14.

The vacuum tank skin 66 (see FIGS. 6A-6B) may be made of a metal material 128a (see FIG. 2) including aluminum, aluminum alloy, steel, stainless steel, titanium alloy, copper, copper alloy, or another suitable metal material, may be made of a polymer material 128b (see FIG. 2), including thermoplastic, polytetrafluoroethylene (PTFE), polyetheretherketone (PEEK), high density polyethylene, polyamide, elastomer, rubber, or another suitable polymer material, may be made of a composite material 128c (see FIG. 2), including carbon fiber reinforced polymer (CFRP), or another suitable composite material, may be made of a combination of one or more of the metal materials 128a, the polymer materials 128b, and the composite materials 128c, or may be made of another suitable material 128.

The vacuum tank skin 66 (see FIGS. 6A-6B) provides a pressure barrier 80 (see FIG. 2) between the outside ambient pressure 82 (see FIG. 2) and the vacuum 60 (see FIG. 2) in the interior 58 (see FIG. 3B) of the structurally integrated vacuum tank 10 (see FIG. 3B) including the interior 175 (see FIG. 6A) of the cylinder 68 (see FIG. 6A). The vacuum tank skin 66 (see FIG. 6A) carries hoop compression resulting from this pressure difference. Further, the vacuum tank skin 66 (see FIG. 6A) carries some flight loads 42 (see FIG. 2), such as fuselage torsion, when the structure 12 (see FIG. 2) comprises an aircraft 14 (see FIG. 2).

Now referring to FIGS. 6C-6D, FIG. 6C is an illustration of a side view of a portion 66c of a vacuum tank skin 66, such as in the form of a corrugated solid skin 96, or corrugated solid panel, showing corrugations 206, and FIG. 6D is an illustration of an enlarged side view of a corrugation 206 shown in circle 6D of FIG. 6C. As shown in FIG. 6C, the vacuum tank skin 66, such as in the form of a corrugated solid skin 96, or corrugated solid panel, has the longitudinal cross section 74 comprising a corrugated cross section 74a and the profile geometry 76 has the corrugated shape 86a, such as in the form of the sinusoidal shape 86b. As shown in FIG. 6C, the corrugations 206 have the corrugated shape 86a, such as in the form of the sinusoidal shape 86b, with peaks 88 and valleys 90 that alternate, and have a substantially straight portion 92 in between each peak 88 and each valley 90, and the corrugated shape 86a, such as in the form of the sinusoidal shape 86b, has a first side 94a and a second side 94b.

FIG. 6D shows the corrugation 206 having the corrugated shape 86a, such as in the form of the sinusoidal shape 86b, with the peak 88, the valley 90, and the substantially straight portion 92 in between the peak 88 and the valley 90. FIG. 6D further shows a vacuum tank skin thickness ($t_{skin}$) 208 and an effective thickness ($t_{eff}$) 210 of the corrugated solid skin 96 (see FIG. 6C), or corrugated solid panel. The effective thickness ($t_{eff}$) 210 is used to calculate the buckling load of the vacuum tank skin 66 that is carrying hoop compression. Larger values of effective thickness ($t_{eff}$) 210 are more advantageous with respect to buckling load capacity. As shown in FIG. 6D, the effective thickness ($t_{eff}$) 210 of the corrugated solid skin 96, or corrugated solid panel, is much larger than the vacuum tank skin thickness ($t_{skin}$) 208, which gives the advantage of the corrugated solid skin 96, or corrugated solid panel, being lightweight for a given buckling load. In one example, the vacuum tank skin 66 shown in FIG. 6A may have a vacuum tank skin thickness ($t_{skin}$) 208 of 0.080 inch (0.20 centimeter), or another suitable vacuum tank skin thickness. In one example, the stiffener member 104, such as the stringer 106, shown in FIGS. 5A-5B, may have a stringer thickness of 0.1 inch (0.254 centimeter), or another suitable stringer thickness. Combining the plurality of stiffener members 104, such as the plurality of stringers 106, with the vacuum tank skin 66 provides sufficient stiffness to carry the structural loads 109 (see FIG. 2), for example, bending loads 110 (see FIG. 2), such as the fuselage bending loads 110a (see FIG. 2).

Now referring to FIGS. 7A-7B, FIG. 7A is an illustration of a front right side perspective view of a version of the stiffener members 104, such as the stringers 106, for example, the T-shaped stringers 106b, of the vacuum tank main portion 62, such as vacuum tank main portion 62b, shown in FIG. 5A. FIG. 7B is an illustration of an enlarged top perspective view of a portion 104a of the stiffener members 104, such as the stringers 106, for example, the T-shaped stringers 106b, shown in circle 7B of FIG. 7A.

As shown in FIGS. 7A-7B, each T-shaped stringer 106b is comprised of one piece including an outer section 190a. As shown in FIG. 7B, each of the stiffener members 104, such as the stringers 106, for example, the T-shaped stringers 106b, has the external profile 112 that is preferably a substantially straight external profile 113, and each has an internal profile 114. As shown in FIG. 7B, the internal profile 114 has a repeating pattern 182a of corrugations 206 having the corrugated shape 86a, such as in the form of the sinusoidal shape 86b, with the peak 88, the valley 90, and the substantially straight portion 92 in between each peak 88 and each valley 90.

Each of the stiffener members 104, such as the stringers 106, for example, the T-shaped stringers 106b, further has the exterior side 115a (see FIGS. 7A-7B), the first end 189a (see FIG. 7A) or forward end, and the second end 189b (see FIG. 7A) or aft end. In one version, FIG. 7A shows forty-six (46) stiffener members 104, such as the stringers 106, for example, T-shaped stringers 106b. However, in other versions, less than forty-six (46) stiffener members 104, such as the stringers 106, for example, T-shaped stringers 106b, or more than forty-six (46) stiffener members 104, such as the stringers 106, for example, T-shaped stringers 106b, may be used.

The stiffener members 104, such as the stringers 106, for example, the T-shaped stringers 106b, may be made of a metal material 128a (see FIG. 2) including aluminum, aluminum alloy, steel, stainless steel, titanium alloy, copper, copper alloy, or another suitable metal material, may be made of a polymer material 128b (see FIG. 2), including thermoplastic, polytetrafluoroethylene (PTFE), polyetheretherketone (PEEK), high density polyethylene, polyamide, elastomer, rubber, or another suitable polymer material, may be made of a composite material 128c (see FIG. 2), including carbon fiber reinforced polymer (CFRP), or another suitable composite material, may be made of a combination of one or more of the metal materials 128a, the polymer materials 128b, and the composite materials 128c, or may be made of another suitable material 128. The vacuum tank skin 66 and the stiffener members 104, such as the stringers 106, the T-shaped stringers 106b, may be made of the material 128 that is the same or may be made of the material 128 that is different.

The stiffener members 104, such as the stringers 106, for example, the T-shaped stringers 106b, primarily carry flight loads 42 (see FIG. 2). The stiffener members 104, such as the stringers 106, for example, the T-shaped stringers 106b, further carry longitudinal load, as the load path is over two orders of magnitude stiffer compared to the stiffness of the corrugated solid skin 96 (see FIG. 6C) in the longitudinal direction 179 (see FIG. 4F). Further, combining the plurality of stiffener members 104, such as the plurality of stringers 106, with the vacuum tank skin 66 provides sufficient stiffness to carry the bending loads 110 (see FIG. 2), such as the fuselage bending loads 110a (see FIG. 2).

Now referring to FIG. 8A, FIG. 8A is an illustration of a graph 212 of a sinusoidal wave pattern 214 with added curves 184, such as superimposed curves 184a, representing a profile geometry 76 of a vacuum tank skin 66 (see FIGS. 4A-4H), based on a finite element model used in designing the structurally integrated vacuum tank 10 (see FIG. 2) for buckling. The design of the structurally integrated vacuum tank 10 (see FIG. 2) analyzed had a vacuum tank skin thickness ($t_{skin}$) 208 (see FIG. 6D) of 0.08 inch (0.20 centimeter). The boundaries of each buckling pocket were defined by the sinusoidal wave pattern 214 and the stringers 106 (see FIG. 4E).

The design for buckling for the structurally integrated vacuum tank 10 (see FIG. 2) involved using the profile geometry 76 of how a radius 216 (see FIG. 8A) of the vacuum tank skin 66 (see FIGS. 4E, 4F) varies along the length 178 (see FIG. 4F) of the cylinder 68 (see FIG. 4F) formed by the vacuum tank skin 66. FIG. 8A shows the radius 216, in inches, on the y-axis, and shows an x-location 218, in inches, on the x-axis, of the x-location 218 along the length 178 of the cylinder 68. FIG. 8A further shows a plot line 220 representing the exterior side 115*a* (see FIG. 4E) of the stringer 106 (see FIG. 4E), where the external profile 112 (see FIG. 4E) is a substantially straight external profile 113 (see FIG. 4E), or a low curvature external profile. FIG. 8A further shows the sinusoidal wave pattern 214 with portions representing a profile geometry 76, such as an original profile geometry 76*b*, of the vacuum tank skin 66 (see FIGS. 4A-4H). FIG. 8A further shows the sinusoidal wave pattern 214 with added curves 184, such as superimposed curves 184*a*, with portions representing a profile geometry 76, such as a modified profile geometry 76*c*, of a vacuum tank skin 66 (see FIGS. 4A-4H).

The locations of buckling crests in the model, where the deflections due to buckling were the largest, were at the locations of the profile geometry 76 of the vacuum tank skin 66 having the least curvature, such as substantially straight portions 92 (see FIG. 8A). As shown in FIG. 8A, an added curve 184, such as the superimposed curve 184*a*, was added to each substantially straight portion 92 of the sinusoidal wave pattern 214, to increase curvature in a local area. The function was sinusoidal or any other function that provided a value of zero at each boundary. The profile geometry 76, such as the modified profile geometry 76*c*, with the added superimposed curves 184*a*, comprises the superimposed curves shape 86*c* (see FIG. 8A). The superimposed curves 184*a* added to the sinusoidal wave pattern 214, as shown in FIG. 8A, suppressed local buckling and had negligible effect on the hoop stresses 100 (see FIG. 2). It was desirable to arrange the profile geometry 76 of the vacuum tank skin 66 so that the buckling stress 102 (see FIG. 2) was greater than the hoop stress 100 (see FIG. 2) set by the allowable stress.

Figure 8B:
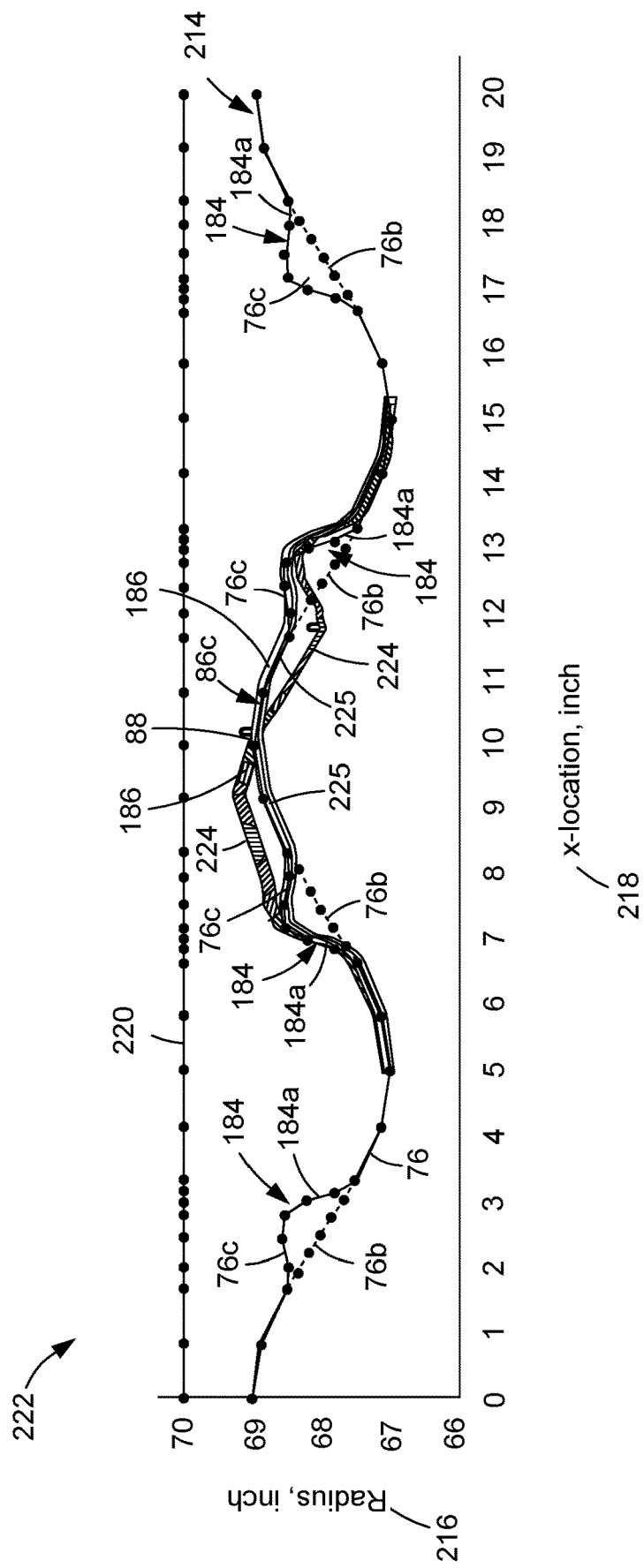
FIG. 8B is an illustration of a graph of the sinusoidal wave pattern with added curves of FIG. 8A, and further showing a new buckling mode.

Now referring to FIG. 8B, FIG. 8B is an illustration of a graph 222 of the sinusoidal wave pattern 214 with added curves 184, such as superimposed curves 184*a*, of FIG. 8A, and further showing a new buckling mode 224, representing the profile geometry 76 of the vacuum tank skin 66, based on a finite element model used in designing the structurally integrated vacuum tank 10 (see FIG. 1) for buckling. The design of the structurally integrated vacuum tank 10 analyzed had a vacuum tank skin thickness ($t_{skin}$) 208 (see FIG. 6D) that was reduced to 0.05 inch (0.13 centimeter). The vacuum tank skin thickness ($t_{skin}$) 208 was reduced to find a local buckling value. The boundaries of each buckling pocket were defined by the sinusoidal wave pattern 214 and the stringers 106 (see FIG. 4E).

FIG. 8B shows the radius 216, in inches, on the y-axis, and shows the x-location 218, in inches, on the x-axis, of the x-location 218 along the length 178 (see FIG. 4F) of the cylinder 68 (see FIG. 4F). FIG. 8A further shows the plot line 220 representing the exterior side 115*a* (see FIG. 4E) of the stringer 106 (see FIG. 4E), where the external profile 112 (see FIG. 4E) is a substantially straight external profile 113 (see FIG. 4E). FIG. 8B further shows the sinusoidal wave pattern 214 representing the profile geometry 76, such as the original profile geometry 76*b*, of the vacuum tank skin 66 (see FIGS. 4A-4H). FIG. 8B further shows the sinusoidal wave pattern 214 with added curves 184, such as superimposed curves 184*a*, representing the profile geometry 76, such as the modified profile geometry 76*c*, of the vacuum tank skin 66, and shows the superimposed curves shape 86*c*. As shown in FIG. 8B, the new buckling mode 224 shifted to a different location and shape with an eigenvalue of 0.926. Changes may be made to the geometry at new areas of interest 225 (see FIG. 8B) to suppress the new buckling mode 224. If it is desired to reduce the vacuum tank skin thickness ($t_{skin}$) 208 yet further, additional modifications may be made to the superimposed curves shape 86*c* (see FIG. 8B). For example, additional curves 184, such as superimposed curves 184*a*, or corrugations 206, formed in an inward direction, may be added to the new areas of interest 225, such as sides 186 (see FIG. 8B) downwardly sloped from the peak 88 (see FIG. 8B), and as shown in FIG. 9B below.

Now referring to FIGS. 9A-9G, FIGS. 9A-9G show various shapes 86 of profile geometry portions 76*d* of the profile geometry 76 of the vacuum tank skin 66 (see FIG. 2) that may be used in the structurally integrated vacuum tank 10 of the disclosure. The profile geometry portions 76*d* that make up the profile geometry 76 may be smooth and curved, or may have sharp breaks in the curvature, or may be of another suitable shape.

Now referring to FIG. 9A, FIG. 9A is an illustration of a version of a shape 86 of a profile geometry portion 76*d* of a vacuum tank skin 66 (see FIGS. 2, 4A-4C, 4E-4H) of the disclosure showing a superimposed curves shape 86*c* (see also FIGS. 4A-4C, 4E-4H), such as a first superimposed curves shape 86*k*. As shown in FIG. 9A, the superimposed curves shape 86*c*, such as the first superimposed curves shape 86*k*, comprises two (2) curves 184, such as two (2) superimposed curves 184*a*, in a curved outward position 226, that are outwardly formed or raised along sides 186 that downwardly slope from the peak 88. As shown in FIG. 9A, each superimposed curve 184*a* is positioned between the peak 88 and a valley 90. FIG. 9A further shows an outer side 225*a* and an inner side 225*b* of the superimposed curves shape 86*c*, such as the first superimposed curves shape 86*k*. As shown in FIG. 9A, the two (2) superimposed curves 184*a* are symmetric with respect to the peak 88 and the first superimposed curves shape 86*k* is also a symmetrical shape 86*d*.

Now referring to FIG. 9B, FIG. 9B is an illustration of another version of a shape 86 of a profile geometry portion 76*d* of a vacuum tank skin 66 (see FIG. 2) of the disclosure showing another superimposed curves shape 86*c*, such as a second superimposed curves shape 86*m*. As shown in FIG. 9B, the superimposed curves shape 86*c*, such as the second superimposed curves shape 86*m*, comprises four (4) curves 184, such as four (4) superimposed curves 184*a*, with two (2) superimposed curves 184*a* in the curved outward position 226 and two (2) superimposed curves 184*a* in a curved inward position 228. FIG. 9B further shows the peak 88, the sides 186, and the valleys 90. FIG. 9B further shows the first superimposed curves shape 86*k* of FIG. 9A in dotted lines, to show the modifications of the two (2) superimposed curves 184*a* in the curved inward position 228 formed from the sides 186 in FIG. 9A. FIG. 9B further shows the outer side 225*a* and the inner side 225*b* of the superimposed curves shape 86*c*, such as the second superimposed curves shape 86*m*. As shown in FIG. 9B, each superimposed curve 184*a* is positioned between the peak 88 and a valley 90. As shown in FIG. 9B, each superimposed curve 184*a* in the curved inward position 228 is positioned between the peak 88 and a superimposed curve 184a in the curved outward position 226.

Now referring to FIG. 9C, FIG. 9C is an illustration of yet another version of a shape 86 of a profile geometry portion 76d of a vacuum tank skin 66 (see FIG. 2) of the disclosure showing a pointed corner shape 86f. As shown in FIG. 9C, the pointed corner shape 86f has two (2) pointed corner portions 230 in a pointed inward position 232. FIG. 9C further shows a peak 88, such as a pointed peak 88a, sides 186, two (2) curves 184, such as two (2) superimposed curves 184a, in the curved outward position 226, on each side of the pointed corner portions 230, and the valleys 90. FIG. 9C further shows the first superimposed curves shape 86k of FIG. 9A in dotted lines, to show the modifications of the two (2) pointed corner portions 230 in the pointed inward position 232 formed from the sides 186 in FIG. 9A. As shown in FIG. 9C, each pointed corner portion 230 in the pointed inward position 232 is positioned between the pointed peak 88a and a superimposed curve 184a in the curved outward position 226.

Now referring to FIG. 9D, FIG. 9D is an illustration of yet another version of a shape 86 of a profile geometry portion 76d of a vacuum tank skin 66 (see FIG. 2) of the disclosure showing a non-symmetrical shape 86e. The non-symmetrical shape 86e may preclude certain symmetrical buckling modes. As shown in FIG. 9D, the non-symmetrical shape 86e, in one version, has a curve 184, such as a center superimposed curve 184b, in the curved inward position 228 instead of a peak 88 (see FIGS. 9A, 9B). As further shown in FIG. 9D, the non-symmetrical shape 86e has two (2) curves 184, such as two (2) non-symmetrical superimposed curves 184c, in the curved outward position 226 on each side of the center superimposed curve 184b. As further shown in FIG. 9D, the non-symmetrical shape 86e has two (2) curves 184, such as two (2) superimposed curves 184a, in the curved outward position 226 on each side of the non-symmetrical superimposed curves 184c. FIG. 9D further shows the valleys 90. FIG. 9D further shows the first superimposed curves shape 86k of FIG. 9A in dotted lines, to show the modifications of the center superimposed curve 184b and the two (2) non-symmetrical superimposed curves 184c.

Now referring to FIG. 9E, FIG. 9E is an illustration of yet another version of a shape 86 of a profile geometry portion 76d of a vacuum tank skin 66 (see FIG. 2) of the disclosure showing a hat shape 86g. As shown in FIG. 9E, the hat shape 86g has flat edges 234, or flanges, angled sides 235 each having a first end 236a and a second end 236b, with the first end 236a extending outwardly at an obtuse angle from the flat edges 234, and a flat top 238 coupled between the second ends 236b of the angled sides 235, and having a flat, substantially straight profile. As shown in FIG. 9E, the hat shape 86g is also a symmetrical shape 86d.

Now referring to FIG. 9F, FIG. 9F is an illustration of yet another version of a shape 86 of a profile geometry portion 76d of a vacuum tank skin 66 (see FIG. 2) of the disclosure showing a fractal shape 86h, such as a first approximately fractal shape 86i. As used herein, "fractal" means a non-regular geometric shape that has the same degree of non-regularity on all scales. FIG. 9F shows the hat shape 86g of FIG. 9E in dotted lines, to show the modifications of pointed indentations 240 made along the flat edges 234 (see FIG. 9E), the angled sides 235 (see FIG. 9E), and the flat top 238 (see FIG. 9E), which are subdivided in a similar manner. The pointed indentations 240 are in the pointed inward position 232 (see FIG. 9F) and have straight sides 242. FIG. 9F further shows remaining straight portions 244 of the angled sides 235 (see FIG. 9E) and the flat top 238 (see FIG. 9E). As shown in FIG. 9F, the fractal shape 86h, such as the first approximately fractal shape 86i, is also a symmetrical shape 86d.

Now referring to FIG. 9G, FIG. 9G is an illustration of yet another version of a shape 86 of a profile geometry portion 76d of a vacuum tank skin 66 (see FIG. 2) of the disclosure showing a fractal shape 86h, such as a second approximately fractal shape 86j. FIG. 9G shows the hat shape 86g of FIG. 9E in dotted lines, and shows the first approximately fractal shape 86i of FIG. 9F in dotted lines, to show the modifications of subdivided pointed indentations 240a made along the straight sides 242 and the remaining straight portions 244 of FIG. 9F, which are subdivided in a similar manner. The straight sides 242 and the remaining straight portions 244 of FIG. 9F are subdivided to reduce buckling length and can be subdivided in a self-similar manner. As shown in FIG. 9G, the subdivided pointed indentations 240a are either in the pointed inward position 232 or a pointed outward position 233. As shown in FIG. 9G, the fractal shape 86h, such as the second approximately fractal shape 86j, is also a symmetrical shape 86d.

Now referring to FIGS. 10A-10E, FIGS. 10A-10E show various stiffener members 104, such as stringers 106, coupled, or attached, to the vacuum tank skin 66, that may be used in versions of the structurally integrated vacuum tank 10 (see FIG. 2) of the disclosure.

Figures 10A, 10B:
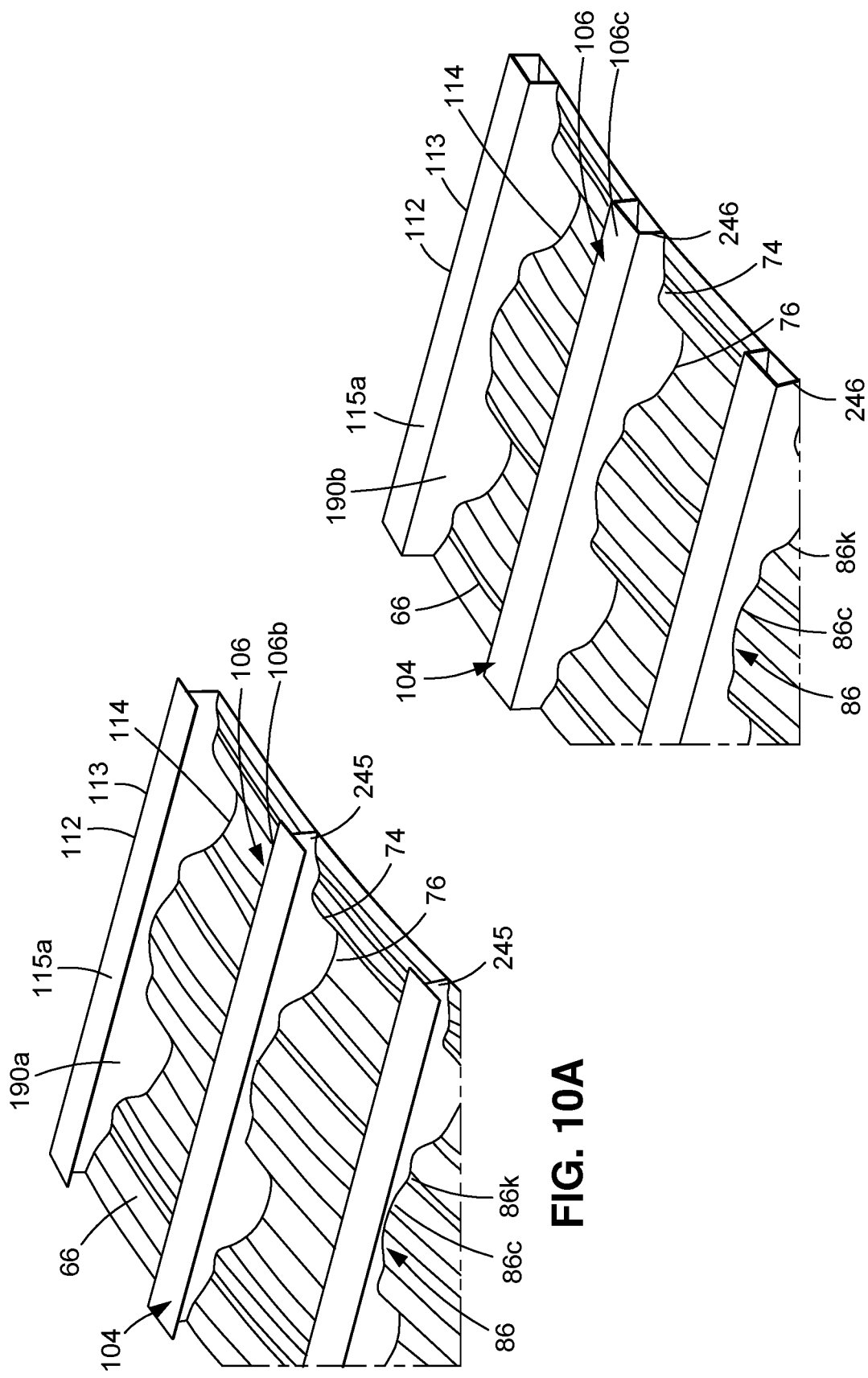
FIG. 10A is an illustration of a right side front perspective view of a version of stiffener members in the form of T-shaped stringers coupled to a vacuum tank skin.
FIG. 10B is an illustration of a right side front perspective view of another version of stiffener members in the form of U-shaped stringers coupled to a vacuum tank skin.

Now referring to FIG. 10A, FIG. 10A is an illustration of a right side front perspective view of a version of stiffener members 104, such as a stringers 106, in the form of T-shaped stringers 106b, coupled, or attached, to the vacuum tank skin 66. As shown in FIG. 10A, the T-shaped stringers 106b each have a T-shaped cross section 245. As shown in FIG. 10A, each of the T-shaped stringers 106b has the external profile 112 that is a substantially straight external profile 113, and each of the T-shaped stringers 106b has the internal profile 114 corresponding to the profile geometry 76 of the longitudinal cross section 74 of the vacuum tank skin 66. FIG. 10A further shows the outer section 190a of the T-shaped stringer 106b and the exterior side 115a of the T-shaped stringer 106b. As shown in FIG. 10A, the profile geometry 76 of the vacuum tank skin 66 has the shape 86 comprising the superimposed curves shape 86c, such as the first superimposed curves shape 86k.

Now referring to FIG. 10B, FIG. 10B is an illustration of a right side front perspective view of another version of stiffener members 104, such as stringers 106, in the form of U-shaped stringers 106c, coupled, or attached, to the vacuum tank skin 66. As shown in FIG. 10B, the U-shaped stringers 106c each have a U-shaped cross section 246. As shown in FIG. 10B, each of the U-shaped stringers 106c has the external profile 112 that is a substantially straight external profile 113, and each of the U-shaped stringers 106c has the internal profile 114 corresponding to the profile geometry 76 of the longitudinal cross section 74 of the vacuum tank skin 66. FIG. 10B further shows an outer section 190b of the U-shaped stringer 106c and the exterior side 115a of the U-shaped stringer 106c. As shown in FIG. 10B, the profile geometry 76 of the vacuum tank skin 66 has the shape 86 comprising the superimposed curves shape 86c, such as the first superimposed curves shape 86k.

The boundary of the buckling pocket, that is, the intersection of the vacuum tank skin 66 and the stringers 106 may be adjusted, which reduces the buckling length in the hoop direction. The use of U-shaped stringers 106c, as shown in FIG. 10B, and the use of single hat stringers 106d (see FIG.

2), reduces the buckling length in the hoop direction, and increases the buckling load. With the use of U-shaped stringers 106c, as shown in FIG. 10B, and the use of single hat stringers 106d (see FIG. 2), a new buckling mode shifted to a different location and shape, with an eigenvalue of 1.1794. This change resulted in a 27% increase in the buckling load. Some of this increase may have occurred due to the increased rotational restraint provided to the vacuum tank skin 66 by the U-shaped stringers 106c or by the single hat stringers 106d.

Figure 10C:
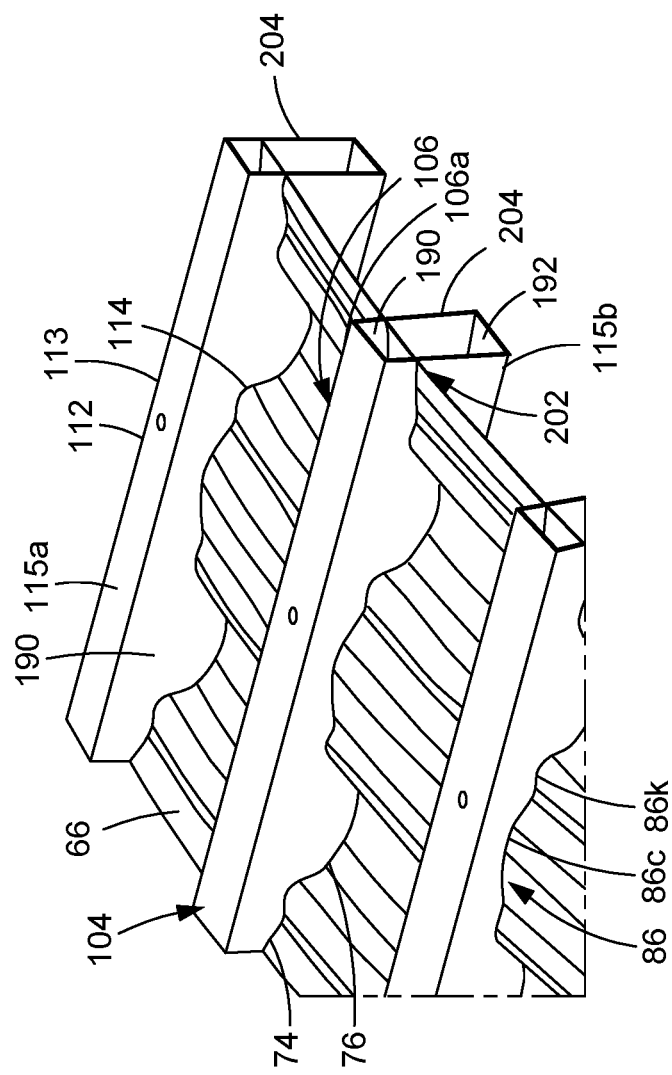
FIG. 10C is an illustration of a right side front perspective view of yet another version of stiffener members in the form of box stringers coupled to a vacuum tank skin.

Now referring to FIG. 10C, FIG. 10C is an illustration of a right side front perspective view of yet another version of stiffener members 104, such as stringers 106, in the form of box stringers 106a, coupled, or attached, to the vacuum tank skin 66. As shown in FIG. 10C, the box stringers 106a each have the box-shaped cross section 204. As shown in FIG. 10C, each of the box stringers 106a has the outer section 190 with the exterior side 115a and with the external profile 112 that is a substantially straight external profile 113 and the internal profile 114 corresponding to the profile geometry 76 of the longitudinal cross section 74 of the vacuum tank skin 66. FIG. 10C further shows the inner section 192 of the box stringer 106a with the interior side 115b. As shown in FIG. 10C, the profile geometry 76 of the vacuum tank skin 66 has the shape 86 comprising the superimposed curves shape 86c, such as the first superimposed curves shape 86k. As shown in FIG. 10C, the outer section 190 and the inner section 192 of each box stringer 106a are joined together in the joined position 202.

Changing the shape of the stringer 106 from the T-shaped stringer 106b and the U-shaped stringer 106c to the box stringer 106a adds an inner section 192, and resulted in a further improved buckling load. Because the outer section 190 and the inner section 192 of the box stringer 106a can be clamped together, this enables manufacturing, operational, and structural benefits.

Figure 10D:
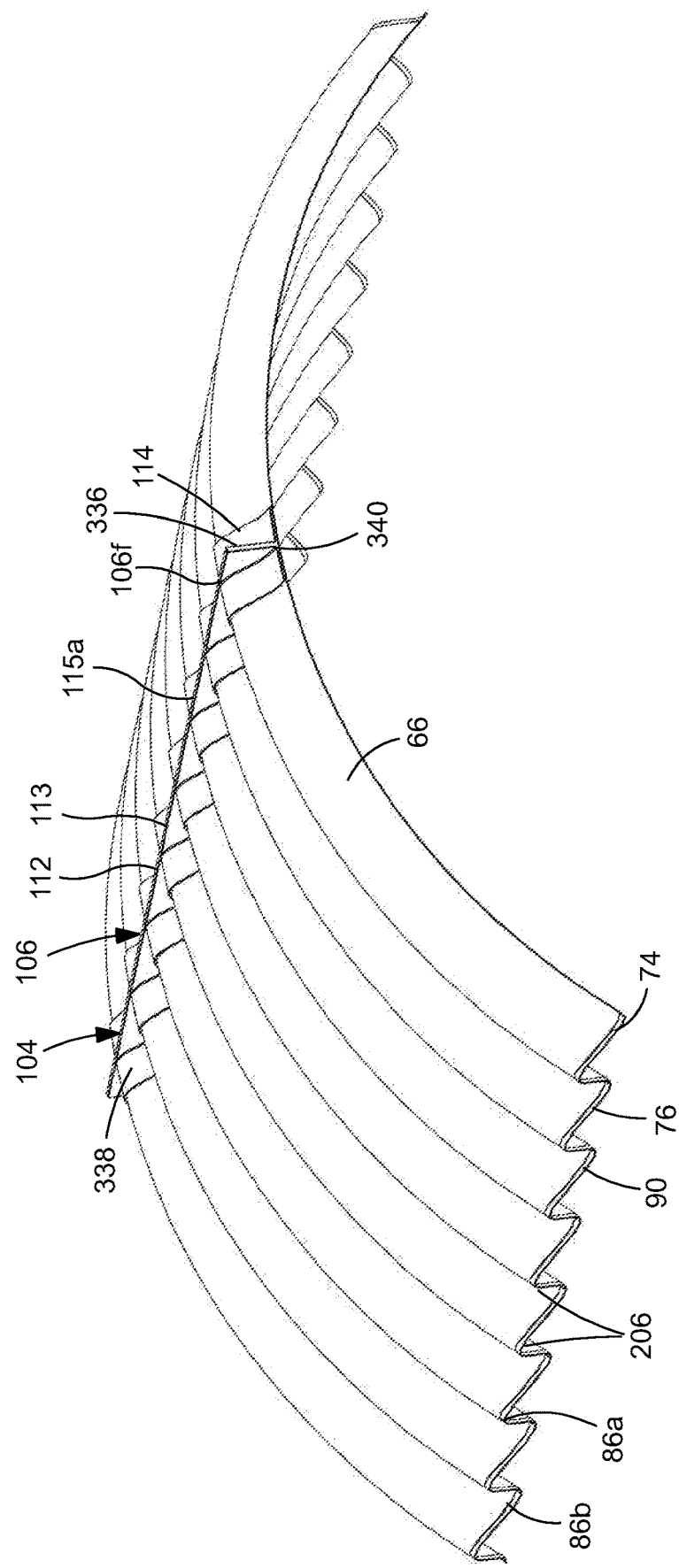
FIG. 10D is an illustration of a right side front perspective view of yet another version of a stiffener member in the form of a blade stringer coupled to a vacuum tank skin.

Now referring to FIG. 10D, FIG. 10D is an illustration of a right side front perspective view of yet another version of a stiffener member 104, such as a stringer 106, in the form of a blade stringer 106f integral with, or coupled, or attached, to the vacuum tank skin 66. Blade stringers 106f, as well as plank stringers 106g (see FIG. 2), single hat stringers 106d (see FIG. 2), and double hat stringers 106e (see FIG. 2), can provide additional bending resistance. As shown in FIG. 10D, in this version, the blade stringer 106f comprises an elongated blade portion 336 integral with a sinusoidal portion 338. Together, the elongated blade portion 336 integral with the sinusoidal portion 338 have an inverted T-shape cross section 340 (see FIG. 10D). The elongated blade portion 336 is positioned in the valleys 90 (see FIG. 10D) of the corrugations 206 (see FIG. 10D) of the vacuum tank skin 66. The blade stringer 106f is a particularly advantageous version to use when made of a composite material 128c (see FIG. 2) because it does not require fasteners which reduces weight, and it can be manufactured by co-curing the vacuum tank skin 66 together with the blade stringer 106f comprising the elongated blade portion 336 integral with the sinusoidal portion 338, to obtain a single piece structure. Alternatively, the blade stringer 106f may be bonded to the vacuum tank skin 66.

As further shown in FIG. 10D, the blade stringer 106f has the exterior side 115a and the external profile 112 that is a substantially straight external profile 113 and the internal profile 114 corresponding to the profile geometry 76 of the longitudinal cross section 74 of the vacuum tank skin 66. As further shown in FIG. 10D, the profile geometry 76 of the vacuum tank skin 66 has the shape 86 comprising the corrugated shape 86a, such as the sinusoidal shape 86b.

Figure 10E:
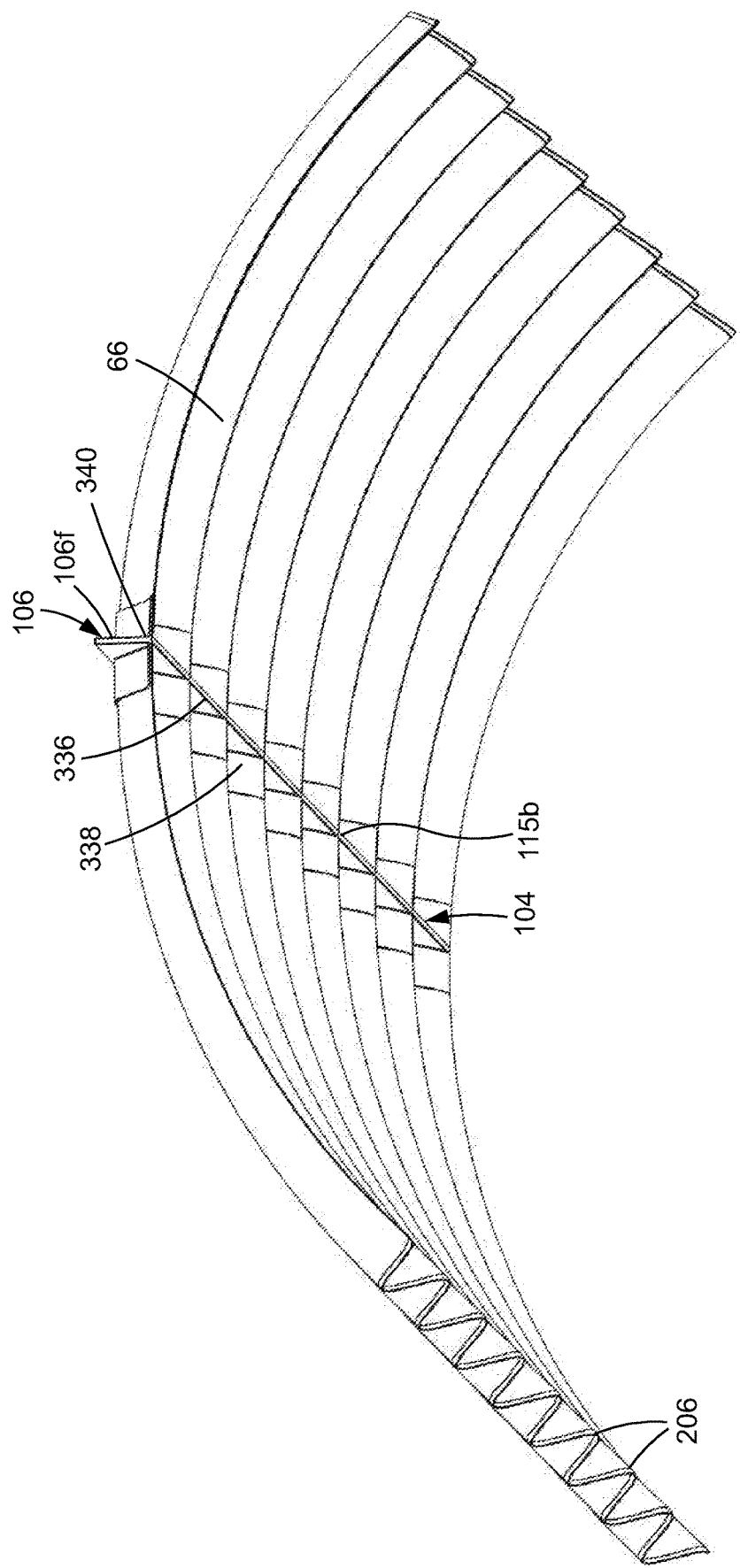
FIG. 10E is an illustration of a bottom perspective view of the blade stringer and vacuum tank skin of FIG. 10D.

Now referring to FIG. 10E, FIG. 10E is an illustration of a bottom perspective view of the blade stringer 106f and the vacuum tank skin 66 with corrugations 206 of FIG. 10D. FIG. 10E shows the stiffener member 104, such as the stringer 106, in the form of blade stringer 106f, comprising the elongated blade portion 336 integral with the sinusoidal portion 338. Together, the elongated blade portion 336 integral with the sinusoidal portion 338 have the inverted T-shape cross section 340 (see FIG. 10E). As further shown in FIG. 10E, the blade stringer 106f has the interior side 115b.

Now referring to FIGS. 11A-11B, FIGS. 11A-11B show a version of the stringer 106, such as the box stringer 106a, in a separated position 201 and in the joined position 202. FIG. 11A is an illustration of a side sectional view of the outer section 190 and the inner section 192 of the stringer 106, such as the box stringer 106a, in the separated position 201. As shown in FIG. 11A, the outer section 190 has the external profile 112, such as the substantially straight external profile 113, and has the internal profile 114. As further shown in FIG. 11A, the inner section 192 has the external profile 112a, such as the substantially straight external profile 113a, and has the internal profile 114a that complements and fits together with the internal profile 114 of the outer section 190. The internal profile 114 of the outer section 190 functions as an outer section boundary 248a, and the internal profile 114a of the inner section 192 functions as an inner section boundary 248b. The tolerances of the box stringer 106a are standard manufacturing tolerances, but the tolerances of the boundary plane of the outer section boundary 248a and the inner section boundary 248b are tighter, since it is desirable from a structural standpoint that the outer section 190 and the inner section 192 of the box stringer 106a are structurally joined, so that a combined stringer section 250 (see FIG. 11B) works as a combined section, and not as two sections separately.

FIG. 11B is an illustration of a side sectional view of the outer section 190 and the inner section 192 of the stringer 106, such as the box stringer 106a, of FIG. 11A, joined together in the joined position 202 to form and function as a combined stringer section 250 rather than two separate sections. The combined stringer section 250 has a constant cross section with no eccentricity, and the combined stringer section 250 is no longer eccentric for axial loads. As shown in FIG. 11B, the outer section 190 has the external profile 112, such as the substantially straight external profile 113, and has the internal profile 114. As further shown in FIG. 11B, the inner section 192 has the external profile 112a, such as the substantially straight external profile 113a, and has the internal profile 114a that complements and fits together with the internal profile 114 of the outer section 190. As shown in FIG. 11B, the outer section boundary 248a and the inner section boundary 248b of FIG. 11A join together in the joined position 202 to form a boundary 248.

Figure 12A:
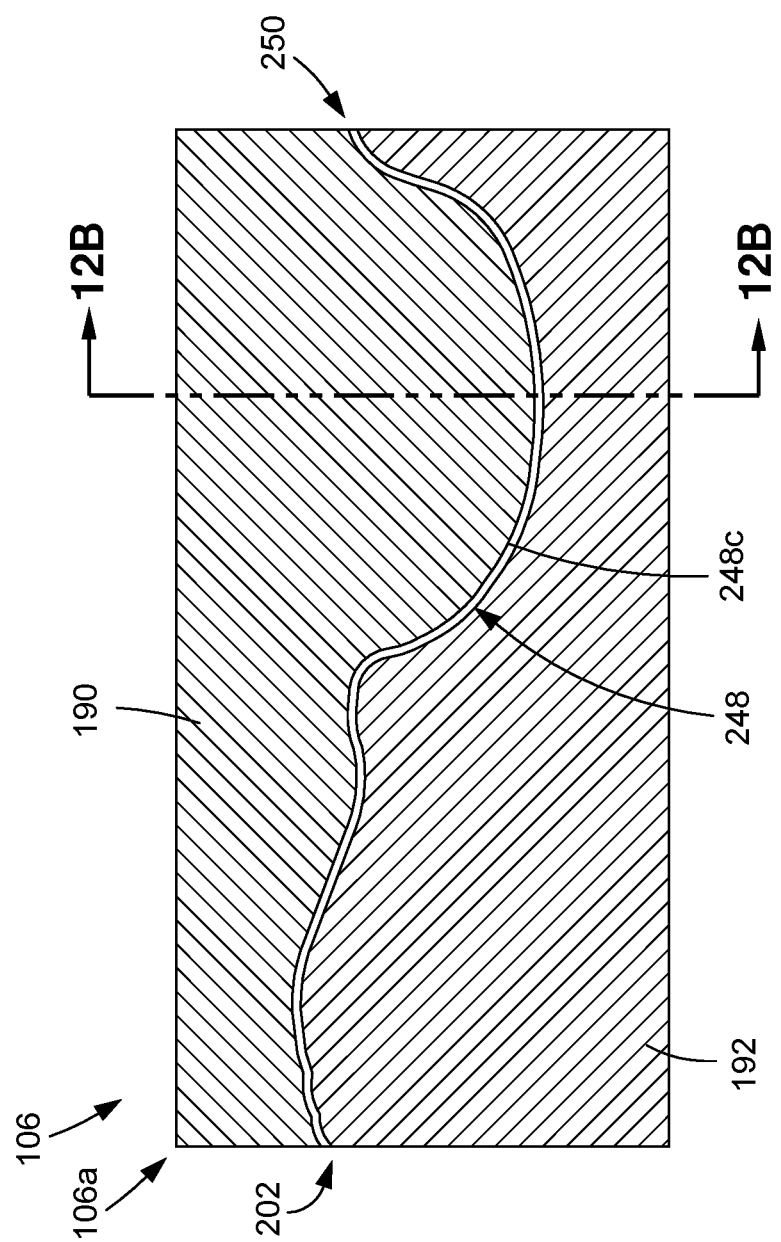
FIG. 12A is an illustration of a side sectional view of an outer section and an inner section of a box stringer in a joined position and clamped with a fastener assembly, and showing an undulating boundary between an outer section and an inner section of the box stringer.

Now referring to FIG. 12A, FIG. 12A is an illustration of a side sectional view of an outer section 190 and an inner section 192 of a stringer 106, such as a box stringer 106a, in the joined position 202 and clamped with a fastener assembly 194 (see FIG. 12C), and showing the boundary 248, such as an undulating boundary 248c, between the outer section 190 and the inner section 192. Where the stringer 106, such as the box stringer 106a, and the vacuum tank skin 66 are made of a metal material 128a (see FIG. 2), fastener assemblies 194 are used to clamp the outer section 190 and the inner section 192 of the box stringer 106a together, ensuring the outer section 190 and the inner section 192 work together structurally, and providing buckling restraint to the vacuum tank skin 66. Assuming fastener preload, the undulating boundary 248c (see FIG. 12A) ensures that webs of the stringer 106, such as the box stringer 106a, resist horizontal shear in the combined stringer section 250. The undulating boundary 248c may be bonded but is not needed structurally. Where the stringer 106, such as the box stringer 106a, and the vacuum tank skin 66 are made of a polymer material 128b (see FIG. 2) or a composite material 128c (see FIG. 2), fastener assemblies 194 may or may not be used.

Figure 12C:
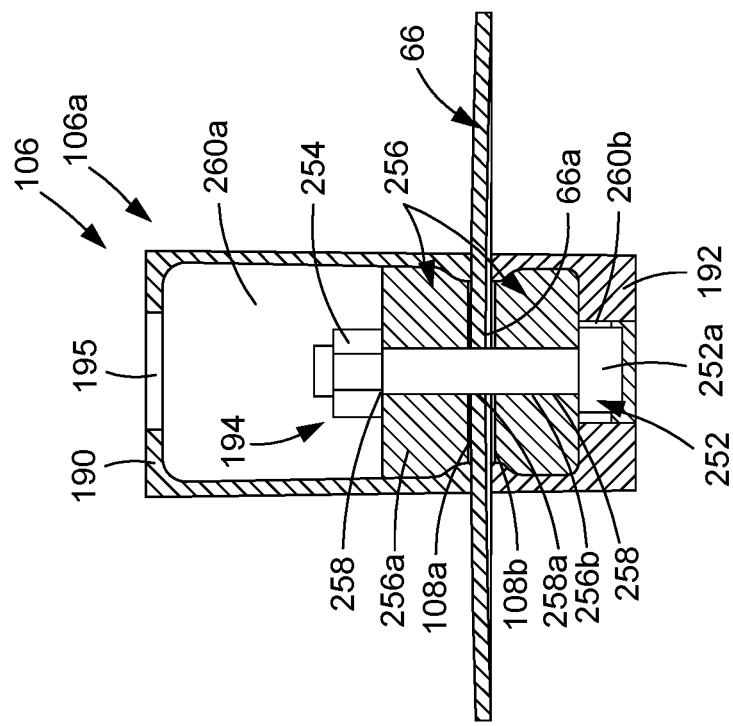
FIG. 12C is an illustration of a cross-sectional front view of a vacuum tank skin sandwiched between an outer section and an inner section of a box stringer and clamped together with a fastener assembly.
Figure 12B:
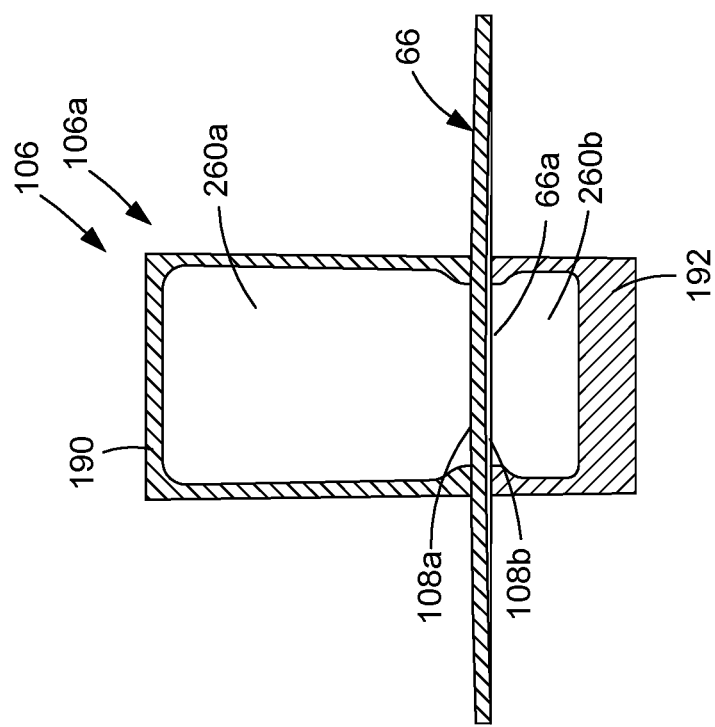
FIG. 12B is an illustration of a cross-sectional front view taken along lines 12B-12B of FIG. 12A, showing a vacuum tank skin sandwiched between the outer section and the inner section of the box stringer.

Now referring to FIG. 12B, FIG. 12B is an illustration of a cross-sectional front view taken along lines 12B-12B of FIG. 12A, showing a vacuum tank skin 66, such as a clamped vacuum tank skin portion 66a, sandwiched between the outer section 190 and the inner section 192 of the stringer 106, such as the box stringer 106a. FIG. 12B further shows an outer surface portion 108a and an inner surface portion 108b of the vacuum tank skin 66. FIG. 12B further shows an interior 260a of the outer section 190 and an interior 260b of the inner section 192.

Now referring to FIG. 12C, FIG. 12C is an illustration of a cross-sectional front view of a vacuum tank skin 66 sandwiched between an outer section 190 and an inner section 192 of a stringer 106, such as a box stringer 106a clamped together with a fastener assembly 194. As shown in FIG. 12C, the outer section 190, the vacuum tank skin 66 such as a clamped vacuum tank skin portion 66a, and the inner section 192 are clamped together with the fastener assembly 194. As further shown in FIG. 12C, in one version, the fastener assembly 194 comprises a fastener 252, such as a bolt 252a, coupled to a nut 254, and an intercostal shelf 256. As further shown in FIG. 12C, the intercostal shelf 256 comprises a first intercostal shelf portion 256a positioned in an interior 260a of the outer section 190 against an outer surface portion 108a of the vacuum tank skin 66. As further shown in FIG. 12C, the intercostal shelf 256 comprises a second intercostal shelf portion 256b positioned in an interior 260b of the inner section 192 against an inner surface portion 108b of the vacuum tank skin 66. The fastener assembly 194 is inserted through opening 195 (see FIG. 12C) formed in the top of the outer section 190. As shown in FIG. 12C, the bolt 252a is inserted through openings 258 in the first intercostal shelf portion 256a and the second intercostal shelf portion 256b. As further shown in FIG. 12C, the bolt 252a is also inserted through an opening 258a in the vacuum tank skin 66. The intercostal shelf 256 is an integral part of the outer section 190 of the stringer 106, such as the box stringer 106a, and need not contact the vacuum tank skin 66. The purpose of the first intercostal shelf portion 256a and the second intercostal shelf portion 256b is to transfer the preload from the fastener assembly 194 through the first intercostal shelf portion 256a and the second intercostal shelf portion 256b into the sidewalls of the outer section 190 and the inner section 192 of the stringer 106, such as the box stringer 106a, so that there is clamping force between the outer section 190 and the inner section 192 onto the vacuum tank skin 66, holding it in place.

Now referring to FIG. 12D, FIG. 12D is an illustration of a cross-sectional front view of the vacuum tank skin 66, the stringer 106, such as the box stringer 106a, with the outer section 190 having the opening 195 and the inner section 192, and the fastener assembly 194 of FIG. 12C, and further showing a sealing element 262, such as a fayed surface sealing element 262a. In one version, the fayed surface sealing element 262a is in the form of a sealant 264 (see FIG. 12D), such as a silicone based sealant, a urethane based sealant, an acrylic based sealant, or another suitable sealant. As used herein, "fayed surface" means two mating surfaces joined or fitted closely or tightly together and containing a sealant between or around the two mating surfaces, so that there is no gap or crevice between the two mating surfaces. As shown in FIG. 12D, the mating surfaces include outer section faying surfaces 265 and vacuum tank skin faying surfaces 266. When the outer section 190 is mated to the vacuum tank skin 66, the fayed surface sealing element 262a, such as the sealant 264, can be added to the outer section faying surfaces 265 and vacuum tank skin faying surfaces 266, for example, the interface between the outer section 190 and the vacuum tank skin 66 before it is clamped with the fastener assembly 194. The width of the pad where the two surfaces mate can be designed such that the clamping pressure stress is not too large or too small.

Now referring to FIG. 12E, FIG. 12E is an illustration of a cross-sectional front view of the vacuum tank skin 66, the stringer 106, such as the box stringer 106a, with the outer section 190 having the opening 195 and the inner section 192, and the fastener assembly 194 of FIG. 12C, and further showing a sealing element 262, such as an externally applied sealing element 262b. In one version, the externally applied sealing element 262b is in the form of an external sealant 264a (see FIG. 12E), such as a silicone based external sealant, a urethane based external sealant, an acrylic based external sealant, or another suitable sealant. As shown in FIG. 12E, the externally applied sealing element 262b, such as in the form of the external sealant 264a, is externally applied at corner areas 268 between external portions 270 of the outer section 190 and external surface sealing portions 272 of the vacuum tank skin 66. The externally applied sealing element 262b, such as in the form of the external sealant 264a, may be applied after the structurally integrated vacuum tank 10 has been assembled. This is a low risk solution for sealing between the outer section 190 of the box stringer 106a and the vacuum tank skin 66.

Now referring to FIG. 12F, FIG. 12F is an illustration of a cross-sectional front view of the vacuum tank skin 66, the stringer 106, such as the box stringer 106a, with the outer section 190 having the opening 195 and the inner section 192, and the fastener assembly 194 of FIG. 12C, and further showing a sealing element 262, such as a rubber grommet sealing element 262c. In one version, the rubber grommet sealing element 262c is in the form of a rubber grommet 274, such as a silicone rubber grommet, a polyurethane rubber grommet, or another suitable rubber grommet. As shown in FIG. 12F, the rubber grommet sealing element 262c, such as in the form of the rubber grommet 274, is installed around a portion 275 of the fastener 252, such as the bolt 252a, where it passes through the opening 258a in the vacuum tank skin 66. This is a low risk, lightweight solution for sealing between the fastener 252 and the vacuum tank skin 66, since the sealing location is very localized.

In other versions, combinations of the fastener assembly 194 of FIG. 12C, and the fastener assembly 194 and sealing element 262 of FIGS. 12D-12F may be used.

Figure 13A:
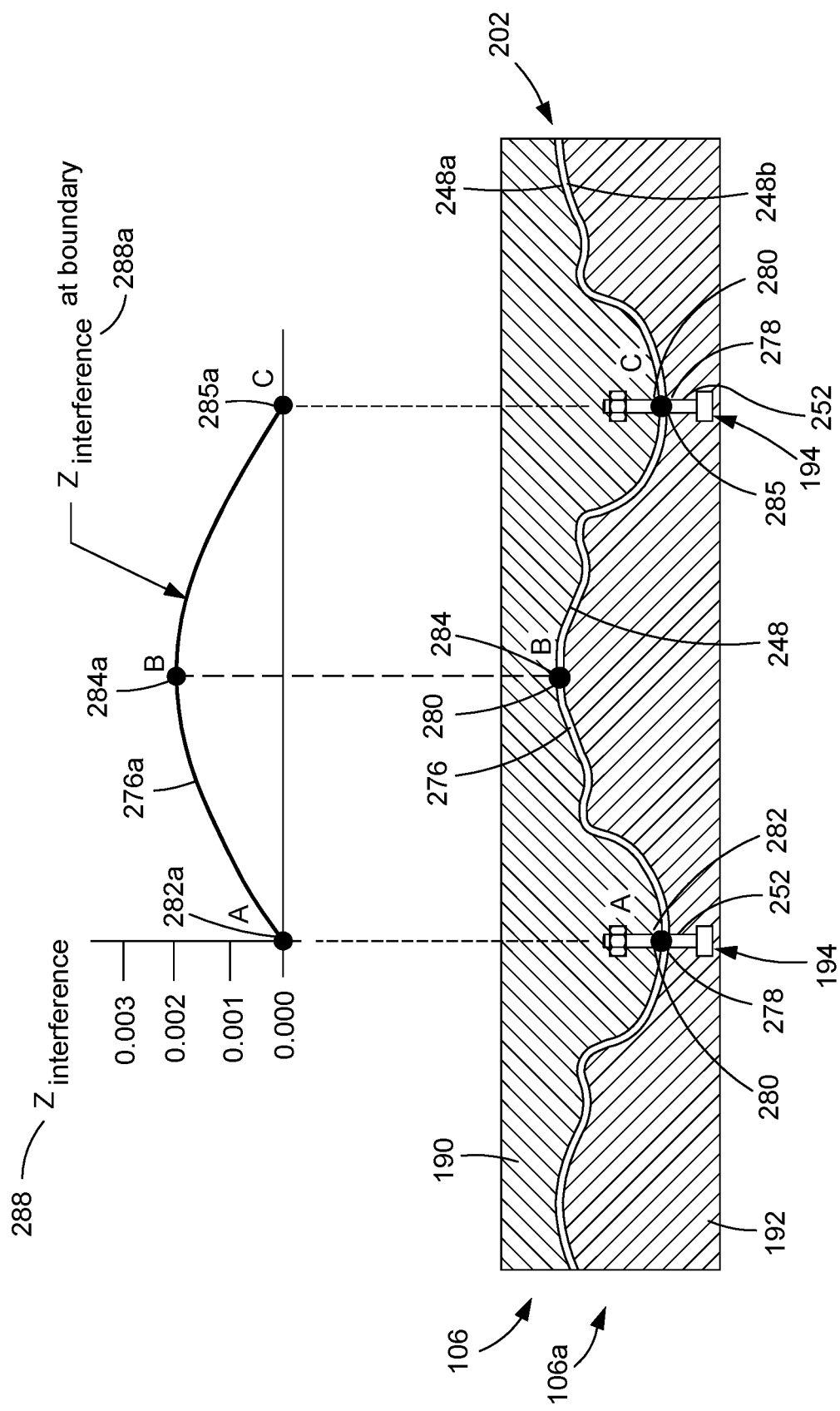
FIG. 13A is an illustration of a side sectional view of an outer section and an inner section of a box stringer in a joined position clamped with fastener assemblies, and showing use of cambering to provide a uniform clamping load.

Now referring to FIG. 13A, FIG. 13A is an illustration of a side sectional view of the outer section 190 and the inner section 192 of the stringer 106, such as the box stringer 106a, in the joined position 202 and clamped with fastener assemblies 194, and showing use of cambering with a camber 276 machined or formed into the boundary 248. As used herein, "cambering" means to curve upward in the middle, or to arch slightly, to obtain an upward curve, or camber. The cambering is a method to enable the use of fewer fastener assemblies 194 (see FIG. 13A), while still maintaining relatively constant or uniform clamping force. When clamping two pieces of structure together at discrete locations, for example, clamping the outer section 190 and the inner section 192 together at fastener locations 278, bearing stresses, such as clamping stresses, may be greater at the fasteners 252, and further away from the fasteners 252, the bearing stresses, such as clamping stresses, are less. This may need a higher fastener preload or tightening to achieve the desired clamping force at a distance from the fastener 252. As shown in FIG. 13A, when the camber 276 is built into the design of the boundary 248, including the outer section boundary 248a and the inner section boundary 248b, the clamping force is more evenly distributed, to provide a uniform clamping load 280 at point A 282, point B 284, and point C 285. Thus, the use of cambering is used to more evenly distribute clamping load at point A 282, point B 284, and point C 285. FIG. 13A further shows a cambering diagram 286 associated with the box stringer 106a. As shown in FIG. 13A, the cambering diagram 286 includes a z interference 288 with numbers, a z interference at boundary 288a, and a camber 276a formed between corresponding point A 282a that corresponds to point A 282 at fastener 252, corresponding point B 284a that corresponds to point B 284, and corresponding point C 285a that corresponds to point C 285 at fastener 252. Thus, the inner section 192 has slightly more material at point B 284 than it would otherwise have, and the extra amount of material varies as shown in FIG. 13A.

When the outer section 190 and the inner section 192 are mated and make initial contact, the fasteners 252 are finger-tight, and the outer section 190 and the inner section 192 contact at point B 284 only. Preload on or tightening of the fasteners 252 is increased until the outer section 190 and the inner section 192 sufficiently bend so that they contact at point A 282 (see FIG. 13A) and point C 285 (see FIG. 13A). As the preload on or tightening of the fasteners 252 is increased, the bearing stresses increase faster at the fasteners 252, and at an effective preload on or tightening of the fasteners 252 with the camber 276, the bearing at point A 282 (see FIG. 13A), point B 284 (see FIG. 13A), and point C 285 (see FIG. 13A) is approximately equal.

Figure 13B:
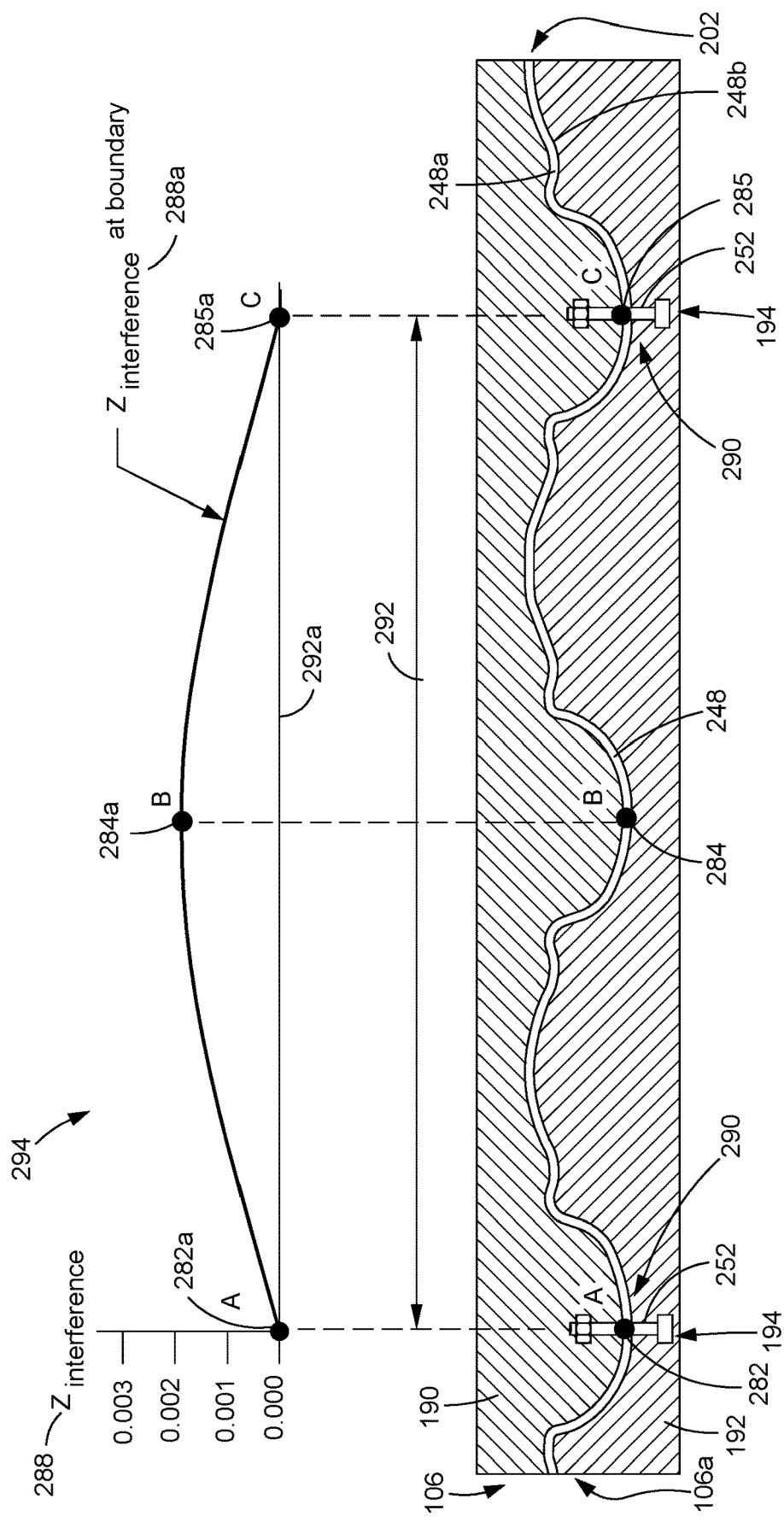
FIG. 13B is an illustration of a side sectional view of an outer section and an inner section of a box stringer in a joined position clamped with fastener assemblies, and showing use of cambering over a longer length to provide a uniform clamping load.

Now referring to FIG. 13B, FIG. 13B is an illustration of a side sectional view of the outer section 190 and the inner section 192 of the stringer 106, such as the box stringer 106a, in the joined position 202 and clamped with fastener assemblies 194 that are spaced apart in a spaced apart configuration 290, and showing use of cambering over a longer length to provide a uniform clamping load, and resulting in an increased stringer flexibility by increasing a span 292 between the fastener assemblies 194. FIG. 13B further shows the boundary 248 including the outer section boundary 248a and the inner section boundary 248b. As shown in FIG. 13B, the fasteners 152 are spaced apart in the spaced apart configuration 290 to balance stiffnesses between extension of the fasteners 252 and bending of the box stringer 106a. This arrangement uses the same approach described for the arrangement shown in FIG. 13A, except that the span 292 of the effective beam between corresponding point A 282a and corresponding point C 285a is greater. The advantage of this arrangement is fewer fastener assemblies 194 being required.

As shown in FIG. 13B, a span diagram 294 includes the z interference 288 with numbers, the z interference at boundary 288a, and the span 292a formed between corresponding point A 282a that corresponds to point A 282 at fastener 252 and corresponding point C 285a that corresponds to point C 285 at fastener 252. FIG. 13B further shows corresponding point B 284a that corresponds to point B 284.

Further, a decreased number of fastener assemblies 194, including the number of fasteners 252, can reduce sealing locations. For example, if the rubber grommet sealing element 262c is used for sealing, reducing the number of fastener assemblies 194, including the number of fasteners 252, reduces the potential number of leakage locations.

Now referring to FIG. 14A, FIG. 14A is an illustration of a cross-sectional front view showing the structurally integrated vacuum tank 10, such as the external structurally integrated vacuum tank 10a, with the vacuum tank skin 66 sandwiched between the stringers 106, such as the box stringers 106a, and clamped together with fastener assemblies 194, and showing the stringers 106, such as the box stringers 106a, attached to the outer aero skin 20, in the form of the continuous outer aero skin 20a, which is a continuous skin.

As shown in FIG. 14A, the outer aero skin 20, in the form of the continuous outer aero skin 20a, has an outer side 295a and an inner side 295b. Portions of the inner side 295b of the outer aero skin 20, such as the continuous outer aero skin 20a, are attached to the exterior side 115a of the stringer 106, such as the box stringer 106a. The exterior side 115a (see FIG. 14A) of the stringers 106, such as the box stringers 106a, is substantially straight, which facilitates attachment to the outer aero skin 20, such as the continuous outer aero skin 20a. The outer aero skin 20, such as the continuous outer aero skin 20a, may be attached to the stringer 106, such as the box stringer 106a, via bonding with an adhesive or another suitable bonding element, via attachment elements, such as fasteners, bolts, or other suitable attachment elements, or via another suitable attachment means. The outer aero skin 20, such as the continuous outer aero skin 20a, may be comprised of fiberglass, carbon composite, plastic, a fabric that is stretched and always in tension, or another suitable material.

The outer aero skin 20, such as the continuous outer aero skin 20a, provides an aerodynamic surface for the fuselage 16 (see FIGS. 1, 2) at the fuselage mold line 22 (see FIGS. 1, 2). Since the vacuum tank skin 66 is already carrying flight loads 42 (see FIG. 2), the outer aero skin 20, such as the continuous outer aero skin 20a, need not be structural.

FIG. 14A further shows the outer section 190 with the opening 195 and the inner section 192 of the stringer 106, such as the box stringer 106a, the clamped vacuum tank skin portions 66a clamped between the outer section 190 and the inner section 192, and the interior side 115b of the stringer 106, such as the box stringer 106a. The opening 195 may be plugged with a plug element or apparatus to prevent leaking. FIG. 14A further shows each fastener assembly 194 comprising the fastener 252, such as the bolt 252a, coupled to the nut 254, and the intercostal shelf 256, comprising the first intercostal shelf portion 256a positioned in the outer section 190 and the second intercostal shelf portion 256b positioned in the inner section 192. FIG. 14A further shows the sealing element 262, such as the rubber grommet sealing element 262c, is installed around the portion 275 of the fastener 252, such as the bolt 252a, where it passes through the opening 258a in the vacuum tank skin 66.

Figure 14B:
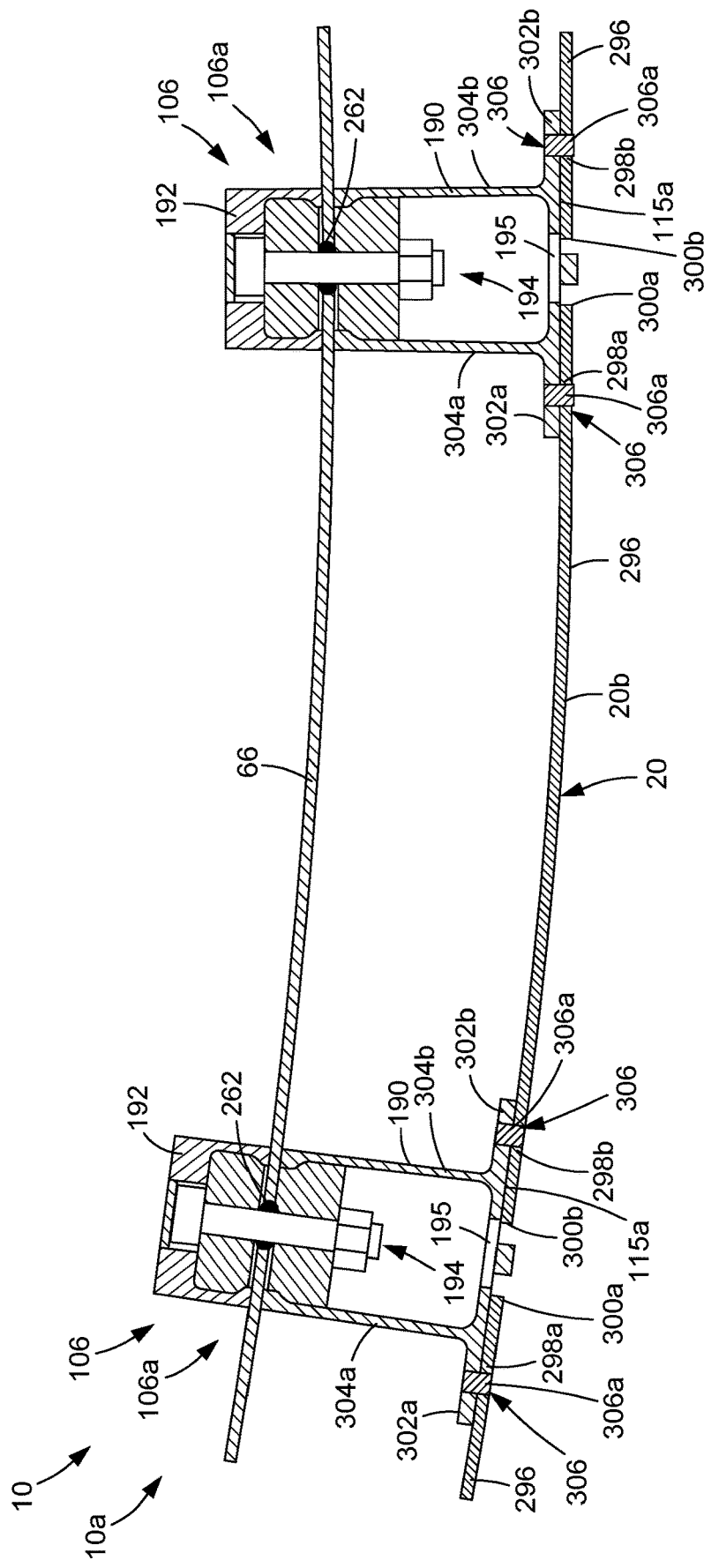
FIG. 14B is an illustration of a cross-sectional front view showing a vacuum tank skin sandwiched between box stringers and clamped together with fastener assemblies, and showing a segmented outer aero skin with outer aero skin segments attached to the box stringer.
Figure 14C:
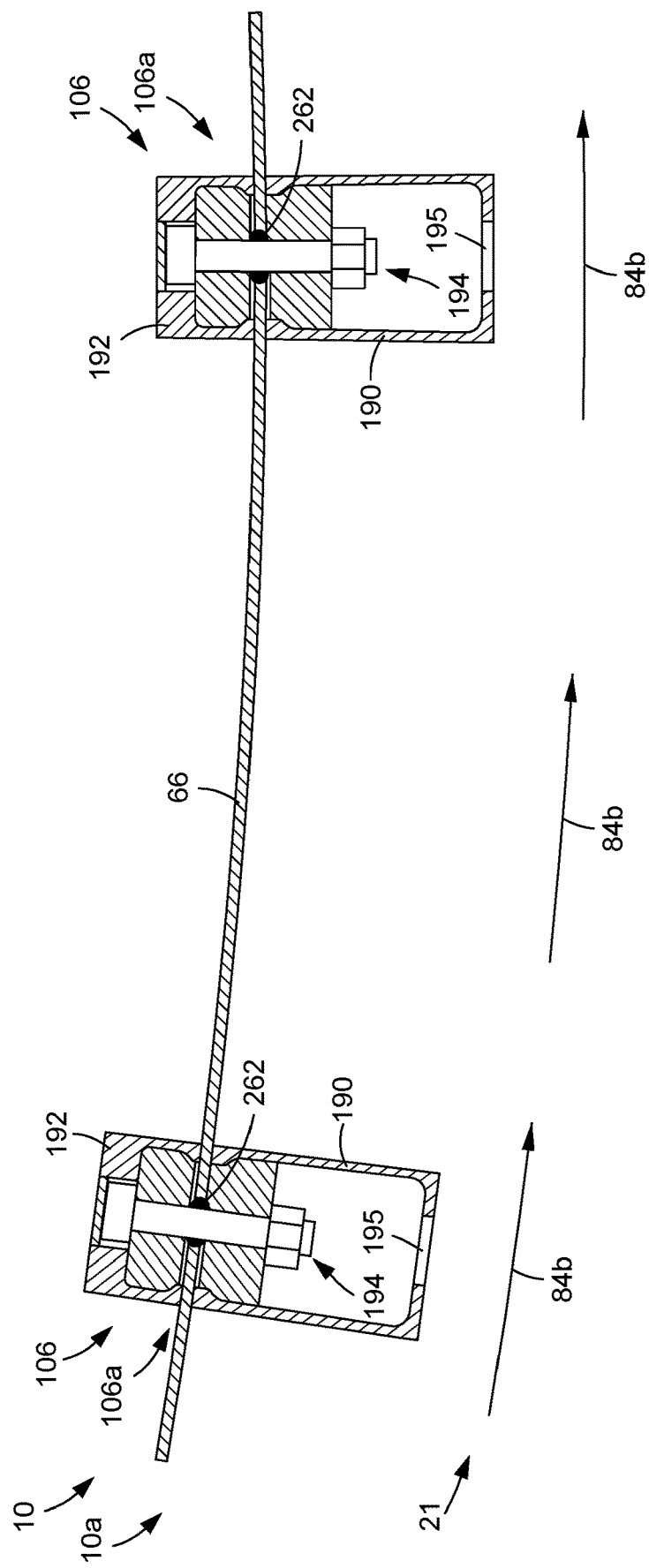
FIG. 14C is an illustration of a cross-sectional front view showing a vacuum tank skin sandwiched between box stringers and clamped together with fastener assemblies, and showing no outer aero skin attached to the box stringer in an omitted outer aero skin configuration.

Now referring to FIG. 14B, FIG. 14B is an illustration of a cross-sectional front view showing the structurally integrated vacuum tank 10, such as the external structurally integrated vacuum tank 10a, with the vacuum tank skin 66 sandwiched between the stringers 106, such as the box stringers 106a, with the outer section 190 having the opening 195 and the inner section 192, and clamped together with fastener assemblies 194, and showing the stringers 106, such as the box stringers 106a, attached to the outer aero skin 20, in the form of a segmented outer aero skin 20b comprised of segmented outer aero skin portions 296 that are separated from each other. The fastener assemblies 194 and sealing element 262 of FIG. 14B are the same as described in FIG. 14A. The opening 195 may be plugged with a plug element or apparatus to prevent leaking.

As shown in FIG. 14B, the segmented outer aero skin portions 296 are installed between each stringer 106, such as the box stringer 106a, and each segmented outer aero skin portion 296 has a first portion 298a near a first side 300a and a second portion 298b near a second side 300b of the segmented outer aero skin portion 296. As further shown in FIG. 14B, the first portion 298a of each segmented outer aero skin portion 296 is attached to the outer section 190 of one stringer 106, such as the box stringer 106a, and the second portion 298b of each segmented outer aero skin portion 296 is attached to the outer section 190 of an adjacent stringer 106, such as the box stringer 106a. In this version, as shown in FIG. 14B, the outer section 190 has flanges 302a, 302b that are added to the outer section 190 and are formed at the exterior side 115a and extend from, and form a right angle with, each side 304a, 304b of the outer section 190. As further shown in FIG. 14B, the flange 302a of the outer section 190 is attached to the first portion 298a of one segmented outer aero skin portion 296, and the flange 302b of the outer section 190 is attached to the second portion 298b of the adjacent segmented outer aero skin portion 296. The flanges 302a, 302b are attached to the first portion 298a and the second portion 298b, via attachment elements 306, such as snap-in attachment elements 306a, that mate with the flanges 302a, 302b. The first portion 298a and the second portion 298b of the segmented outer aero skin portions 296 may also be attached to the flanges 302a, 302b, via bonding with an adhesive or another suitable bonding element, via attachment elements, such as fasteners, bolts, or other suitable attachment elements, or via another suitable attachment means. The outer aero skin 20, such as the segmented outer aero skin 20b, may be comprised of fiberglass, carbon composite, plastic, a fabric that is stretched and always in tension, or another suitable material. The segmented outer aero skin portions 296 may be long and run along the length of the fuselage 16.

Now referring to FIG. 14C, FIG. 14C is an illustration of a cross-sectional front view showing the structurally integrated vacuum tank 10, such as the external structurally integrated vacuum tank 10a, with the vacuum tank skin 66 sandwiched between the stringers 106, such as the box stringers 106a, with the outer section 190 having the opening 195 and the inner section 192, and clamped together with fastener assemblies 194, and showing no outer aero skin 20 (see FIGS. 14A-14B) attached to the stringer 106, such as the box stringer 106a, in an omitted outer aero skin configuration 21, so that the vacuum tank skin 66 and the stiffener members 104, such as the stringers 106, are exposed to air flow 84b of the air 84 (see FIG. 2), such as the ambient air 84a (see FIG. 2). The fastener assemblies 194 and sealing element 262 of FIG. 14C are the same as described in FIG. 14A. The opening 195 may be plugged with a plug element or apparatus to prevent leaking. FIG. 1 shows the boundary layer 23, including the aft fuselage boundary layer 23a near the exterior of the aft fuselage barrel section 18a. The aft fuselage boundary layer 23a is thick near the exterior of the aft fuselage barrel section 18a. The boundary layer 23 (see FIG. 1), such as the aft fuselage boundary layer 23a (see FIG. 1), at the aft fuselage barrel section 18a (see FIG. 1) of the fuselage 16 (see FIG. 1) is large, such as one (1) inch to ten (10) inches. The aft fuselage boundary layer 23a may be thick enough in portions of the aft fuselage barrel section 18a that even corrugations 206 (see FIG. 6C) normal to the longitudinal direction that are two to three inches deep will not incur a significant drag penalty, and the outer aero skin 20 can be omitted.

Figure 14D:
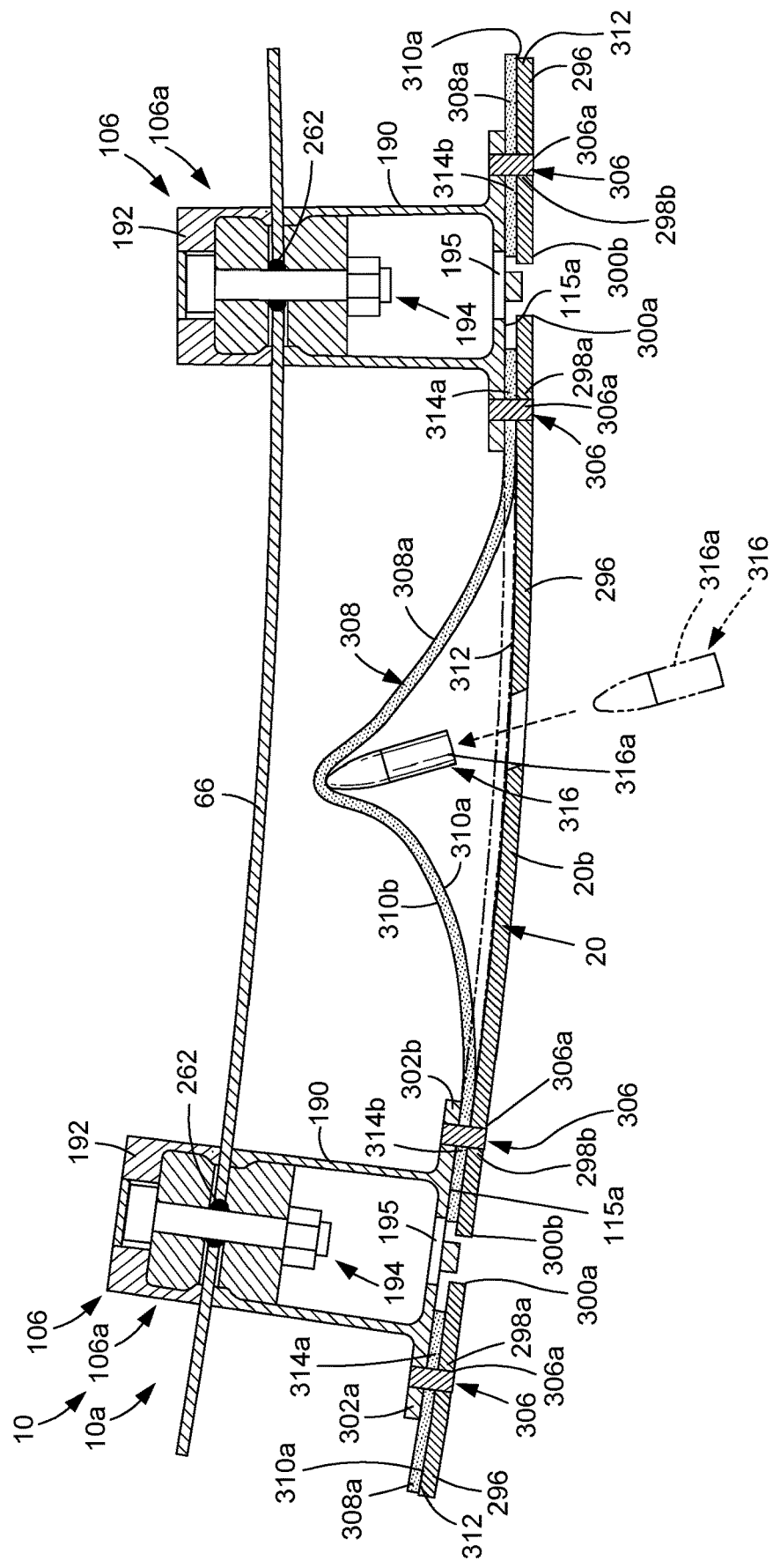
FIG. 14D is an illustration of a cross-sectional front view showing the vacuum tank skin, box stringers, fastener assemblies, and segmented outer aero skin of FIG. 14B, and further showing a barrier layer attached between the box stringer and the segmented outer aero skin.

Now referring to FIG. 14D, FIG. 14D is an illustration of a cross-sectional front view showing the structurally integrated vacuum tank 10, such as the external structurally integrated vacuum tank 10a, with the vacuum tank skin 66 sandwiched between the stringers 106, such as the box stringers 106a, with the outer section 190 having the opening 195 and the inner section 192, and clamped together with fastener assemblies 194, and showing the stringers 106, such as the box stringers 106a, attached to the outer aero skin 20, such as the segmented outer aero skin 20b of FIG. 14B comprised of segmented outer aero skin portions 296 that are separated from each other, and FIG. 14D further shows a barrier layer 308 comprised of barrier layer segments 308a, attached between the outer section 190 of the stringer 106, such as the box stringer 106a, and the segmented outer aero skin 20b, including the segmented outer aero skin portions 296. The fastener assemblies 194 and sealing element 262 of FIG. 14D are the same as described in FIG. 14A. The opening 195 may be plugged with a plug element or apparatus to prevent leaking.

As shown in FIG. 14D, the barrier layer 308, including each barrier layer segment 308a, has a first side 310a and a second side 310b. The first side 310a is adjacent an inner side 312 of each segmented outer aero skin portion 296. As shown in FIG. 14D, the barrier layer segments 308a are installed between each stringer 106, such as the box stringer 106a, and each barrier layer segment 308a has a first portion 314a and a second portion 314b. As shown in FIG. 14D, the flanges 302a, 302b are attached to the first portion 314a and the second portion 314b, respectively, via the attachment elements 306, such as the snap-in attachment elements 306a, that mate with the flanges 302a, 302b. The first portion 314a and the second portion 314b of the barrier layer segments 308a may also be attached to the flanges 302a, 302b, via bonding with an adhesive or another suitable bonding element, via attachment elements, such as fasteners, bolts, or other suitable attachment elements, or via another suitable attachment means. As shown in FIG. 14D, the segmented outer aero skin portions 296 are also attached to the flanges 302a, 302b, via the attachment elements 306, such as the snap-in attachment elements 306a, with the barrier layer segments 308a between the flanges 302a, 302b, and the segmented outer aero skin portions 296.

As shown in FIG. 14D, the barrier layer 308 is a barrier that provides protection against breach by projectile elements 316, such as bullets 316a, or other types of projectile elements that may be shot at the structurally integrated vacuum tank 10. Preferably, the barrier layer 308 is made of a strong, durable, heat resistant, bulletproof material, such as poly-paraphenylene terephthalamide, or another suitable material. In one version, as shown in FIG. 14D, the barrier layer 308 is used in conjunction with the outer aero skin 20, such as the segmented outer aero skin 20b. In another version, the barrier layer 308 is used alone and without the outer aero skin 20, such as the segmented outer aero skin 20b.

Figure 15A:
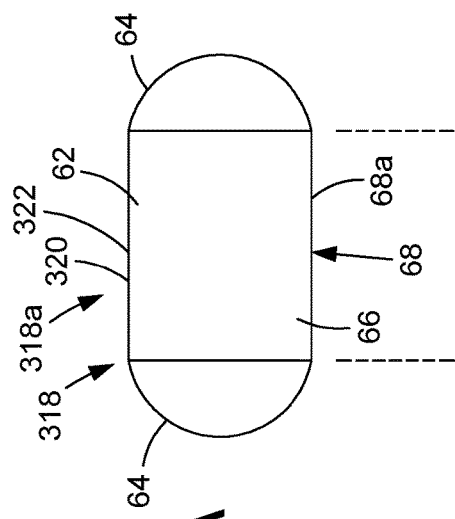
FIG. 15A is an illustration of a schematic side view of an untapered cylinder profile for a vacuum tank.
Figure 15B:
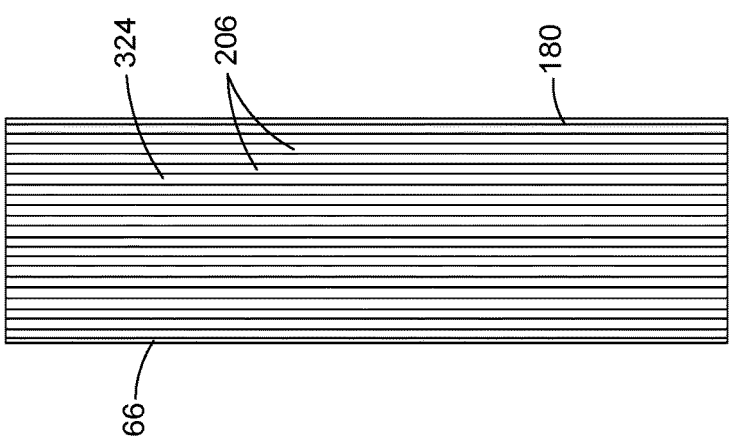
FIG. 15B is an illustration of a schematic side view of a corrugated flat pattern of a vacuum tank skin of the vacuum tank of FIG. 15A.

Now referring to FIGS. 15A-15B, FIG. 15A is an illustration of a schematic side view of a vacuum tank 318, such as a vacuum jacket 318a, having the vacuum tank main portion 62 and vacuum tank end portions 64, where the vacuum tank main portion 62 comprises the vacuum tank skin 66 forming the cylinder 68, such as an untapered cylinder 68a, having an untapered cylinder profile 320, such as a straight profile 322. FIG. 15B is an illustration of a schematic side view of a corrugated flat pattern 324 of corrugations 206 of the vacuum tank skin 66 of the untapered cylinder 68a of FIG. 15A. As shown in FIG. 15B, the vacuum tank skin 66 is a continuous sheet 180.

Figure 16A:
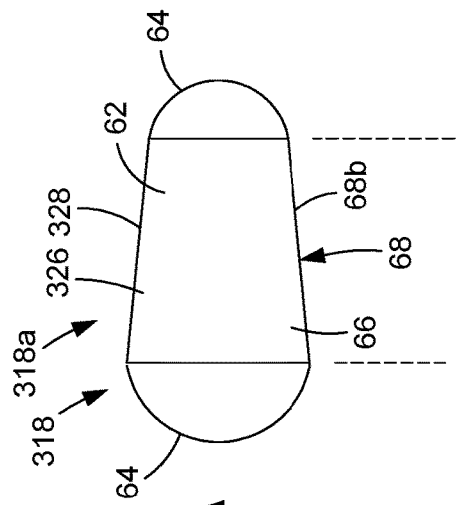
FIG. 16A is an illustration of a schematic side view of a tapered cylinder profile for a vacuum tank.
Figure 16B:
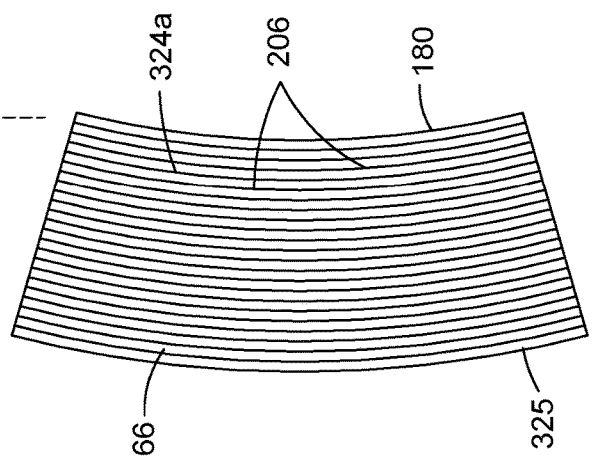
FIG. 16B is an illustration of a schematic side view of a corrugated flat pattern of a vacuum tank skin of the vacuum tank of FIG. 16A.

Now referring to FIGS. 16A-16B, FIG. 16A is an illustration of a schematic side view of a vacuum tank 318, such as a vacuum jacket 318a, having the vacuum tank main portion 62 and vacuum tank end portions 64, where the vacuum tank main portion 62 comprises the vacuum tank skin 66 forming the cylinder 68, such as a tapered cylinder 68b, having a tapered cylinder profile 326, such as a tapered profile 328. FIG. 16B is an illustration of a schematic side view of a corrugated flat pattern 324a of corrugations 206 of the vacuum tank skin 66 of the tapered cylinder 68b of FIG. 16A. If the corrugated flat pattern 324a of the tapered cylinder 68b is roll-formed, the radius of curvature can be adjusted along the length of the tapered cylinder 68b. As shown in FIG. 16B, the vacuum tank skin 66 is a continuous sheet 180 and has a curved shape 325.

Now referring to FIGS. 17A-17B, FIG. 17A is an illustration of is an illustration of a schematic side view of another untapered cylinder profile 320a. FIG. 17A shows the vacuum tank 318, such as the vacuum jacket 318a, having the vacuum tank main portion 62 and vacuum tank end portions 64, where the vacuum tank main portion 62 comprises the vacuum tank skin 66 forming the cylinder 68, such as the untapered cylinder 68a, having the untapered cylinder profile 320a, such as a straight profile 322.

FIG. 17B is an illustration of a schematic side view of a corrugated flat pattern 324b with a helix arrangement 330 of corrugations 206 of the vacuum tank skin 66 of the untapered cylinder 68a of FIG. 17A. As shown in FIG. 17B, the vacuum tank skin 66 is a continuous sheet 180. FIG. 17B shows the helix arrangement 330 with a helix start 330a and a helix end 330b. The corrugated flat pattern 324b with the helix arrangement 330 of corrugations 206 of FIG. 17B is similar to a bolt thread helix, which can enable the pressure tank 116 (see FIG. 3C) to be inserted into or mounted within the structurally integrated vacuum tank 10 (see FIG. 3C) with a small gap 134 (see FIG. 3C) between the pressure tank 116 and the structurally integrated vacuum tank 10.

Figure 17C:
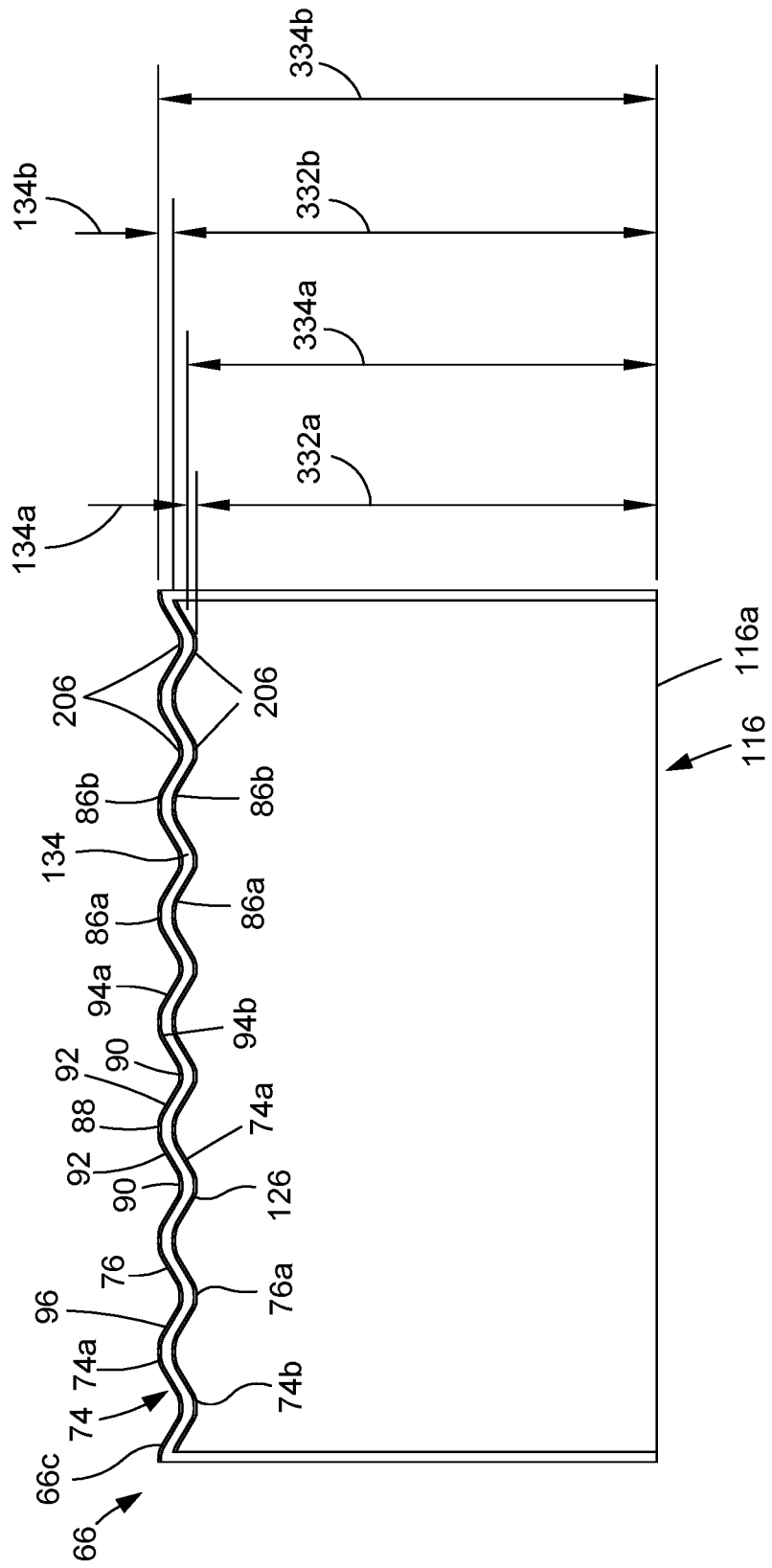
FIG. 17C is an illustration of a side view of a corrugated solid skin and a corresponding pressure tank showing minimum and maximum radii.

Now referring to FIG. 17C, FIG. 17C is an illustration of a side view of a corrugated solid skin 96 and a corresponding pressure tank 116, such as an internal pressure tank 116a, showing minimum and maximum radii for the helix arrangement 330 of FIG. 17B. FIG. 17C shows the portion 66c of the vacuum tank skin 66, such as in the form of the corrugated solid skin 96, or corrugated solid panel, showing corrugations 206. FIG. 17C shows the longitudinal cross section 74 comprising the corrugated cross section 74a and the profile geometry 76 has the corrugated shape 86a, such as in the form of the sinusoidal shape 86b. As shown in FIG. 17C, the corrugations 206 have the corrugated shape 86a, such as in the form of the sinusoidal shape 86b, with peaks 88 and valleys 90 that alternate, and have the substantially straight portion 92 in between each peak 88 and each valley 90, and the corrugated shape 86a, such as in the form of the sinusoidal shape 86b, has the first side 94a and the second side 94b. FIG. 17C further shows the pressure tank skin 126 having the pressure tank longitudinal cross section 74b comprising the corrugated cross section 74a and the pressure tank profile geometry 76a has the corrugated shape 86a, such as in the form of the sinusoidal shape 86b with corrugations 206.

As further shown in FIG. 17C, the pressure tank 116 has a minimum interior radius 332a and a maximum interior radius 332b, and the vacuum tank skin 66 has a minimum interior radius 334a and a maximum exterior radius 334b. FIG. 17C shows a gap 134a between the minimum interior radius 332a of the pressure tank 116 and minimum interior radius 334a of the vacuum tank skin 66. FIG. 17C further shows a gap 134b between the maximum interior radius 332b of the pressure tank 116 and the maximum exterior radius 334b of the vacuum tank skin 66. FIG. 17C shows the maximum interior radius 332b of the pressure tank 116 greater than the minimum interior radius 334a of the vacuum tank skin 66, which is advantageous.

Instead of the peaks 88 (see FIG. 17C) of the corrugations 206 (see FIG. 17C) being a series of circles that are parallel to each other, they form at least one helix, much like threads of a bolt. This will allow a much smaller gap 134 (see FIG. 17C) between the pressure tank 116 and the vacuum tank skin 66 of the structurally integrated vacuum tank 10 (see FIGS. 1, 2), while enabling the pressure tank 116 to be positioned inside the structurally integrated vacuum tank 10 by carefully translating and rotating it, much like a bolt is inserted into a threaded hole. The version of the blade stringer 106f with the vacuum tank skin 66 shown in FIGS. 10D and 10E is advantageous for the version shown in FIGS. 17A-17C, because it enables a small gap 134 between the pressure tank 116 and the vacuum tank skin 66.

Figure 18:
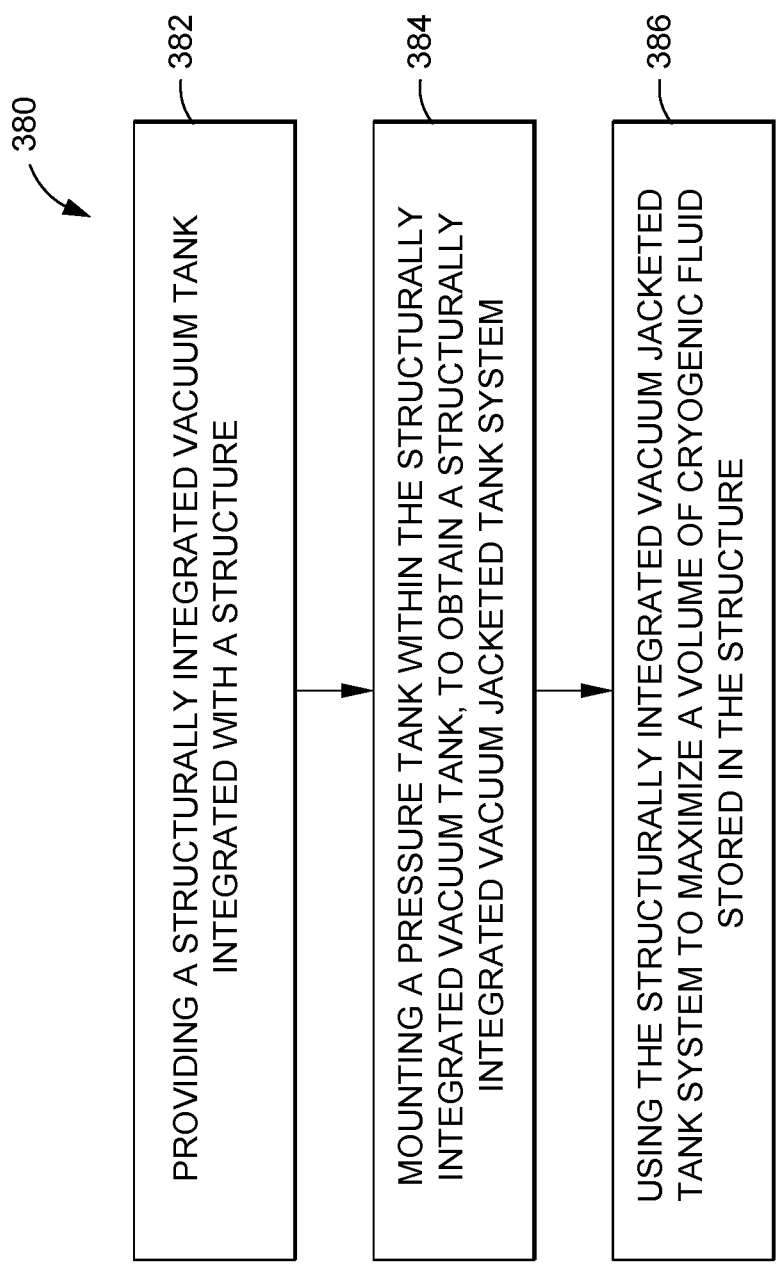
FIG. 18 is an illustration of a flow diagram of an exemplary version of a method of the disclosure.

Now referring to FIG. 18, FIG. 18 is an illustration of a flow diagram of an exemplary version of a method 380 of the disclosure. In another version of the disclosure, there is provided the method 380 of using a tank system 11 (see FIG. 2), such as a structurally integrated vacuum jacketed tank system 11a (see FIG. 2), to maximize a volume 54 (see FIG. 2) of cryogenic fluid 48 (see FIGS. 2, 3C) stored in a structure 12 (see FIG. 2). As shown in FIG. 2, the structure 12 may comprise an aircraft 14 (see also FIG. 1), a rotorcraft 136, a watercraft 138, a train 140, an automobile 142, a truck 144, or another suitable vehicle. Further, as shown in FIG. 2, the structure 12 may also comprise a non-vehicle structure, such as a power plant 146, a power station (PS) 148, including a portable power station (PS) 148a or a stationary power station (PS) 148b, or another suitable non-vehicle structure.

The blocks in FIG. 18 represent operations and/or portions thereof, or elements, and lines connecting the various blocks do not imply any particular order or dependency of the operations or portions thereof, or elements. FIG. 18 and the disclosure of the steps of the method 380 set forth herein should not be interpreted as necessarily determining a sequence in which the steps are to be performed. Rather, although one illustrative order is indicated, it is to be understood that the sequence of the steps may be modified when appropriate. Accordingly, certain operations may be performed in a different order or simultaneously.

As shown in FIG. 18, the method 380 comprises the step 382 of providing a structurally integrated vacuum tank 10 (see FIGS. 1, 2) integrated with the structure 12. The structurally integrated vacuum tank 10 has a vacuum tank main portion 62 (see FIGS. 3A, 4A-4H, 5A) extending between vacuum tank end portions 64 (see FIG. 3A). The vacuum tank main portion 62 comprises a vacuum tank skin 66 (see FIGS. 2, 3A, 4A, 5A) forming a cylinder 68 (see FIGS. 2, 3A, 4A, 5A). The vacuum tank skin 66 has a longitudinal cross section 74 (see FIGS. 2, 3A, 4E, 5B) with a profile geometry 76 (see FIGS. 2, 3A, 4E, 5B) configured to prevent buckling of the vacuum tank skin 66 under external pressure loads 40 (see FIG. 2) and flight loads 42 (see FIG. 2) when the structure 12 comprises an aircraft 14. The vacuum tank skin 66 is configured to provide a pressure barrier 80 (see FIG. 2) between an outside ambient pressure 82 (see FIG. 2) and a vacuum 60 (see FIG. 2) in an interior 58 (see FIGS. 2, 3B) of the vacuum tank main portion 62.

The structurally integrated vacuum tank 10 further comprises a plurality of stiffener members 104 (see FIGS. 2, 4E, 5A), such as a plurality of stringers 106 (see FIGS. 2, 4E, 5A), are coupled to surface portions 108 (see FIGS. 4E, 5A) of the vacuum tank skin 66, wherein the vacuum tank skin 66 and the plurality of stiffener members 104 are configured to carry bending loads 110 (see FIG. 2), such as fuselage bending loads 110a (see FIG. 2), when the structure 12 comprises an aircraft 14.

The step 382 of providing the structurally integrated vacuum tank 10 integrated with the structure 12 further comprises, providing the structurally integrated vacuum tank 10 integrated with the structure 12 comprising an aircraft 14 (see FIGS. 1, 2) with a fuselage 16 (see FIGS. 1, 2) having a plurality of fuselage barrel sections 18 (see FIG. 1), where the structurally integrated vacuum tank 10 is structurally integrated with the fuselage 16. The fuselage 16 has an outer aero skin 20 (see FIGS. 1, 2, 3A) at a fuselage mold line 22 (see FIGS. 1, 2), and the outer aero skin 20 is coupled to an exterior side 115a (see FIG. 3A) of each of the plurality of stiffener members 104, such as the plurality of stringers 106 (see FIGS. 2, 3A, 4E, 5A). The structurally integrated vacuum tank 10 comprises a single integrated structure 34 (see FIG. 2) that integrates or combines vacuum tank structure 36 (see FIGS. 1, 2) with portions of the structure 12, such as a fuselage structure 38 (see FIGS. 1, 2) of the fuselage 16 for an aircraft 14. The structurally integrated vacuum tank 10 has a dual function of a separate vacuum tank and one of the plurality of fuselage barrel sections 18 (see FIG. 1), for example, the aft fuselage barrel section 18a (see FIG. 1), but without requiring a separate vacuum tank and a separate fuselage structure arrangement.

The step 382 of providing the structurally integrated vacuum tank 10 integrated with the structure 12 comprising the aircraft 14 with the fuselage 16 having the plurality of fuselage barrel sections 18 further comprises, providing the structurally integrated vacuum tank 10 configured without the outer aero skin 20, in an omitted outer aero skin configuration 21 (see FIG. 14C), so that the vacuum tank skin 66 and the plurality of stiffener members 104 are exposed to an air flow 84b (see FIGS. 2, 14C) of air 84 (see FIG. 2), such as ambient air 84a (see FIG. 2).

The step 382 of providing the structurally integrated vacuum tank 10 integrated with the structure 12 further comprises, providing the structurally integrated vacuum tank 10 integrated with the structure 12, where the profile geometry 76 of the longitudinal cross section 74 of the vacuum tank skin 66 is modified so that a buckling stress 102 (see FIG. 2) is greater than a hoop stress 100 (see FIG. 2), and so that the profile geometry 76, as shown in FIG. 2, has a shape 86 comprising one or more of, a corrugated shape 86a, a sinusoidal shape 86b, a superimposed curves shape 86c, a symmetrical shape 86d, a non-symmetrical shape 86e, a pointed corner shape 86f, a hat shape 86g, a fractal shape 86h, or another suitable shape.

The step 382 of providing the structurally integrated vacuum tank 10 integrated with the structure 12 further comprises, providing the structurally integrated vacuum tank 10 integrated with the structure 12, where each of the plurality of stiffener members 104 has an external profile 112 (see FIGS. 4E, 5B) that is a substantially straight external profile 113 (see FIGS. 4E, 5B), and each has an internal profile 114 (see FIGS. 4E, 5B) corresponding to the profile geometry 76 of the vacuum tank skin 66. Each of the plurality of stiffener members 104 intersects with an outer mold line 72 (see FIG. 2) of the vacuum tank skin 66. In one version, such as when the structure 12 comprises an aircraft 14, the plurality of stiffener members 104 comprise a plurality of stringers 106 (see FIGS. 2, 4E, 5A). Each of the plurality of stringers 106, as shown in FIG. 2, may comprise one of, a box stringer 106a, a T-shaped stringer 106b, a U-shaped stringer 106c, a single hat stringer 106d, a double hat stringer 106e, a blade stringer 106f, a plank stringer 106g, a C-shaped stringer 106h, a J-shaped stringer 106i, an L-shaped stringer 106j, an I-shaped stringer 106k, or another suitable stringer.

As shown in FIG. 18, the method 380 further comprises the step 384 of mounting a pressure tank 116 (see FIGS. 2, 3B) within the structurally integrated vacuum tank 10, to obtain a structurally integrated vacuum jacketed tank system 11a (see FIGS. 2, 3B). The pressure tank 116 contains the stored cryogenic fluid 48 (see FIGS. 2, 3C), such as liquid hydrogen 50 (see FIGS. 2, 3C), liquid natural gas 52 (see FIG. 2), or another suitable cryogenic fluid 48.

As shown in FIG. 18, the method 380 further comprises the step 386 of using the structurally integrated vacuum jacketed tank system 11a to maximize the volume 54 of the cryogenic fluid 48 stored in the structure 12. The structurally integrated vacuum tank 10 comprises a single integrated structure 34 that carries external pressure loads 40 (see FIG. 2) and flight loads 42 (see FIG. 2), such as when the structure 12 comprises an aircraft 14. The structurally integrated vacuum tank 10 further provides clearance elimination 44 (see FIG. 2) that results in improved volume ratio 46 (see FIG. 2) and a greater potential for reduced cost due to the elimination of separate fuselage structure. Further, the clearance elimination 44 provides weight reduction of the structure 12.

Figure 19:
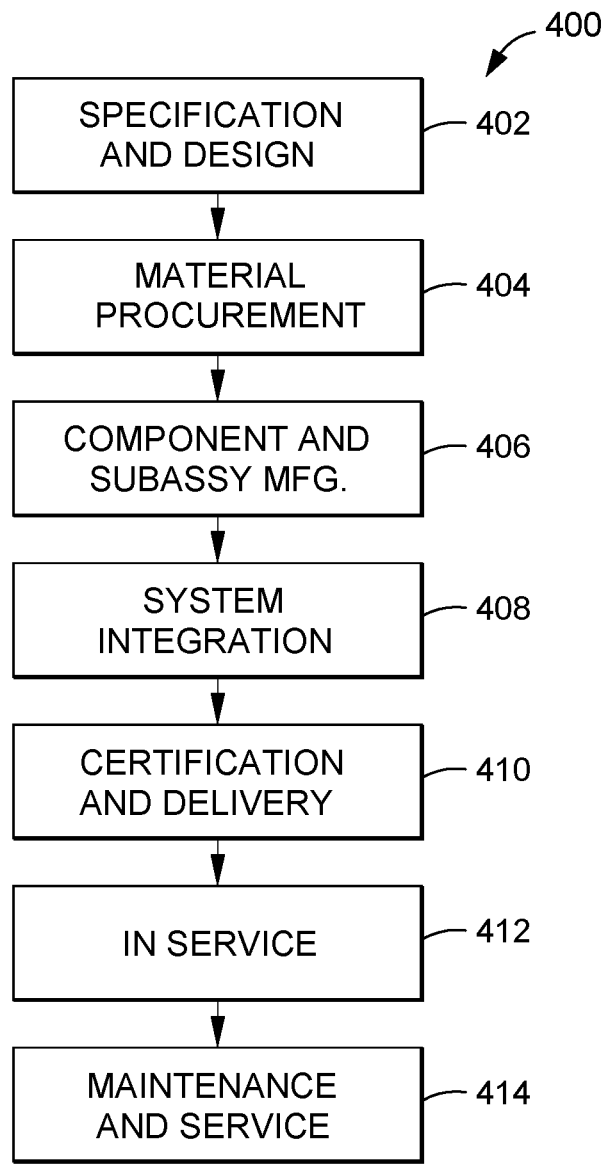
FIG. 19 is an illustration of a flow diagram of an exemplary aircraft manufacturing and service method.
Figure 20:
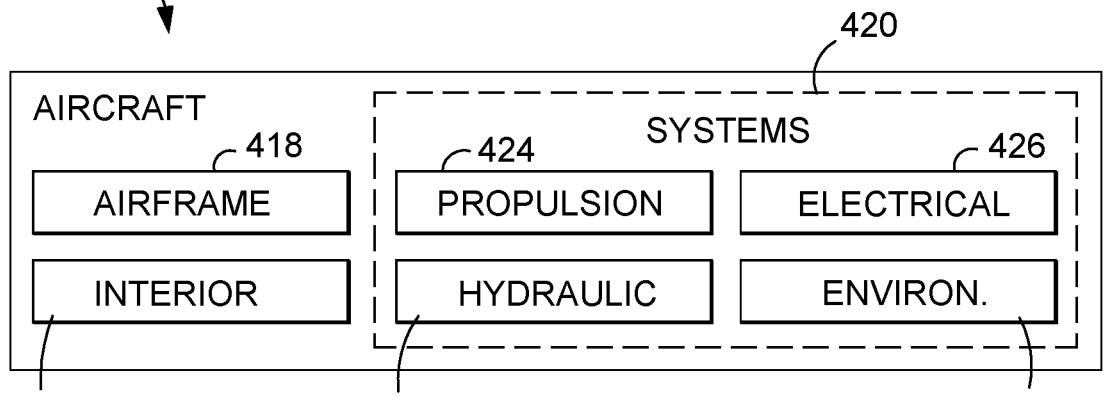
FIG. 20 is an illustration of an exemplary block diagram of an aircraft.

Now referring to FIGS. 19 and 20, FIG. 19 is an illustration of a flow diagram of an exemplary aircraft manufacturing and service method 400, and FIG. 20 is an illustration of an exemplary block diagram of an aircraft 416. Referring to FIGS. 19 and 20, versions of the disclosure may be described in the context of the aircraft manufacturing and service method 400 as shown in FIG. 19, and the aircraft 416 as shown in FIG. 20.

During pre-production, exemplary aircraft manufacturing and service method 400 may include specification and design 402 of the aircraft 416 and material procurement 404. During manufacturing, component and subassembly manufacturing 406 and system integration 408 of the aircraft 416 takes place. Thereafter, the aircraft 416 may go through certification and delivery 410 in order to be placed in service 412. While in service 412 by a customer, the aircraft 416 may be scheduled for routine maintenance and service 414 (which may also include modification, reconfiguration, refurbishment, and other suitable services).

Each of the processes of the aircraft manufacturing and service method 400 may be performed or carried out by a system integrator, a third party, and/or an operator (e.g., a customer). For the purposes of this description, a system integrator may include, without limitation, any number of aircraft manufacturers and major-system subcontractors. A third party may include, without limitation, any number of vendors, subcontractors, and suppliers. An operator may include an airline, leasing company, military entity, service organization, and other suitable operators.

As shown in FIG. 20, the aircraft 416 produced by the exemplary aircraft manufacturing and service method 400 may include an airframe 418 with a plurality of systems 420 and an interior 422. Examples of the plurality of systems 420 may include one or more of a propulsion system 424, an electrical system 426, a hydraulic system 428, and an environmental system 430. Any number of other systems may be included. Although an aerospace example is shown, the principles of the disclosure may be applied to other industries, such as the automotive industry, the construction industry, or another suitable industry.

Methods and systems embodied herein may be employed during any one or more of the stages of the aircraft manufacturing and service method 400. For example, components or subassemblies corresponding to component and subassembly manufacturing 406 may be fabricated or manufactured in a manner similar to components or subassemblies produced while the aircraft 416 is in service 412. Also, one or more apparatus embodiments, method embodiments, or a combination thereof, may be utilized during component and subassembly manufacturing 406 and system integration 408, for example, by substantially expediting assembly of or reducing the cost of the aircraft 416. Similarly, one or more of apparatus embodiments, method embodiments, or a combination thereof, may be utilized while the aircraft 416 is in service 412, for example and without limitation, to maintenance and service 414.

Disclosed versions of the structurally integrated vacuum tank 10 (see FIGS. 1, 2, 3A-3C, 4A, 5A), the aircraft 14 (see FIGS. 1, 2) with the structurally integrated vacuum tank 10, and the method 380 (see FIG. 18) provide a single integrated structure 34 (see FIG. 2) where instead of having a separate vacuum tank that is located and supported by fuselage structure 38 (see FIG. 1) and the vacuum tank structure 36 (see FIG. 1) are one integrated structure. For aircraft 14, the structurally integrated vacuum tank 10 combines vacuum tank function and fuselage barrel structure into one structure. The single integrated structure 34 of the structurally integrated vacuum tank 10 has a reduced weight and may result in reduced costs to manufacture, and the elimination of the clearance required between the fuselage 16 and a known vacuum tank in a conventional arrangement results in an improved volume ratio 46 (see FIG. 2). The single integrated structure 34 of the structurally integrated vacuum tank 10 with the vacuum tank skin 66 and the stiffener members 104, such as the stringers 106, carries both the external pressure loads 40 (see FIG. 2) and the flight loads 42 (see FIG. 2).

Further, the structurally integrated vacuum tank 10 (see FIGS. 1, 2, 3A-3C, 4A, 5A), provides for an efficient storage of cryogenic fluid 48 (see FIG. 2), such as liquid hydrogen 50 (see FIG. 2), liquid natural gas 52 (see FIG. 2), or another suitable cryogenic fluid 48, in the structure 12, such as the aircraft 14, for example, the fuselage 16 of the aircraft 14, without requiring separate fuselage structure and a separate vacuum tank. The efficient storage of the cryogenic fluid 48 in the structure 12, such as the aircraft 14, enables increased efficiency for hydrogen-powered aircraft 14a (see FIG. 2). In addition, disclosed versions of the structurally integrated vacuum tank 10 (see FIGS. 1, 2, 3A-3C, 4A, 5A), simplify the structure for the hydrogen tanks and liquid natural gas tanks, which may result in a lower cost of manufacturing. The single integrated structure 34 of the structurally integrated vacuum tank 10 increases the volume 54 (see FIG. 2) and maximizes the volume 54 of the internal pressure tank 116a (see FIG. 3B) for storing cryogenic fluid 48 and increases an amount of cryogenic fluid 48 that can be stored or contained in the internal pressure tank 116a.

Moreover, by combining the vacuum tank skin 66 with the stiffener members 104, such as the stringers 106, to form the structurally integrated vacuum tank 10 (see FIG. 2), the structurally integrated vacuum tank 10 is able to carry structural loads 109 (see FIG. 2), such as fuselage bending loads 110a (see FIG. 2), such as when the structure 12 (see FIG. 2) comprises an aircraft 14 (see FIGS. 1, 2). In addition, the stiffener members 104 (see FIGS. 2, 4A, 5A), such as the stringers 106 (see FIGS. 2, 4A, 5A), of the structurally integrated vacuum tank 10 do not require attachment to fuselage frames, thus eliminating the need for such fuselage frame attachments for these stiffener members 104, such as stringers 106. The elimination of such fuselage frame and fuselage frame attachments may result in decreased weight of the aircraft 14 and decreased overall part count in the manufacturing of the aircraft 14. Moreover, in one version, the vacuum tank skin 66 of the structurally integrated vacuum tank 10 provides a corrugated solid skin 96 (see FIG. 6A), or corrugated solid panel, that combines the advantages of a solid panel and a sandwich panel. Being a single sheet and a continuous sheet 180 (see FIG. 6A), the corrugated solid skin 96, or corrugated solid panel, has the advantages of being simple and inexpensive to manufacture, easy to join together, light in weight, and providing stability. Further, the undulating skin of the vacuum tank skin 66 in the form of the corrugated solid skin 96, or corrugated solid panel, precludes buckling under external pressure loading. The corrugated solid skin 96, or corrugated solid panel, takes static loads, including external pressure loads 40 (see FIG. 2), and takes fuselage torsional moment when the structure 12 comprises an aircraft 14. Further, the corrugated solid skin 96, or corrugated solid panel, provides an opportunity for advantageous area fraction due to relatively thin vacuum tank skin 66 structure. The increased effective thickness of the corrugated solid skin 96, or corrugated solid panel, due to the corrugations 206, enables a higher buckling load.

In addition, disclosed versions of the structurally integrated vacuum tank 10 (see FIGS. 1, 2, 3A-3C, 4A, 5A), the aircraft 14 (see FIGS. 1, 2) with the structurally integrated vacuum tank 10, and the method 380 (see FIG. 18) provide a vacuum tank skin 66 (see FIGS. 2, 3A, 4A, 6A) forming a cylinder 68 (see FIGS. 4A, 6A), where the vacuum tank skin 66 has the longitudinal cross section 74 (see FIGS. 2, 4E, 5B) with the profile geometry 76 (see FIGS. 2, 4E, 5B) for buckling prevention 78 (see FIG. 2) for the vacuum tank skin 66 under external pressure loads 40 (see FIG. 2). Further, the vacuum tank skin 66 provides a pressure barrier 80 (see FIG. 2) between an outside ambient pressure 82 (see FIG. 2) and a vacuum 60 (see FIG. 2) in an interior 58 (see FIG. 2) of the vacuum tank main portion 62. In addition, the stringers 106, such as in the form of box stringers 106a, may further include a sealing element 262 (see FIGS. 12D-12F), including a fayed surface sealing element 262a (see FIG. 12D), an externally applied sealing element 262b (see FIG. 12E), or a rubber grommet sealing element 262c (see FIG. 12F), or another suitable sealing element.

Many modifications and other versions of the disclosure will come to mind to one skilled in the art to which this disclosure pertains having the benefit of the teachings presented in the foregoing descriptions and the associated drawings. The versions described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

The invention claimed is:

1. A structurally integrated vacuum jacketed tank system for a structure, the structurally integrated vacuum jacketed tank system comprising:
a structurally integrated vacuum tank comprising:
a vacuum tank main portion extending between vacuum tank end portions, the vacuum tank main portion comprising:
a vacuum tank skin forming a cylinder, the vacuum tank skin having a longitudinal cross section with a profile geometry configured for buckling prevention for the vacuum tank skin under external pressure loads, and the vacuum tank skin configured to provide a pressure barrier between an outside ambient pressure and a vacuum in an interior of the vacuum tank main portion; and
a plurality of stringers coupled to one of, outer surface portions of the vacuum tank skin, or outer surface portions and inner surface portions of the vacuum tank skin, wherein the vacuum tank skin and the plurality of stringers are configured to carry structural loads;
a pressure tank mounted within the structurally integrated vacuum tank, and attached to an interior of the structurally integrated vacuum tank, via a forward tank attach fitting and an aft tank attach fitting, the pressure tank containing a cryogenic fluid; and
a vacuum cavity that forms a gap between a pressure tank outer surface of the pressure tank, and a vacuum tank inner surface of the structurally integrated vacuum tank, such that the pressure tank is not in direct contact with both the vacuum tank skin and the plurality of stringers.

2. The structurally integrated vacuum jacketed tank system of claim 1, wherein the longitudinal cross section comprises a corrugated cross section having a sinusoidal shape with peaks and valleys that alternate, and with a substantially straight portion in between each peak and each valley.

3. The structurally integrated vacuum jacketed tank system of claim 2, wherein a curve is added to the substantially straight portion between each peak and each valley of the sinusoidal shape.

4. The structurally integrated vacuum jacketed tank system of claim 1, wherein each of the plurality of stringers comprises one of, a box stringer, a T-shaped stringer, a U-shaped stringer, a single hat stringer, a double hat stringer, a blade stringer, a plank stringer, a C-shaped stringer, a J-shaped stringer, an L-shaped stringer, or an I-shaped stringer.

5. The structurally integrated vacuum jacketed tank system of claim 4, wherein the box stringer comprises a first section and a second section, and the vacuum tank skin is clamped between the first section and the second section, via one or more fastener assemblies.

6. The structurally integrated vacuum jacketed tank system of claim 5, wherein the box stringer further comprises a sealing element comprising one of:
a fayed surface sealing element;
an externally applied sealing element; or
a rubber grommet sealing element.

7. The structurally integrated vacuum jacketed tank system of claim 1, wherein the profile geometry of the longitudinal cross section of the vacuum tank skin has a shape comprising one or more of a corrugated shape, a sinusoidal shape, a superimposed curves shape, a symmetrical shape, a non-symmetrical shape, a pointed corner shape, a hat shape, or a fractal shape.

8. The structurally integrated vacuum jacketed tank system of claim 1, wherein the cylinder formed by the vacuum tank skin comprises one of:
an untapered cylinder; or
a tapered cylinder.

9. The structurally integrated vacuum jacketed tank system of claim 1, wherein the plurality of stringers and the vacuum tank skin are made of one or more metal materials comprising aluminum, aluminum alloy, steel, stainless steel, titanium alloy, copper, and copper alloy.

10. The structurally integrated vacuum jacketed tank system of claim 1, wherein each of the plurality of stringers has an external profile that is a substantially straight external profile, and an internal profile corresponding to the profile geometry of the vacuum tank skin.

11. An aircraft, comprising:
a fuselage with a plurality of fuselage barrel sections, and an outer aero skin at a fuselage mold line; and
a structurally integrated vacuum jacketed tank system, comprising:
a structurally integrated vacuum tank integrated with the fuselage, the structurally integrated vacuum tank having a vacuum tank main portion extending between vacuum tank end portions, the vacuum tank main portion comprising:
a vacuum tank skin forming a cylinder, the vacuum tank skin having a longitudinal cross section with a profile geometry configured for buckling prevention for the vacuum tank skin under external pressure loads and flight loads, and the vacuum tank skin configured to provide a pressure barrier between an outside ambient pressure and a vacuum in an interior of the vacuum tank main portion; and
a plurality of stringers coupled to one of, outer surface portions of the vacuum tank skin, or outer surface portions and inner surface portions of the vacuum tank skin, and the plurality of stringers coupled to the outer aero skin, wherein the plurality of stringers and the vacuum tank skin are configured to carry fuselage bending loads;
a pressure tank mounted within the structurally integrated vacuum tank, to obtain the structurally integrated vacuum jacketed tank system, the pressure tank containing a cryogenic fluid and attached to an interior of the structurally integrated vacuum tank, via a forward tank attach fitting and an aft tank attach fitting; and
a vacuum cavity that forms a gap between a pressure tank outer surface of the pressure tank, and a vacuum tank inner surface of the structurally integrated vacuum tank, such that the pressure tank is not in direct contact with both the vacuum tank skin and the plurality of stringers.

12. The aircraft of claim 11, wherein the structurally integrated vacuum tank is configured without the outer aero skin in an omitted outer aero skin configuration, so that the vacuum tank skin and the plurality of stringers are exposed to an air flow.

13. The aircraft of claim 11, wherein the profile geometry of the longitudinal cross section of the vacuum tank skin has a shape comprising one or more of, a corrugated shape, a sinusoidal shape, a superimposed curves shape, a symmetrical shape, a non-symmetrical shape, a pointed corner shape, a hat shape, or a fractal shape.

14. The aircraft of claim 11, wherein each of the plurality of stringers has an external profile that is a substantially straight external profile, and an internal profile corresponding to the profile geometry of the vacuum tank skin.

15. The aircraft of claim 11, wherein the cryogenic fluid comprises one of:
   liquid hydrogen; or
   liquid natural gas.

16. A method of using a structurally integrated vacuum jacketed tank system to maximize a volume of cryogenic fluid stored in a structure, the method comprising the steps of:
   providing a structurally integrated vacuum tank integrated with the structure, the structurally integrated vacuum tank having a vacuum tank main portion extending between vacuum tank end portions, the vacuum tank main portion comprising:
      a vacuum tank skin forming a cylinder, the vacuum tank skin having a longitudinal cross section with a profile geometry configured for buckling prevention for the vacuum tank skin under external pressure loads, and the vacuum tank skin configured to provide a pressure barrier between an outside ambient pressure and a vacuum in an interior of the vacuum tank main portion; and
      a plurality of stringers coupled to one of, outer surface portions of the vacuum tank skin, or outer surface portions and inner surface portions of the vacuum tank skin, wherein the vacuum tank skin and the plurality of stringers are configured to carry structural loads;
   mounting a pressure tank within the structurally integrated vacuum tank, to obtain the structurally integrated vacuum jacketed tank system, the pressure tank containing the cryogenic fluid and attached to an interior of the structurally integrated vacuum tank, via a forward tank attach fitting and an aft tank attach fitting, and a vacuum cavity forming a gap between a pressure tank outer surface of the pressure tank, and a vacuum tank inner surface of the structurally integrated vacuum tank, such that the pressure tank is not in direct contact with both the vacuum tank skin and the plurality of stringers; and
   using the structurally integrated vacuum jacketed tank system to maximize the volume of the cryogenic fluid stored in the structure.

17. The method of claim 16, wherein the step of providing the structurally integrated vacuum tank integrated with the structure further comprises:
   providing the structurally integrated vacuum tank integrated with the structure comprising an aircraft with a fuselage having a plurality of fuselage barrel sections, where the structurally integrated vacuum tank is integrated with the fuselage, the fuselage having an outer aero skin at a fuselage mold line, and the outer aero skin coupled to an exterior side of each of the plurality of stringers.

18. The method of claim 17, wherein providing the structurally integrated vacuum tank integrated with the structure comprising the aircraft with the fuselage having the plurality of fuselage barrel sections further comprises:
   providing the structurally integrated vacuum tank configured without the outer aero skin, so that the vacuum tank skin and the plurality of stringers are exposed to an air flow.

19. The method of claim 16, wherein the step of providing the structurally integrated vacuum tank integrated with the structure further comprises:
   providing the structurally integrated vacuum tank integrated with the structure, where the profile geometry of the longitudinal cross section of the vacuum tank skin is modified so that a buckling stress is greater than a hoop stress, and so that the profile geometry has a shape comprising one or more of, a corrugated shape, a sinusoidal shape, a superimposed curves shape, a symmetrical shape, a non-symmetrical shape, a pointed corner shape, a hat shape, or a fractal shape.

20. The method of claim 16, wherein the step of providing the structurally integrated vacuum tank integrated with the structure further comprises:
   providing the structurally integrated vacuum tank integrated with the structure, where each of the plurality of stringers has an external profile that is a substantially straight external profile, and an internal profile corresponding to the profile geometry of the vacuum tank skin.

* * * * *